US008855860B2

(12) United States Patent
Isaji et al.

(10) Patent No.: US 8,855,860 B2
(45) Date of Patent: Oct. 7, 2014

(54) VEHICLE BEHAVIOR CONTROL APPARATUS

(71) Applicant: Denso Corporation, Kariya (JP)

(72) Inventors: Kazuyoshi Isaji, Kariya (JP); Naohiko Tsuru, Handa (JP); Shou Morikawa, Obu (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 13/676,446

(22) Filed: Nov. 14, 2012

(65) Prior Publication Data

US 2013/0131925 A1    May 23, 2013

(30) Foreign Application Priority Data

Nov. 18, 2011   (JP) ................................ 2011-252963
Apr. 26, 2012   (JP) ................................ 2012-101549

(51) Int. Cl.
| B62D 6/00 | (2006.01) |
| G05D 1/00 | (2006.01) |
| B60W 10/20 | (2006.01) |
| B60W 30/18 | (2012.01) |
| B60K 31/00 | (2006.01) |
| B60W 10/06 | (2006.01) |
| B60W 30/16 | (2012.01) |
| B60W 30/10 | (2006.01) |

(52) U.S. Cl.
CPC ............ *B62D 6/00* (2013.01); *B60W 2550/146* (2013.01); *B60W 10/20* (2013.01); *B60W 2550/308* (2013.01); *B60W 30/18145* (2013.01); *B60K 31/0066* (2013.01); *B60W 10/06* (2013.01); *B60W 30/16* (2013.01); *B60W 30/10* (2013.01); *B60W 2550/408* (2013.01)
USPC ........ 701/41; 701/1; 701/23; 701/36; 701/96; 701/116; 340/435; 340/436; 340/903

(58) Field of Classification Search
CPC ................................ B26D 6/00; B60W 40/00

USPC ............ 701/23, 41, 70, 82, 96; 340/901–903, 340/933, 935, 936, 465, 467; 180/280
See application file for complete search history.

(56) References Cited

U.S. PATENT DOCUMENTS

| 5,661,650 | A | | 8/1997 | Sekine et al. | |
| 5,854,987 | A | * | 12/1998 | Sekine et al. | .................. 701/41 |

(Continued)

FOREIGN PATENT DOCUMENTS

| JP | 07-234991 | 9/1995 |
| JP | 9-263200 | 10/1997 |

(Continued)

OTHER PUBLICATIONS

Office action dated Dec. 10, 2013 in corresponding JP Application No. 2012-101549.
Office Action mailed May 13, 2014 in corresponding Japanese application No. 2012-101549 with English translation.

*Primary Examiner* — Thomas Tarcza
*Assistant Examiner* — Tyler J Lee
(74) *Attorney, Agent, or Firm* — Harness, Dickey & Pierce, PLC

(57) ABSTRACT

A vehicle behavior control apparatus disposed in a subject vehicle performs a steering angle control of the subject vehicle. The apparatus acquires lead vehicle information transmitted from a lead vehicle to determine a virtual shape of a road (i.e., a virtual road shape) based on a travel locus of the lead vehicle. A virtual road border distance is calculated as a distance from the subject vehicle to a road border of a virtual curve road positioned straight in front of the subject vehicle. The apparatus, calculates an appropriate turn radius for travel along the virtual curve road and, based on the appropriate turn radius, calculates an appropriate distance from the subject vehicle to the virtual road border positioned in front of the subject vehicle. A steering unit then controls a steering angle of the subject vehicle by maintaining the virtual road border distance with the appropriate distance.

10 Claims, 30 Drawing Sheets

(56) References Cited

U.S. PATENT DOCUMENTS

| | | | |
|---|---|---|---|
| 5,878,361 A * | 3/1999 | Sekine et al. | 701/41 |
| 6,301,530 B1 * | 10/2001 | Tamura | 701/23 |
| 6,356,820 B1 * | 3/2002 | Hashimoto et al. | 701/23 |
| 2007/0276574 A1 | 11/2007 | Isaji et al. | |
| 2010/0023232 A1 | 1/2010 | Isaji et al. | |
| 2010/0082203 A1 | 4/2010 | Isaji et al. | |
| 2010/0324797 A1 * | 12/2010 | Fritz | 701/96 |
| 2011/0087415 A1 * | 4/2011 | Yokoyama et al. | 701/71 |
| 2011/0270513 A1 * | 11/2011 | Shida | 701/117 |

FOREIGN PATENT DOCUMENTS

| | | |
|---|---|---|
| JP | 2000-113394 | 4/2000 |
| JP | 2006-293530 | 10/2006 |
| JP | 2007-137248 | 6/2007 |
| JP | 2007-280060 | 10/2007 |
| JP | 2008-049918 | 3/2008 |
| JP | 2008-074378 | 4/2008 |
| JP | 2010-030403 | 2/2010 |
| JP | 2010-083244 | 4/2010 |
| JP | 2011-003075 | 1/2011 |

* cited by examiner

VEHICLE BEHAVIOR CONTROL APPARATUS

CROSS REFERENCE TO RELATED APPLICATION

The present application is based on and claims the benefit of priority of Japanese Patent Applications No. 2011-252963, filed on Nov. 18, 2011, and No. 2012-101549, filed on Apr. 26, 2012, the disclosure of which are incorporated herein by reference.

TECHNICAL FIELD

The present disclosure generally relates to a vehicle behavior control apparatus controlling a steering angle of a steering wheel in a vehicle.

BACKGROUND

Conventional techniques for calculating a curve road curvature radius of a road that is going to be traveled by a vehicle are disclosed, for example, in the following documents. For instance in, Japanese Patent No. 4,596,063 (JP '063) describes a system having two CCD cameras disposed on right and left front parts of a vehicle and a stereo-image processor. The stereo-image processor captures a field image and objects in front of the vehicle by the CCD cameras in "stereo," and processes captured image signals of the stereo captured image by using a well-known method for determining a distance, producing a three-dimensional distance image that is, as a whole, composed as a three-dimensional distance distribution, for the purpose of recognizing a three-dimensional road shape and the like.

Further, for example, Japanese Patent No. 3,432,881 (JP '881) describes a steering angle control technique, which controls a steering angle of a steering wheel in a vehicle based on a calculated curve road curvature radius of a to-be-traveled road. Per JP '881, the curvature radius of a curve is calculated based on map information that is a collection of coordinates of many nodes and is output from a map information output unit of, for example, an IC card, a CD-ROM or the like. Based on the calculated curvature radius, the steering angle is controlled.

Further, in Japanese Patent No. 3,720,117 (JP '117), a disclosed technique is used to control a steering angle of a vehicle, based on a calculation of the curvature radius of the curved road by using (i) a distance to a road border, a built-in road facility or the like in front of a subject vehicle detected by a radar and (ii) a distance to such road border/facility from offset positions on the right and left of the subject vehicle.

However, the technique in JP '063 requires two CCD cameras as well as the stereo image processor, leading to a problem that the apparatus/system configuration is complex and the processing is complicated.

Further, the technique in JP '881 cannot always calculate the curve road curvature radius in an accurate manner, due to the lack of accuracy of the map information that is output from the map information output unit. That is, the steering angle control may possibly be inappropriate for the travel of the curve road according to the technique of JP '881.

Furthermore, the steering angle control in JP '117 may also be inappropriate when the road border/facility does not exist, or when a road border line is not recognized by a radar, which disables a calculation of the curve road curvature radius.

SUMMARY

It is an object of the present disclosure to provide a vehicle behavior control apparatus that accurately performs a steering angle control.

In an aspect of the present disclosure, the vehicle behavior control apparatus disposed in a subject vehicle includes: a current position acquisition unit for regularly acquiring a current position of the subject vehicle, a lead vehicle information acquisition unit, a virtual road shape determination unit, a virtual road border distance calculation unit, a curvature radius calculation unit, a turn radius calculation unit, an appropriate distance calculation unit, and a steering unit The lead vehicle information acquisition unit acquires lead vehicle information that is regularly transmitted from a lead vehicle through vehicle-to-vehicle communication by a wireless communication unit. According to a travel locus of the lead vehicle, the virtual road shape determination unit determines a virtual shape of a road (i.e., a virtual road shape).

Based on the current position of the subject vehicle and the virtual road shape, the virtual road border distance calculation unit calculates a virtual road border distance as a distance from the subject vehicle to a road border of a virtual curve road straight in front of the subject vehicle. In addition, based on the virtual road shape, the curvature radius calculation unit calculates a curvature radius of the virtual curve road in front of the subject vehicle.

The turn radius calculation unit calculates an appropriate turn radius of the subject vehicle for a travel of the virtual curve road based on the curvature radius. Based on the appropriate turn radius, the appropriate distance calculation unit calculates an appropriate distance in the virtual curve road from the subject vehicle to the road border straight in front of the subject vehicle. The steering unit controls a steering angle of the subject vehicle, which is traveling along the virtual curve road, so as to maintain the virtual road border distance with the appropriate distance.

According to the above configuration, the steering angle is controlled such that the virtual road border distance matches the appropriate distance that is calculated based on the appropriate turn radius of the subject vehicle for the travel of the virtual curve road. Therefore, the travel path of the vehicle is controlled to have the appropriate turn radius of the virtual curve road.

Further, the virtual road shape is determined based on the lead vehicle information that is acquired through the vehicle-to-vehicle communication, which can be performed by a simple structure apparatus, may lead to a comparatively simple configuration of the vehicle behavior control apparatus and a comparatively simple processing in the apparatus.

Furthermore, the virtual road shape according to the travel locus of the vehicle is used to calculate the outside curvature radius of the virtual curve road, enabling an accurate calculation of the outside curvature radius of a curve road based on an actual travel locus of the lead vehicle, which is actually traveling the curve road. Therefore, the steering angle control for the travel of the curve road is accurately performed based on the outside curvature radius of the curve road.

Further, the steering angle is controlled based on the outside curvature radius of the virtual curve road, which is calculated based on the virtual road shape according to the travel locus of the lead vehicle. Therefore, even when a road border line or a built-in road facility around the road border does not exist, the steering angle control for the travel of the curve road is accurately performed. For example, when the lead vehicle turns at an intersection to the right/left, there is no road border defining a turn of the lead vehicle or no built-in road facility along an intersection-turning curve of the lead vehicle. Even in such case, the steering angle control of the subject vehicle for the travel of the curve road is highly accurately performed. Thus, an accurate steering angle control of the subject vehicle is enabled by a simple apparatus.

Further, matching or maintaining the front distance with the appropriate distance by the steering angle control may be performed by using a tire steer angle calculation unit that calculates a tire steer angle θ and a steering angle calculation unit that calculates a steering angle Θ according to the tire steer angle θ. The tire steer angle Θ matches the virtual road border distance with the appropriate distance, and the steering angle is used as a target steering angle of the steering angle control by the steering unit.

According to the configuration of the present disclosure, the subject vehicle is steered to return to a center of the road width, which may be defined as a centerline of the virtual road borders on both sides either of the straight road part in the first area or of the straight road part defined as a tangent line of the virtual curve road.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The embodiments of the present disclosure are described with reference to the drawings in the following.

First Embodiment

Figure 1:
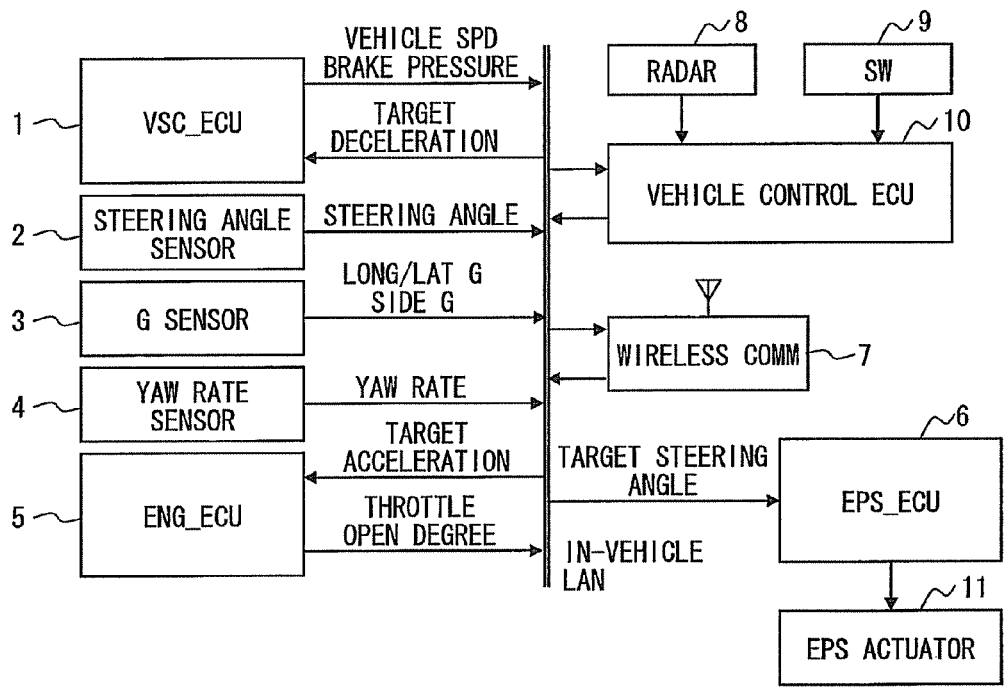
FIG. 1 is a block diagram of a driving support system of the present disclosure.

The first embodiment of the present disclosure describes an application of the vehicle behavior control apparatus, serving as a driving support system 100 for a subject vehicle. FIG. 1 is a block diagram of the driving support system 100 in the first embodiment of the present disclosure. The present driving support system 100 includes a VSC_ECU 1, a steering angle sensor 2, a G sensor 3, a yaw rate sensor 4, an ENG_ECU (i.e., an engine ECU) 5, an EPS_ECU (i.e., an electric power steering ECU) 6, a wireless communication unit 7, a radar 8, an the operation SW 9 and a vehicle control ECU 10.

The VSC_ECU 1 is a control unit for controlling a brake actuator (not illustrated) that applies braking force, and includes a control function for enabling VSC (i.e., Vehicle Stability Control, a registered trademark) that restrains a sideslip of the subject vehicle. Upon receiving information about a required deceleration from an in-vehicle LAN, VSC_ECU 1 controls the brake actuator for generating the required deceleration. Further, VSC_ECU 1 transmits, to the in-vehicle LAN, information regarding a speed Vo of the subject vehicle (i.e. a vehicle speed Vo) and a brake pressure. The steering angle sensor 2 detects a steering angle Θ of the subject vehicle, and transmits information regarding the steering angle Θ detected to the in-vehicle LAN.

The G sensor 3 detects a longitudinal acceleration (i.e., a G in a longitudinal direction of the vehicle) and a lateral acceleration (i.e., a G in a lateral direction of the vehicle), and transmits information of the detected longitudinal/lateral G to the in-vehicle LAN.

The yaw rate sensor 4 detects an angular acceleration around a vertical axis of the subject vehicle (i.e., a yaw rate), and transmits information of the yaw rate detected to the in-vehicle LAN.

The ENG_ECU 5 receives information of the required acceleration from the in-vehicle LAN, and controls a throttle actuator for generating the required acceleration. Further, the ENG_ECU 5 controls the throttle actuator to generate an "engine braking force" when it receives information of the required deceleration.

The EPS_ECU 6 controls a steering angle by operating an EPS actuator 11. The EPS actuator 11 is a mechanism to change a steering angle based on an instruction signal from the EPS_ECU 6, and includes a motor for driving a speed reduction gear and an intermediate shaft connected to and rotated with the gear.

The wireless communication unit 7 has an antenna for transmitting and receiving electric waves, and performs vehicle-to-vehicle communication, which may be designated as v-to-v communication hereinafter, with other vehicles around the subject vehicle, without using a telephone network, by the wireless communication. The wireless communication unit 7 receives information from and transmits information to other vehicles.

For instance, the wireless communication unit 7 may perform the wireless communication by using the electric wave of 700 MHz band, and performs the v-to-v communication with a partner vehicle which, for example, exists within a range of 1 km radius from the position of the subject vehicle.

Further, the wireless communication unit 7 may perform the wireless communication by using the electric wave of 5.9 GHz band. In which case, the wireless communication unit 7 performs the v-to-v communication with the partner vehicle which, for example, exists in the range of 500 m radius around the subject vehicle's position.

The wireless communication unit 7 regularly transmits vehicle information, such as the vehicle speed Vo and the steering angle Θ, at a constant transmission cycle of every 100 msec or the like by receiving the information from the in-vehicle LAN.

Further, the wireless communication unit 7 receives vehicle information from other vehicles, which is transmitted by the wireless communication unit 7 in the driving support system 100 of the other vehicles. By receiving such information, the wireless communication unit 7 of the subject vehicle provides the information to the vehicle control ECU 10.

The radar 8 is a well-known type laser radar, which irradiates a laser beam for a preset front range of the subject vehicle and receives a reflected beam. The radar 8 detects and provides information to the vehicle control ECU 10. Such information includes an inter-vehicle distance D to a lead vehicle, a relative speed Vr1 with the lead vehicle, an offset (i.e., a sideway shift) between a center line of the subject vehicle's width and a center line of the lead vehicle's width.

The value of the information detected by the radar 8, such as such as the distance D, the velocity Vr1, the offset, may also so be determined by the vehicle control ECU 10 based on a signal from the radar 8. In the present embodiment, the determination of the above quantities is performed by the vehicle control ECU 10 based on the signal from the radar 8.

The operation SW 9 is a group of switches operated by the driver of the subject vehicle, and the operation information of the group of switches is output to the vehicle control ECU 10.

The vehicle control ECU 10 is implemented as a microcomputer, and includes a well-known type CPU, ROM, RAM, input/output and a bus line for connection therebetween.

The vehicle control ECU 10 performs various processes based on various information input from VSC_ECU 1, the steering angle sensor 2, the G sensor 3, the yaw rate sensor 4, ENG_ECU 5, the wireless communication unit 7, the radar 8, and the operation SW 9.

The vehicle control ECU 10 performs a lead vehicle follow travel control by using a corrected evaluation index KdB_c, which represents a state of changing distance (i.e., an inter-vehicle distance) between the subject vehicle and the lead vehicle.

The corrected evaluation index KdB_c is an evaluation index KdB after correction that is performed in consideration of the speed of the lead vehicle. The evaluation index KdB is an index of change of an area of an image that is assumed to be captured by the driver's eye, measured at a unit time. The index KdB and the index KdB_c may be represented, for example, by equations 1, 2.

In equations 1 and 2, "D" is a distance between the subject vehicle and the lead vehicle, "Vr" is a relative speed of the lead vehicle relative to the subject vehicle, "a" is a constant multiplier, "Vp" is a speed of the lead vehicle.

$$KdB = 10 \times \log_{10}\left(\left|4 \times 10^7 \times \frac{Vr}{D^3}\right|\right) \quad \text{(Equation 1)}$$

$$KdB\_c(a) = 10 \times \log_{10}\left(\left|4 \times 10^7 \times \frac{Vr - aVp}{D^3}\right|\right) \quad \text{(Equation 2)}$$

Per equation 2, the evaluation index KdB_c increases as an absolute value of the relative speed Vr approaching the lead vehicle increases. Also, the evaluation index KdB_c decreases as the speed Vp of the lead vehicle increases.

In addition, equation 2 increases as the inter-vehicle distance decreases. Since, the distance D is used as a cube factor in equation 2, the increase curve (i.e., a slope) of the evaluation index KdB_c becomes steeper per unit change of the inter-vehicle distance D when the inter-vehicle distance D decreases. When the speed control is performed by using the corrected evaluation index KdB_c, it is well-known and recognized, for example in theory in an academic society, that the speed control is performed without causing uncomfortable feeling for the driver of the vehicle. Therefore, the speed (acceleration/deceleration) control of the vehicle becomes smooth and comfortable without causing uncomfortable feeling for the driver of the vehicle when the lead vehicle follow travel control is performed by using the corrected evaluation index KdB_c.

The vehicle control ECU 10 stores, for example, in its ROM a friction brake start threshold equation, an engine braking start threshold equation, and an acceleration control end threshold equation. These threshold equations are made up respectively by adding an offset value to a brake determination equation. The brake determination equation is shown in the following as equation 3.

$$KdB\_c(a) = b \log_{10} D + c \quad \text{(Equation 3)}$$

The brake determination equation represents a relationship between the index KdB_c and the inter-vehicle distance D at a time of starting the brake operation by the driver. The 'a' 'b' 'c' in equation 3 are all constants, where 'a' is the one used in equation 2. The values of 'a''b''c' may be, for example, 0.2, −22.66, and 74.71, respectively.

Because the brake determination equation is provided as equation 3, the friction brake start threshold equation, the engine braking start threshold equation, and the acceleration control and threshold equation are all represented in a form of equation 4. The $\Delta c$ in equation 4 is an offset value, and the offset value $\Delta c$ is set either to a first brake offset value $\Delta c1$ in the friction brake start threshold equation, or to a second brake offset value $\Delta c2$ in the engine braking start threshold equation, or to a third brake offset value $\Delta c3$ in the acceleration control end threshold equation. These offset values $\Delta c1$, $\Delta c2$, $\Delta c3$ may be, for example, −3 dB, −4 dB, and −6 dB.

$$KdB\_c(a) = b \log_{10} D + c + \Delta c \quad \text{(Equation 4)}$$

According to the magnitude of these offset values, the evaluation index $KdB\_c$ decreases in an order of the brake determination equation, the friction brake start threshold equation, the engine braking start threshold equation, and the acceleration control end threshold equation.

The vehicle control ECU 10 performs the lead vehicle follow travel control using various devices connected to the in-vehicle LAN. The lead vehicle follow travel control starts when a driver operates the operation SW 9, providing a lead vehicle follow travel control instruction, and, such control is finished according to an end operation provided by the driver.

The lead vehicle follow travel control begins after performing a followee lead vehicle determination process to determine which vehicle is to serve as the lead vehicle of the subject vehicle. The followee lead vehicle determination process determines whether a vehicle right-ahead or right in front of the subject vehicle, which is detected by the radar 8, is the vehicle from which the vehicle information is received by wireless communication unit 7. Such determination is performed based on a similarity of the vehicle detected by the radar 8 and a sender vehicle identified by the vehicle information received regarding the relative speed relative to the subject vehicle as well as the distance from the subject vehicle and the relative position to the subject vehicle.

When the followee lead vehicle determination process uses a speed and a distance to determine the lead vehicle, the driving support system 100 may be transmit, through the wireless communication unit 7, the vehicle information that includes a distance to a following vehicle based on the signal from the radar 8, which is capable of scanning a rear field, detecting a right-behind following vehicle. Determination of the lead vehicle is performed, based on the similarity regarding the speeds and the distances of the two vehicles, that is, (i) the right-ahead lead vehicle detected by the radar 8 and (ii) the other vehicle indicated as the right-behind vehicle in the received vehicle information.

Further, when the determination of the lead vehicle uses a relative position, the driving support system 100 may be configured to regularly detect and transmit the position information detected by a position detector for including such information in the vehicle information. Accordingly, the lead vehicle may be determined based on the information of the right-ahead vehicle regarding the relative position derived from the signal from the radar 8 and the relative position of the other vehicle, which is transmitting vehicle information of itself. The relative position of the other vehicle transmitting the vehicle information may be calculated based on the position information of the other vehicle and the position information of the subject vehicle, which is detected by the position detector of the subject vehicle. Further, in the calculation of the relative position, the correspondence of the positions of the subject vehicle and the other vehicle may be secured in terms of substantially same detection time of two vehicle's positions based on the GPS detection time of those positions.

Furthermore, the followee lead vehicle determination process may provide, from a display unit or a speaker, information of a selectability of the right-ahead vehicle detected by the radar 8 when such right-ahead vehicle is determined as the vehicle from which the vehicle information is received by the wireless communication unit 7 (i.e., a selectability message, hereinafter).

The right-ahead vehicle is determined as the lead vehicle of the subject vehicle, where the subject vehicle follows the lead vehicle, by using the v-to-v communication when the driver operates the SW 9 to select the right-ahead vehicle as the lead vehicle while the selectability message is presented or within a certain period from such presentation of the selectability message. Therefore, the vehicle control ECU 10 corresponds to a followee object determination unit in claims.

Further, when the lead vehicle is determined by the followee lead vehicle determination process, the detected distance to the lead vehicle based on a signal from the radar 8 (i.e., an initial inter-vehicle distance to the lead vehicle) is set as a target inter-vehicle distance Dt.

In the lead vehicle follow travel control, the vehicle control ECU 10 regularly calculates a current value of the corrected evaluation index $KdB\_c$, which may be provided as a follow time $KdB\_c$. The value of at follow time $KdB\_c$ is calculated from the corrected evaluation index equation of equation 2. Therefore, in order to calculate the follow time $KdB\_c$, it is first necessary to determine the relative speed Vr1 with the lead vehicle, the speed Vp of the lead vehicle, and the inter-vehicle distance D.

The vehicle control ECU 10 acquires the speed Vp from the wireless communication unit 7, which regularly receives the speed Vp from the lead vehicle. The vehicle control ECU 10 may correspond to a lead vehicle information acquisition unit and a speed acquisition unit in claims. Further, the vehicle speed Vp of the lead vehicle (i.e., the subject vehicle speed Vo of the lead vehicle) and information of the steering angle $\Theta$ correspond to the lead vehicle information in claims.

The relative speed Vr1 is calculated from the subject vehicle speed Vo to be regularly acquired from VSC_ECU 1 and the speed Vp of the lead vehicle to be regularly acquired through the wireless communication unit 7. The vehicle control ECU 10 may correspond to a lead vehicle relative speed calculation unit in claims.

The inter-vehicle distance D may be determined by calculating the increase/decrease distance from the target inter-vehicle distance Dt from the regularly calculated relative speed Vr1. The vehicle control ECU 10 may correspond to an inter-vehicle distance detection unit in claims.

Based on the regularly determined variables described above, the follow time $KdB\_c$ is calculated regularly. The follow time $KdB\_c$ may correspond to a first corrected evaluation index, which represents a state of changing distance between the subject vehicle and the lead vehicle, and the vehicle control ECU 10 may correspond to a first evaluation index calculation unit in claims.

Further, for example, the relative speed Vr1 and the inter-vehicle distance D may be determined based on a signal from the radar 8. The speed Vp may be calculated from the subject vehicle speed Vo acquired from VSC_ECU 1 and the relative speed Vr1 determined based on a signal from the radar 8.

In the above, the relative speed Vr1, the speed Vp of the lead vehicle, and the inter-vehicle distance D may be determined based either on the vehicle information received by the wireless communication unit 7 or the signal from the radar 8. However, the values of the relative speed Vr1, the speed Vp of the lead vehicle, and the inter-vehicle distance D may be selectively determined based on the vehicle information derived received by the wireless communication unit 7 or based on the signal from the radar 8. For instance, while the lead vehicle is detected by the radar 8, the values may be determined based on the signal from the radar 8 of the subject vehicle. Whereas when the lead vehicle is not detected by the radar 8 (i.e., at a time of radar lost situation), the values may be determined based on the vehicle information received by the wireless communication unit 7. The radar lost situation may be caused when the lead vehicle enters a curve and escapes from a radar scan range of the radar 8.

Further, while the relative speed Vr1, the speed Vp of the lead vehicle, the inter-vehicle distance D may be continuously and regularly determined based on the vehicle information from received by wireless communication unit 7, these values may also be intermittently or sporadically determined based on the radar signal of the radar 8, for correcting the radar signal derived values by using the vehicle information derived values.

The vehicle control ECU 10 regularly calculates three thresholds, that is, the friction brake start threshold, the engine braking start threshold, and the acceleration control end threshold, when the lead vehicle follow travel control is being performed. These thresholds may be calculated from three threshold equations stored in the memory, that is, the friction brake start threshold equation, the engine braking start threshold equation, and the acceleration control end threshold equation, in addition to the current value of the inter-vehicle distance D. The friction brake start threshold and the engine braking start threshold may correspond to a first deceleration threshold in claims, and the acceleration control end threshold may correspond to a first acceleration threshold in claims.

Further, as for the first deceleration threshold in claims, either of the friction brake start threshold or the engine braking start threshold may be used. However, the engine braking start threshold may be used as an example. In addition, a common value may be used as the deceleration threshold and the acceleration threshold.

The vehicle control ECU 10 calculates, in the lead vehicle follow travel control, a follow time required deceleration, without regard to the follow time KdB_c, if the current inter-vehicle distance D is shorter than the target inter-vehicle distance Dt based on the comparison between those values, recognizing that friction braking by VSC_ECU 1 is required.

On the other hand, if the current inter-vehicle distance D is longer than the target inter-vehicle distance Dt, the follow time KdB_c is compared respectively with the friction brake start threshold, the engine braking start threshold, and the acceleration control end threshold. Such comparison may result in one of the cases (1) to (4) in the following. The vehicle control ECU 10 may correspond to a first deceleration target determination unit and a first acceleration target determination unit in claims.

The four cases are: (1) the value of the follow time KdB_c is greater than the friction brake start threshold, (2) the value of the follow time KdB_c is between the friction brake start threshold and the engine braking start threshold, (3) the value of the follow time KdB_c is between the engine braking start threshold and the acceleration control end threshold, and (4) the value of the follow time KdB_c is smaller than the acceleration control end threshold.

In case of (1), it is determined that the friction brake should be operated, with the calculation of the follow time required target deceleration.

In case of (2), it is determined that the engine braking should be performed, with the calculation of the follow time required target deceleration.

In case of (3), it is determined that the subject vehicle should be cruising at a constant speed, with the calculation of the follow time required target acceleration/deceleration (both of acceleration and deceleration are equal to 0).

In case of (4), it is determined that the subject vehicle should be accelerated, with the calculation of the follow time required target acceleration.

Therefore, the vehicle control ECU 10 may correspond to an adaptive deceleration calculation unit and an adaptive acceleration calculation unit in claims.

A follow time required $G_{Dp}1$ for the acceleration or deceleration of the subject vehicle may be calculated, for example, by equation 5 in the following. A plus value from equation 5 is a follow time required acceleration, and a minus value from equation 5 is the follow time required deceleration. When the $G_{Dp}1$ is equal to zero, the $G_{Dp}1$ may be designated as the follow time required acceleration.

$$G_{Dp}1 = (Vr1 Vr\_t1)/T \quad \text{(Equation 5)}$$

In the equation 5, Vr1 represents the relative speed of the subject vehicle relative to the lead vehicle as described above, and Vr_t1 represents a target relative speed to be calculated by using the follow time KdB_c derived from equation 2.

In other words, by substituting a value of follow time KdB_c in equation 2, the target value of relative speed Vr1 relative to the lead vehicle is calculated.

Further, T is a divisor for converting a difference between the relative speed Vr1 of the subject vehicle and the target relative speed Vr_t1 into the follow time required acceleration/deceleration $G_{Dp}1$, and may be arbitrarily set.

Further, the vehicle control ECU 10 performs a travel locus determination process based on the vehicle information regularly acquire through the wireless communication unit 7, where the vehicle information received includes the vehicle speed Vp and the steering angle $\Theta$ of the lead vehicle. The vehicle control ECU 10 may correspond to a travel locus determination unit in claims.

An example of the travel locus determination process is provided in the following. A start position of the subject vehicle at a certain time is determined as a start point in the two-dimensional coordinate system. An initial position of the lead vehicle, in the two-dimensional coordinate system, is provided as a position that is a detected distance in front of the start position. The detected distance corresponds to the inter-vehicle distance between the subject vehicle and the lead vehicle based on the signal from the radar 8. Based on the vehicle speed Vp and the steering angle $\Theta$ of the lead vehicle, which are regularly acquired, travel locus points after the initial position are regularly calculated for determining the travel locus of the lead vehicle.

To further estimate the initial position of the lead vehicle a distance traveled during a delay time is estimated. Specifically, the delay time is calculated from a delay of the signal from the radar 8, which is based on a radar signal acquisition time, and a delay of the acquisition of the vehicle information of the lead vehicle through the wireless communication unit 7, which is based on a vehicle information acquisition time. The vehicle speed Vp of the lead vehicle is used along with the delay time to determine the distance traveled by the lead vehicle during the delay time. The initial position of the lead vehicle is then provided by subtracting the distance traveled during the delay time from the detected distance by the radar 8.

Thereafter, the travel locus points are regularly calculated by (i) calculating the travel distance from the initial position of the lead vehicle based on the vehicle speed and the steering angle $\Theta$ of the lead vehicle acquired by the wireless communication unit 7 and (ii) calculating a travel direction based on the steering angle Θ. In this case, the start point may be a point other than the position of the subject vehicle.

Further, the vehicle control ECU 10 shall perform a current position acquisition process for acquiring a current position of the subject vehicle by calculating a current position of the subject vehicle in the two-dimensional coordinate based on the regularly-acquired subject vehicle's speed Vo from VSC_ECU 1 of the subject vehicle and the regularly-acquired steering angle Θ from the steering angle sensor 2 of the subject vehicle. the vehicle control ECU 10 may correspond to a current position acquisition unit in claims.

The vehicle control ECU 10 performs a road shape determination process for determining a shape of a road. According to (i) a start point that is defined as the current position of the subject vehicle and (ii) the travel locus of the lead vehicle that is determined by the travel locus determination process, a virtual shape of a road (i.e., virtual road shape) in front of the subject vehicle can be estimated. Therefore, the vehicle control ECU 10 may correspond to a virtual road shape determination unit in claims.

The shape of the road is estimated as a certain width from a center line that is the travel locus of the travel locus determination process. For instance, as the road width of 1.75 m from the center of the road to both of the right and left, the shape of the road may be estimated as a border of the virtual road. The road width to the right and the road width to the left from the center line may have respectively different values, and are not required to be the same. Further, the virtual road shape may be defined and estimated as a line on an outside of a curved road, based on the travel locus of the vehicle, having a certain distance (e.g., 1.75 m) in a vehicle width direction, that is, a virtually-defined road outside border.

Figure 2:
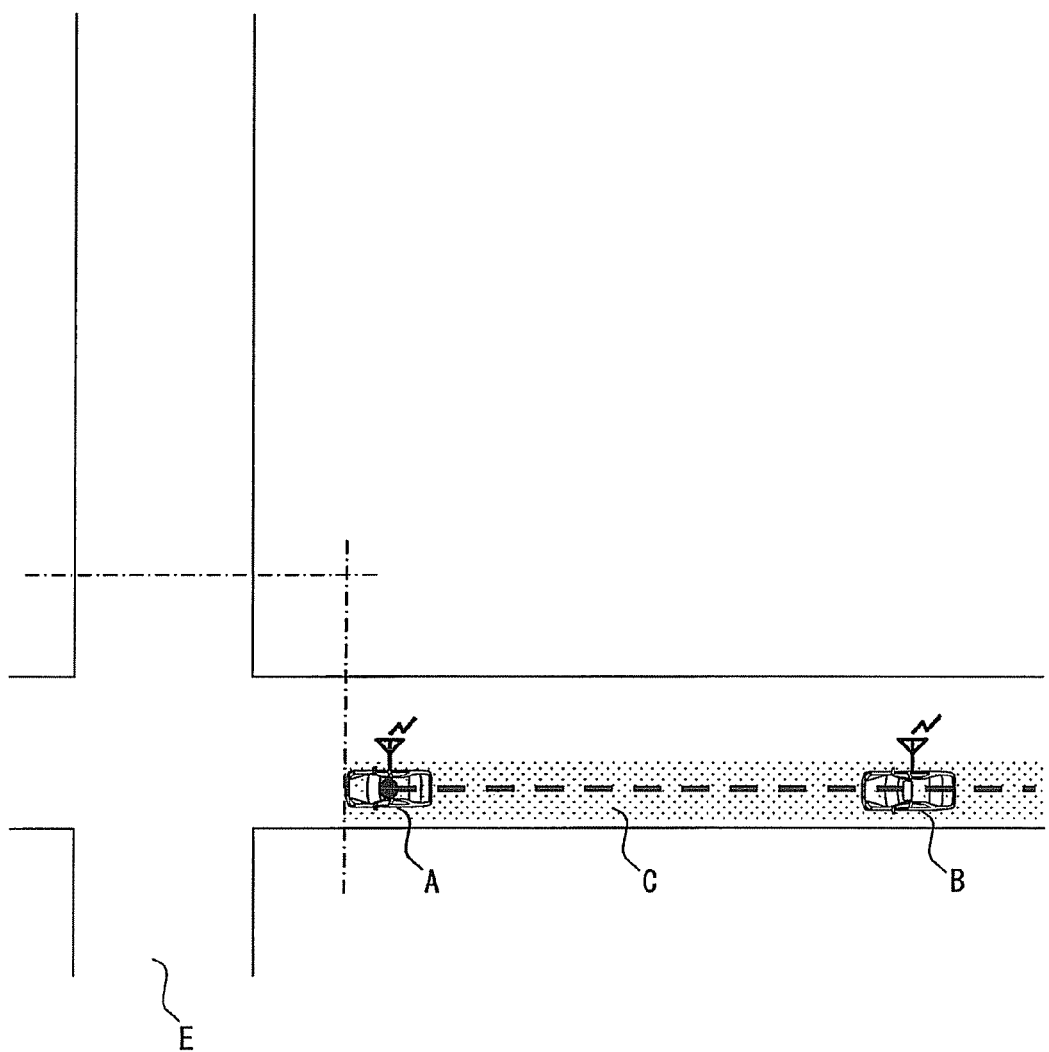
FIG. 2 is an illustration of a subject vehicle following a lead vehicle on a straight road.
Figure 3:
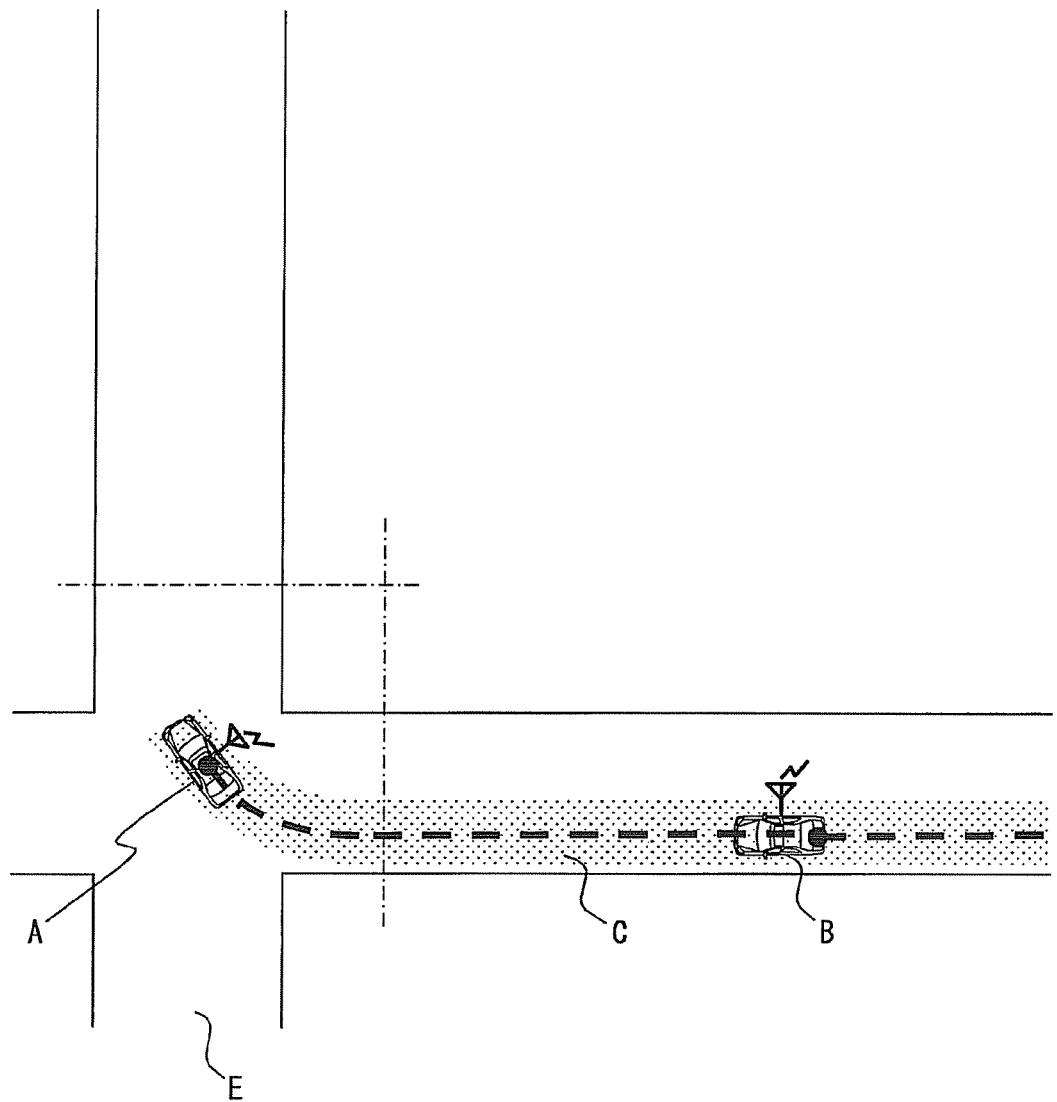
FIG. 3 is an illustration of the lead vehicle entering a curve road after traveling the straight road with the subject vehicle following thereafter.
Figure 4:
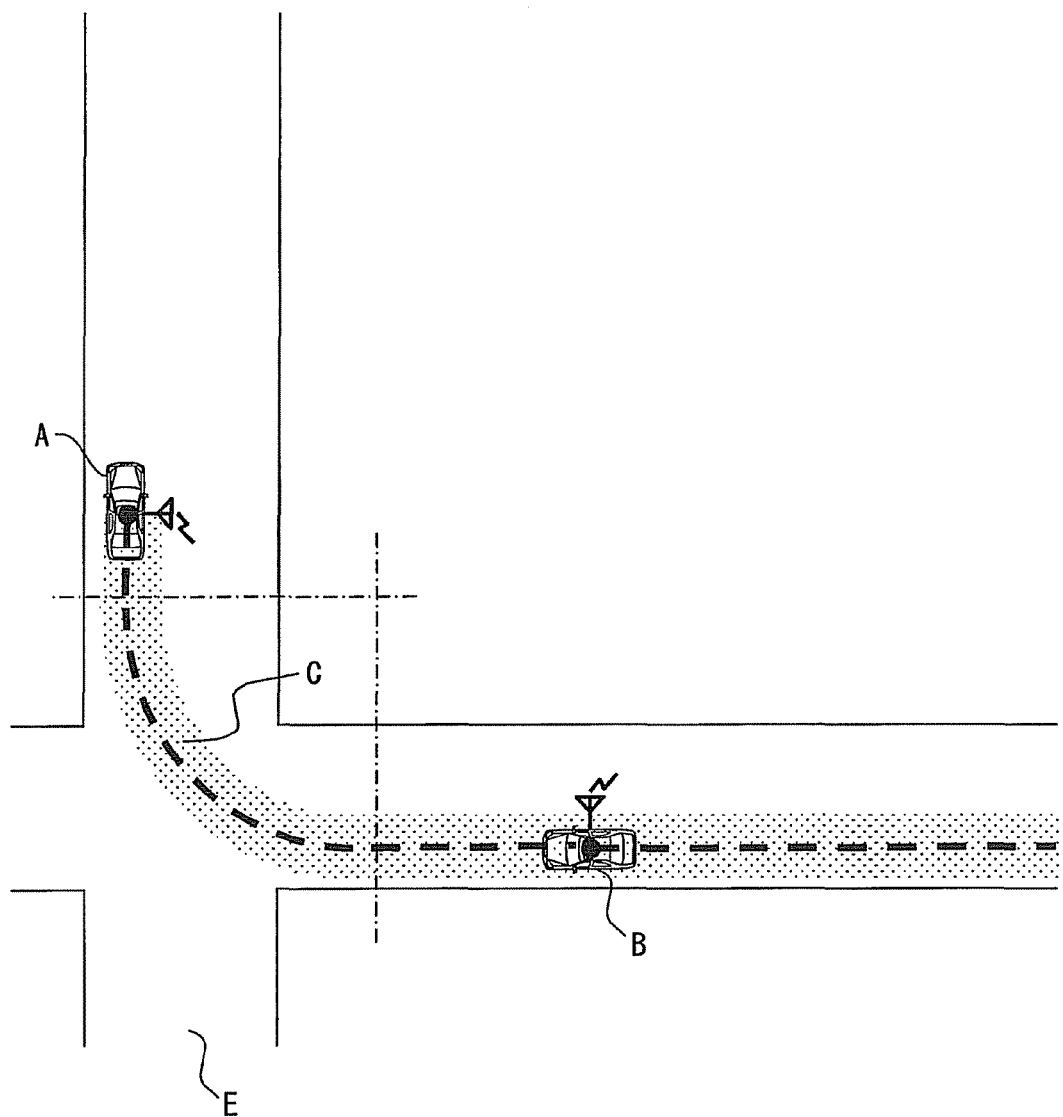
FIG. 4 is an illustration of the lead vehicle exiting the curve road of FIG. 3.

With reference to FIGS. 2 to 4, when the lead vehicle follow travel control is performed and the subject vehicle follows the lead vehicle, the determination of the travel locus of the lead vehicle by the travel locus determination process and the determination of the virtual road shape by the road shape determination process are performed.

FIG. 2 is an illustration of the subject vehicle following the lead vehicle on a straight road, and FIGS. 3 and 4 are illustrations of a situation where, after the travel of the subject vehicle following the lead vehicle on a straight road, the lead vehicle has entered a curve, or an intersection. In FIGS. 2-4, A is the lead vehicle, B is the subject vehicle, and a broken line is a determined travel locus. Further, C is a determined virtual road shape, and E is an actual road shape. The travel locus determination process may be started when the lead vehicle follow travel control is started, and may be finished when the lead vehicle follow travel control is finished.

The vehicle control ECU 10 performs a curve determination process to determine whether a curve road exists in front of the subject vehicle based on the virtual road shape in front of the subject vehicle which is determined by the road shape determination process. For example, when a portion of the virtual road shape within a certain distance in front of the subject vehicle has a curvature above a threshold value, it may be determined that a curve exists in front of the subject vehicle.

On the other hand, if the curvature of the virtual road shape does not is not above the threshold value, it may be determined that there is no curve in front of the subject vehicle.

Further, the curvature may be, in configuration, calculated based on an outside border of the virtual road shape. A certain distance in this case may be a distance where the subject vehicle can safely reduce its travel speed before entering a curve. Such distance may arbitrarily be set. Further, the threshold value of the curvature may be a value that corresponds to a road to be considered as a curve road, which may be arbitrarily set. Furthermore, the curvature may be calculated based on an inside border of the virtual road shape.

In the present embodiment, a curve road, or a curve, may be defined as a road having a virtual road shape that is estimated based on the travel locus of the lead vehicle, and is not only an actual curve road but also a virtual curve road in an intersection, for example, when the lead vehicle is turning right/left at an intersection.

When it is determined that a virtual curve road exists in front of the subject vehicle by the curve road determination process, the vehicle control ECU 10 calculates a curvature radius of the curve from the virtual road shape of the curve determined by the road shape determination process. The vehicle control ECU 10 may correspond to a curvature radius calculation unit in claims.

By dividing the shape of a curve into multiple sections, the curvature radius may be calculated for each of the multiple sections having a curve line. The curve of each section may be an outside border of the virtual road shape. Further, the curvature radius of a section of the curve road which includes an entrance or an entrance position of the curve road is determined, and is described later in detail.

When it is determined that a virtual curve road exists in front of the subject vehicle by the curve road determination process, the vehicle control ECU 10 performs an entrance determination process and an exit determination process for the determination of an entrance/exit position of the curve road. The vehicle control ECU 10 may correspond to an entrance determination unit and an exit determination unit in claims.

In the entrance determination process, the entrance position of curve road is determined based on the steering angle of the lead vehicle which is used to determine the travel locus of the lead vehicle. Specifically, as shown in FIG. 5, the vehicle control ECU 10 determines a point where the steering angle Θ reaches an entrance determination threshold Θi for the first time as the entrance position of the curve road.

In the exit determination process, the exit position of the curve road is determined based on the steering angle of the lead vehicle which is used to determine the travel locus of the lead vehicle in the curve road in front of the subject vehicle. Specifically, as shown in FIG. 5, the vehicle control ECU 10 determines, as an exit position of the curve road, a point where the steering angle Θ reaches an exit determination threshold Θo for the first time after reaching the entrance determination threshold Θi.

The entrance determination threshold Θi may be an arbitrary value that is equal to or greater than a steering angle which cannot be considered as a straight travel of the vehicle. The exit determination threshold Θo may be a value that is smaller than the threshold Θi in consideration of a hysteresis (i.e., hys in FIG. 5).

Figure 5:
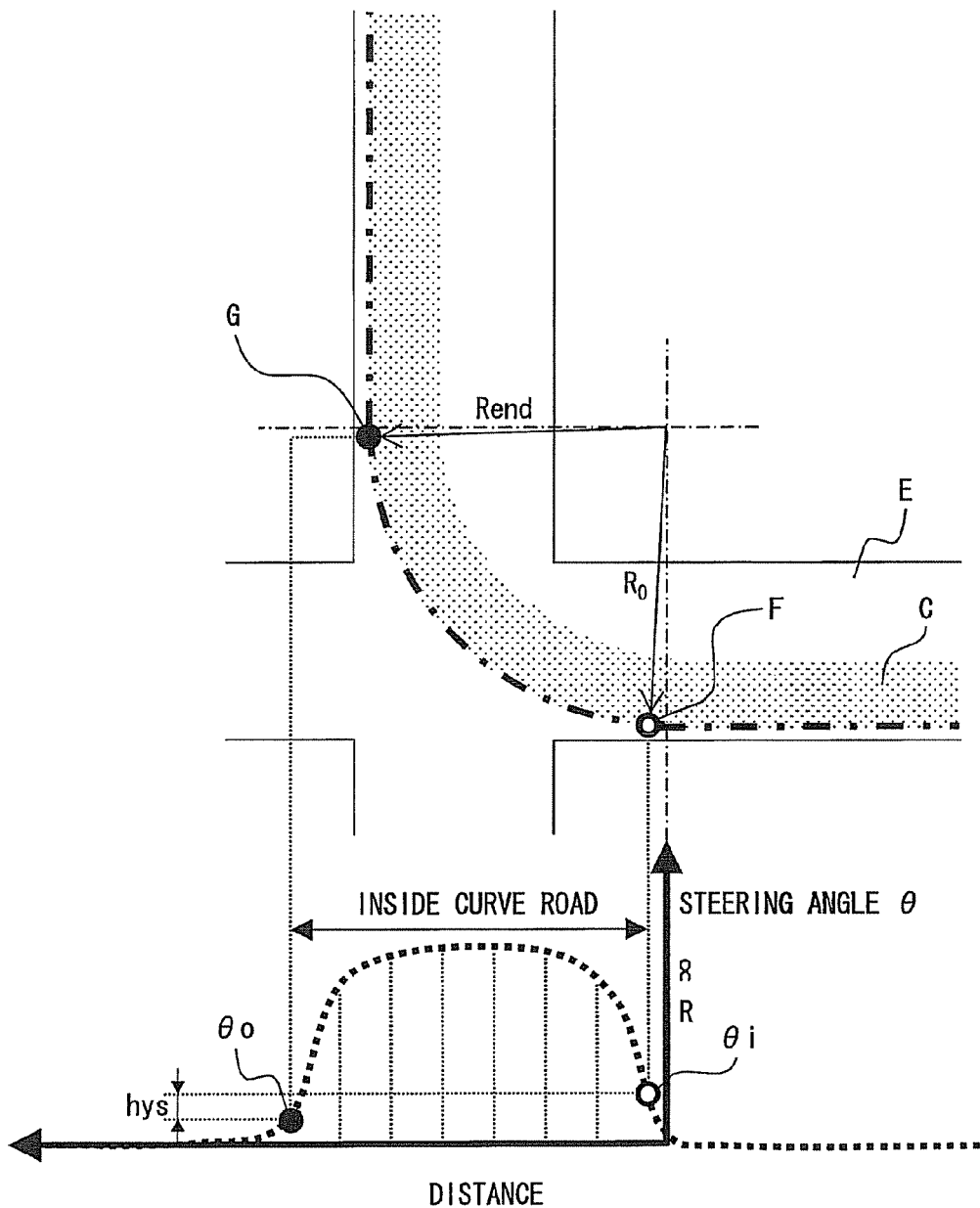
FIG. 5 is an illustration of a determination threshold at the entrance and the exit of the curve road of FIG. 3.

FIG. 5 illustrates how the entrance/exit determination threshold is determined for the curve road. A line C in FIG. 5 represents a virtual road shape, and a dashed line in FIG. 5 represents an outside border of the virtual road shape, and a dotted line represents a change of the steering angle Θ of the lead vehicle.

Further, R0 represents a curvature radius at the entrance position of the curve road, and Rend represents a curvature radius at the exit position of the curve road. Furthermore, F represents the entrance position, G represents the exit position, and E represents the actual road shape.

Figure 6:
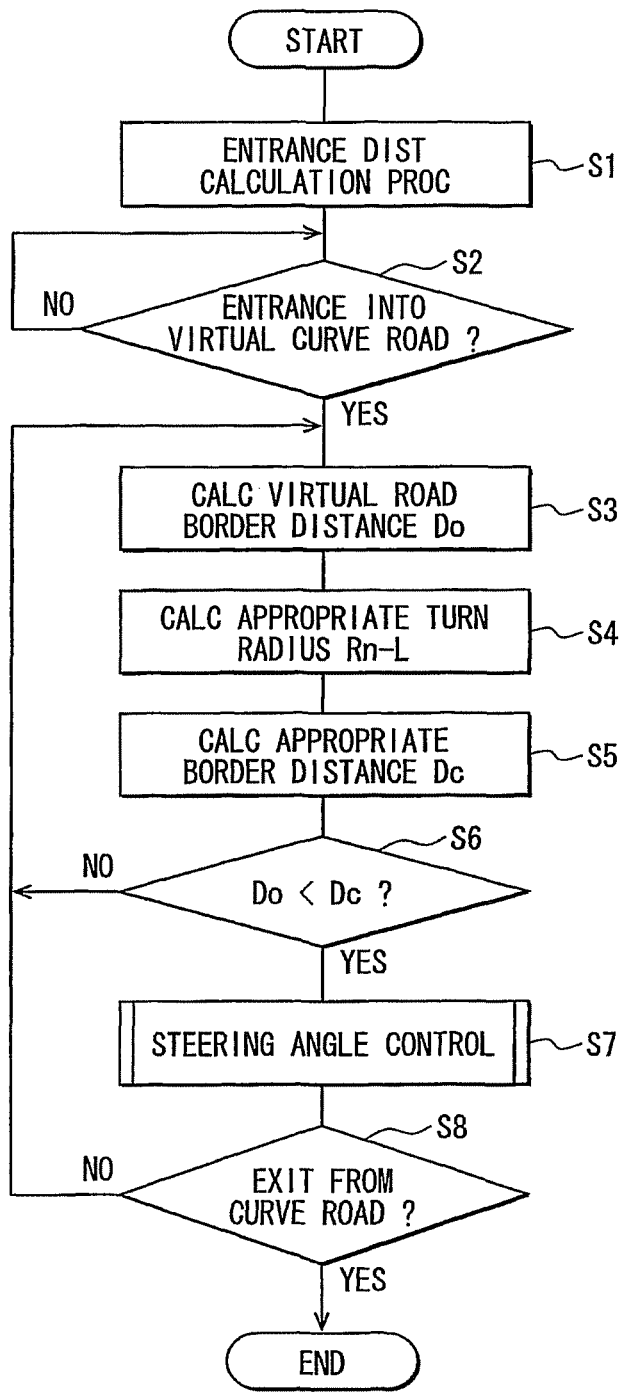
FIG. 6 is a flowchart of a steering angle control process performed by a vehicle control ECU in a first embodiment.

The vehicle control ECU 10 performs a steering angle control when the curve road determination process determines that a curve road exists in front of the subject vehicle and the subject vehicle is traveling on or will be traveling on such curve road. With reference to FIG. 6, a steering angle control process, which is performed by the vehicle control ECU 10, for controlling the steering angle is described. The steering angle control process is executed, when the entrance position of the curve road in front of the subject vehicle is determined by the entrance determination process.

Figure 7:
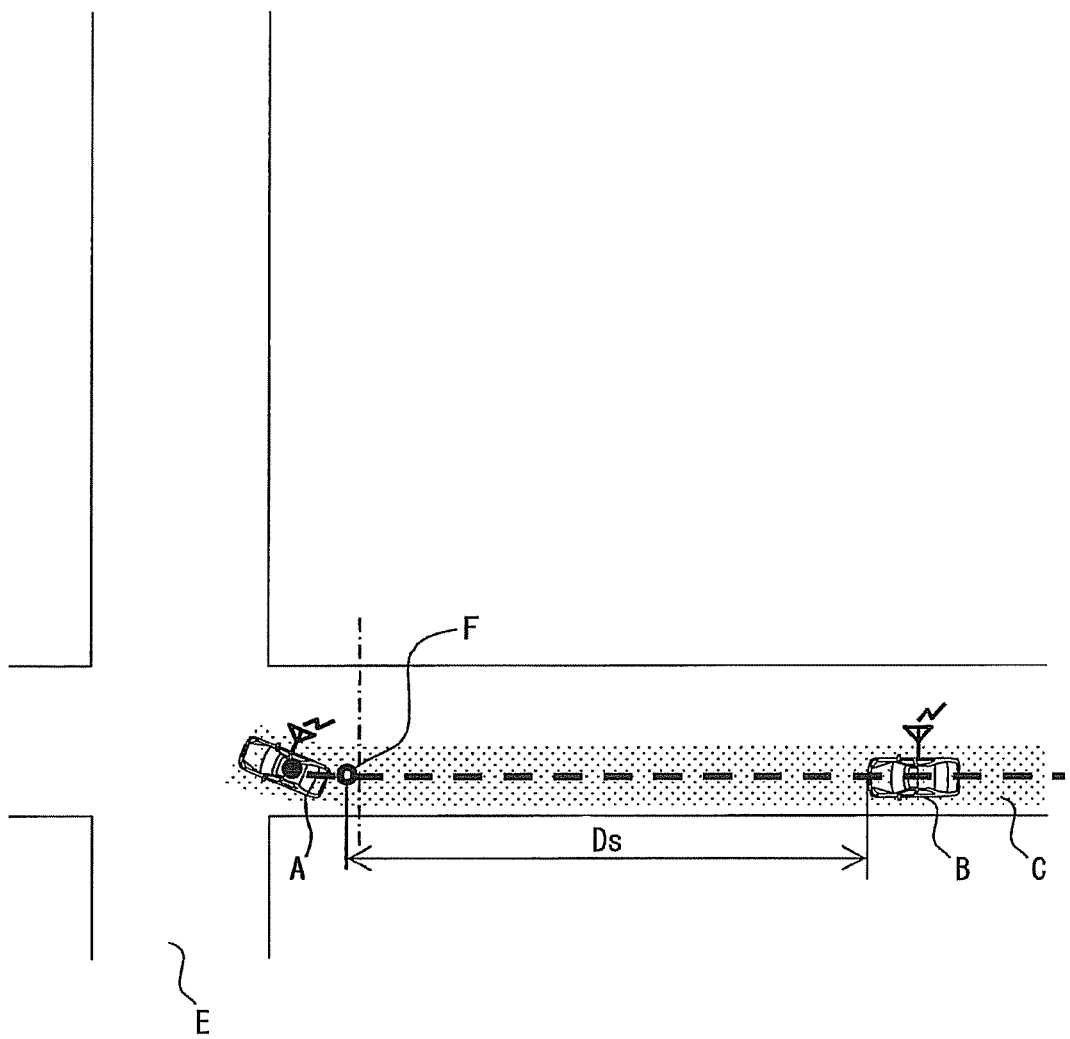
FIG. 7 is an illustration of a curve road entrance distance.

In S1, an entrance distance calculation process is performed The entrance distance calculation process calculates a curve road entrance distance Ds as a distance from the subject vehicle to the entrance of the curve road. FIG. 7 illustrates a distance Ds, where the lead vehicle is A, the subject vehicle is B, the virtual road shape is C, the actual road shape is E, the entrance position of the curve road is F, and a broken line is a travel locus of the lead vehicle. The distance Ds is then provided as a distance between the entrance position of the curve road (F), which is determined by the entrance determination process, and the current position of the subject vehicle (B), which is determined by the current position acquisition process. Accordingly, the vehicle control ECU 10 may correspond to an entrance distance calculation unit in claims.

After S1, the vehicle control unit ECU 10 proceeds to S2 to determine whether the subject vehicle has entered the virtual curve road based on the distance Ds from the entrance distance calculation process. The vehicle control ECU 10 may correspond to a curving determination unit in claims.

For instance, when the value of Ds is greater than zero, it is determined that the subject vehicle has not entered the virtual curve road, and, when the value of Ds is equal to or smaller than zero, it is determined that the subject vehicle has entered the virtual curve road. At a time of determining that the subject vehicle has entered the virtual curve road (S2. YES), the vehicle control unit ECU 10 proceeds to S3. When the subject vehicle has not entered the curve (S2, NO), the vehicle control unit ECU 10 repeats S2.

In S3, a virtual road border distance Do, which is a distance to the road border of the virtual curve road (i.e., a virtual road border, hereinafter) is calculated.

Figure 8:
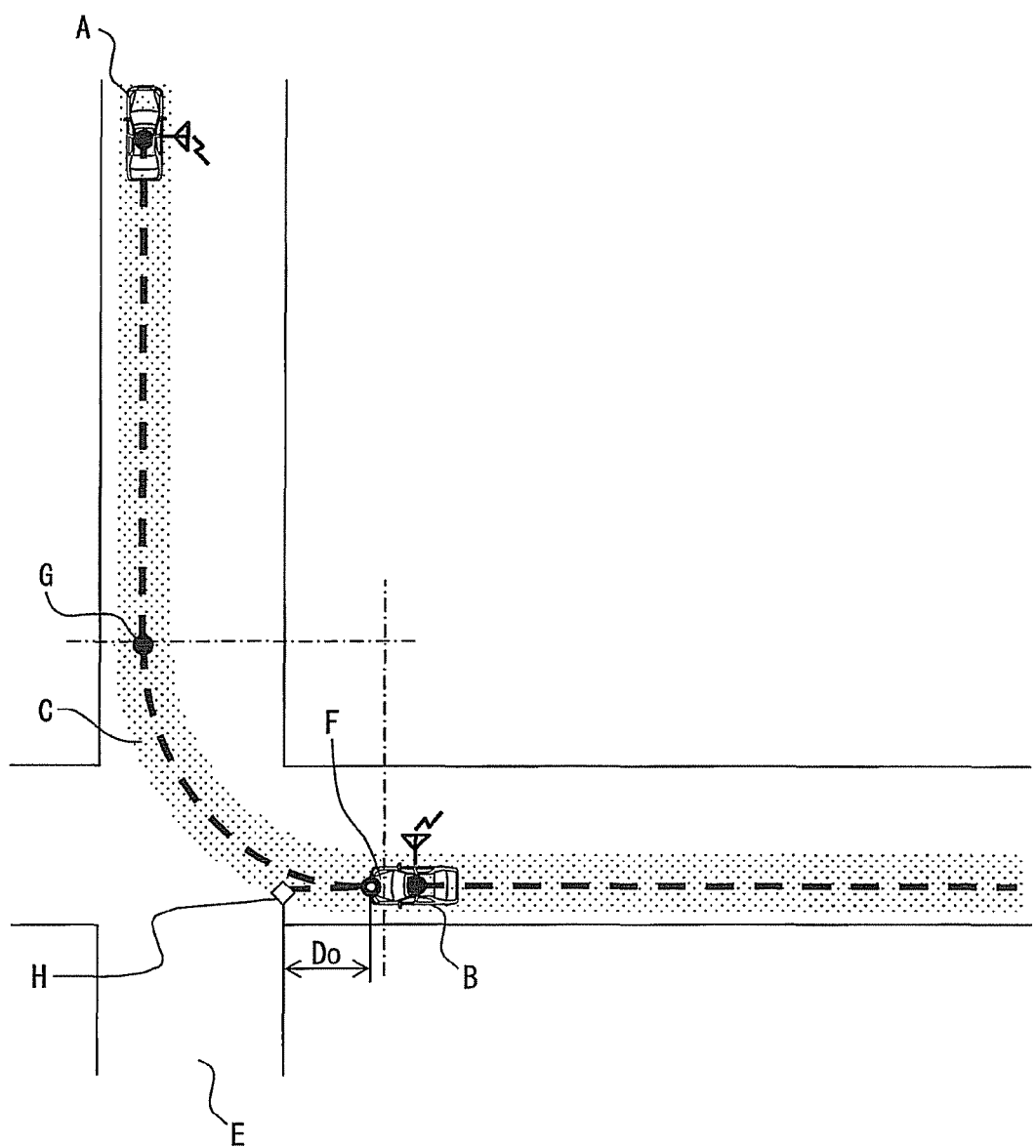
FIG. 8 is an illustration of a virtual road border distance.

The virtual road border distance Do is a distance from the subject vehicle (e.g., from a front end of the subject vehicle) to a virtual road border in front of the subject vehicle. For example, in FIG. 8, A is the lead vehicle, B is the subject vehicle. C is a virtual road shape, E is an actual road shape, F is the entrance position of the curve road, G is the exit position of the curve road, H is the virtual road border right in front of the subject vehicle, and a broken line is the travel locus of the lead vehicle. A travel direction of the subject vehicle is extended, as a straight line, from the front end of the subject vehicle (B) to cross the virtual road border (C), and the length of such line is measured as the distance Do.

The virtual road border distance Do may be configured to be calculated from the current position of the subject vehicle in the two-dimensional coordinate system and the virtual road shape. Specifically, the distance Do may be calculated as a distance from the current position of the subject vehicle to the virtual road border right in front of the subject vehicle. The vehicle control ECU 10 may correspond to a virtual road border distance calculation unit in claims.

After S3, the vehicle control ECU 10, in S4, calculates an appropriate turn radius Rn-L. The appropriate turn radius Rn-L may be configured to be calculated as a difference of distances, that is, a difference between (i) an outside curvature radius Rn at a travel position of the subject vehicle in the curve road and (ii) a distance L from a center line of the virtual road borders in a vehicle width direction. The vehicle control ECU 10 may correspond to a turn radius calculation unit in claims.

The outside curvature radius Rn is regularly calculated as described before based on the virtual road shape. Also, L is a sideway position of the subject vehicle relative to the virtual road borders, and is determined based on (i) a position of the subject vehicle acquired by the position acquisition process and (ii) a distance to the virtual road border. The vehicle control ECU 10 may correspond to an appropriate distance calculation unit in claims.

Though, in the present embodiment, the appropriate turn radius Rn-L is calculated by subtracting the distance L from the outside curvature radius Rn, such calculation may be changed to a different method. For example, the appropriate turn radius Rn-L may be calculated by adding the distance L to an inside curvature radius.

After S4, the vehicle control ECU 10, in S5, calculates an appropriate border distance Dc, which is an appropriate distance to the virtual road border. The appropriate border distance De is calculated by using equation 6. The appropriate border distance Dc indicates a distance from a front end of the subject vehicle to the virtual road border located right in front of the subject vehicle when the subject vehicle travels on a circular path having the appropriate turn radius Rn-L. The appropriate border distance Dc may correspond to an appropriate distance in claims.

$$Dc = \sqrt{Rn^2 - (Rn-L)^2} \quad \text{(Equation 6)}$$

In S6, the vehicle control ECU 10 compares the virtual road border distance Do, calculated in S3, with the appropriate border distance Dc, calculated in S5. Such comparison may be referred to as a steering angle propriety determination process. If the distance Do is shorter than the distance Dc (i.e., Do<Dc), the vehicle control ECU 10 determines that a steering angle is inappropriate, and proceeds to S7. If the distance Do is greater than or equal to the distance Dc (Do≥Dc), the vehicle control ECU 10 determines that a steering angle is appropriate, and the returns to S3 to repeat S3-S5 of FIG. 6.

Figure 9:
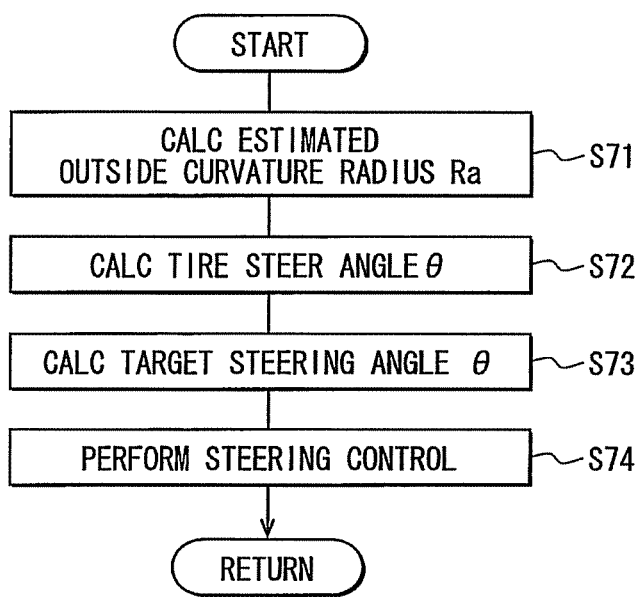
FIG. 9 is a flowchart of a steering angle control of FIG. 6.

In S7, the vehicle control ECU 10 performs a steering angle control, and proceeds to S8. With reference to FIG. 9, details of the steering angle control are described.

In S71, the vehicle control ECU 10 calculates an estimated outside curvature radius Ra by using equation 7, and proceeds to S72. In equation 7, De is the appropriate border distance, and L is the distance from a center line of the virtual road border in the vehicle width direction. Further, the estimated outside curvature radius Ra is an outside curvature radius for the steering angle control. In contrast, the outside curvature radius Rn is an outside curvature radius for the propriety determination of the steering angle. Further, equation 7 may be derived from the Pythagorean theorem about a right-angled triangle.

$$Ra = \frac{Dc^2 + L^2}{2 \times L} \quad \text{(Equation 7)}$$

The vehicle control ECU 10, in S72, calculates a tire steer angle θ by substituting the outside curvature radius Ra estimated in S71 in equation 8. The vehicle control ECU 10 may correspond to a tire steer angle calculation unit in claims. In equation 8, WB represents a vehicle wheelbase.

$$\theta = \frac{180 \times WB}{\pi \times (Ra - L)} [\text{deg}] \quad \text{(Equation 8)}$$

In S73, the vehicle control ECU 10 calculates a target steering angle Θ based on the tire steer angle θ by substituting the tire steer angle θ determined in S72 in equation 9. Further, in equation 9, N represents a ratio between the target steering angle Θ and the tire steer angle θ (i.e., a constant). The vehicle control ECU 10 may correspond to a steering angle calculation unit in claims.

$$\Theta = N \times \theta \quad \text{(Equation 9)}$$

In S74, the steering angle is actually changed (i.e., the steering control is performed). Specifically, the vehicle control ECU 10 transmits the target steering angle Θ calculated in S73 to the EPS_ECU 6. The EPS_ECU 6 controls the EPS actuator 11 while detecting a steering angle by the steering angle sensor 2, and changes the steering angle closer to the target steering angle Θ at a predetermined change speed. The EPS_ECU 6 may correspond to a steering unit in claims.

Figure 10:
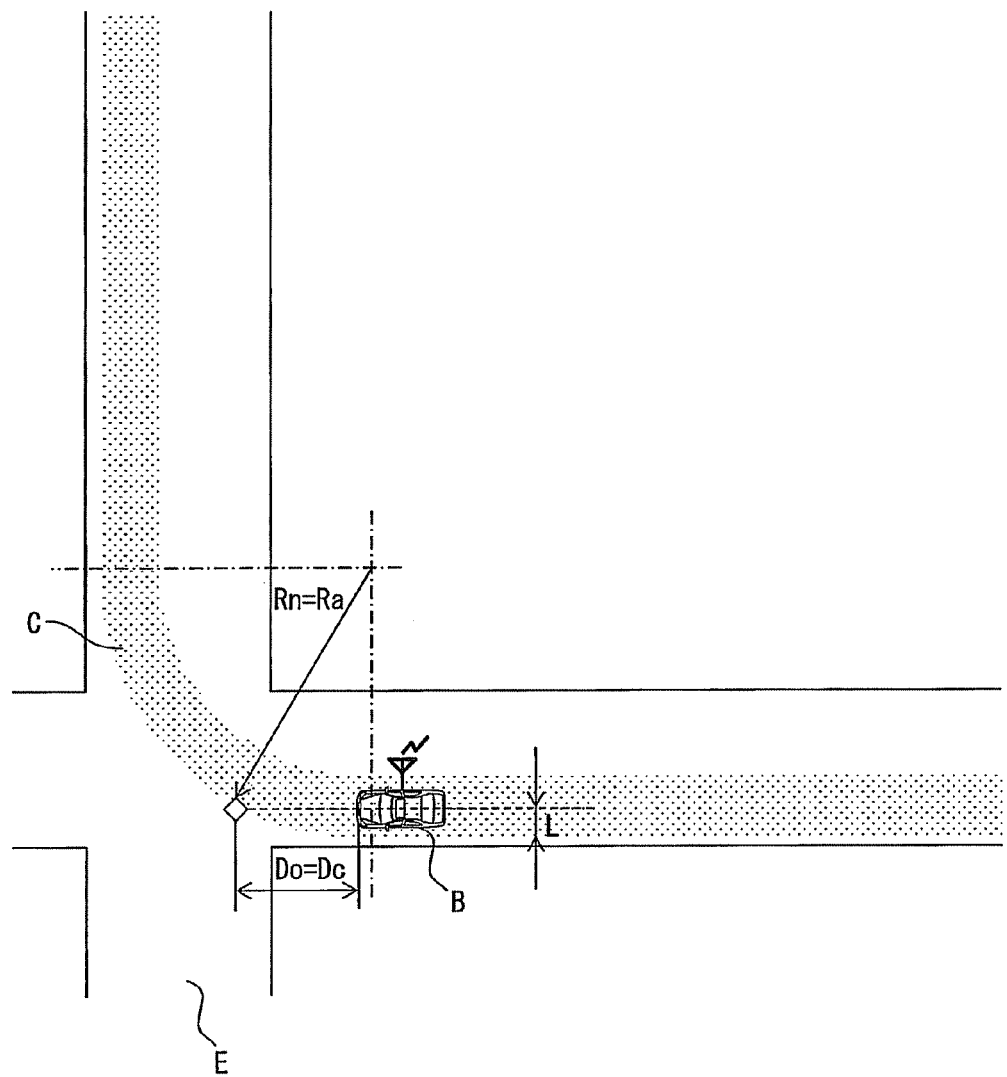
FIG. 10 is an illustration of a travel locus of the subject vehicle having an appropriate turn radius in a virtual curve road.
Figure 11:
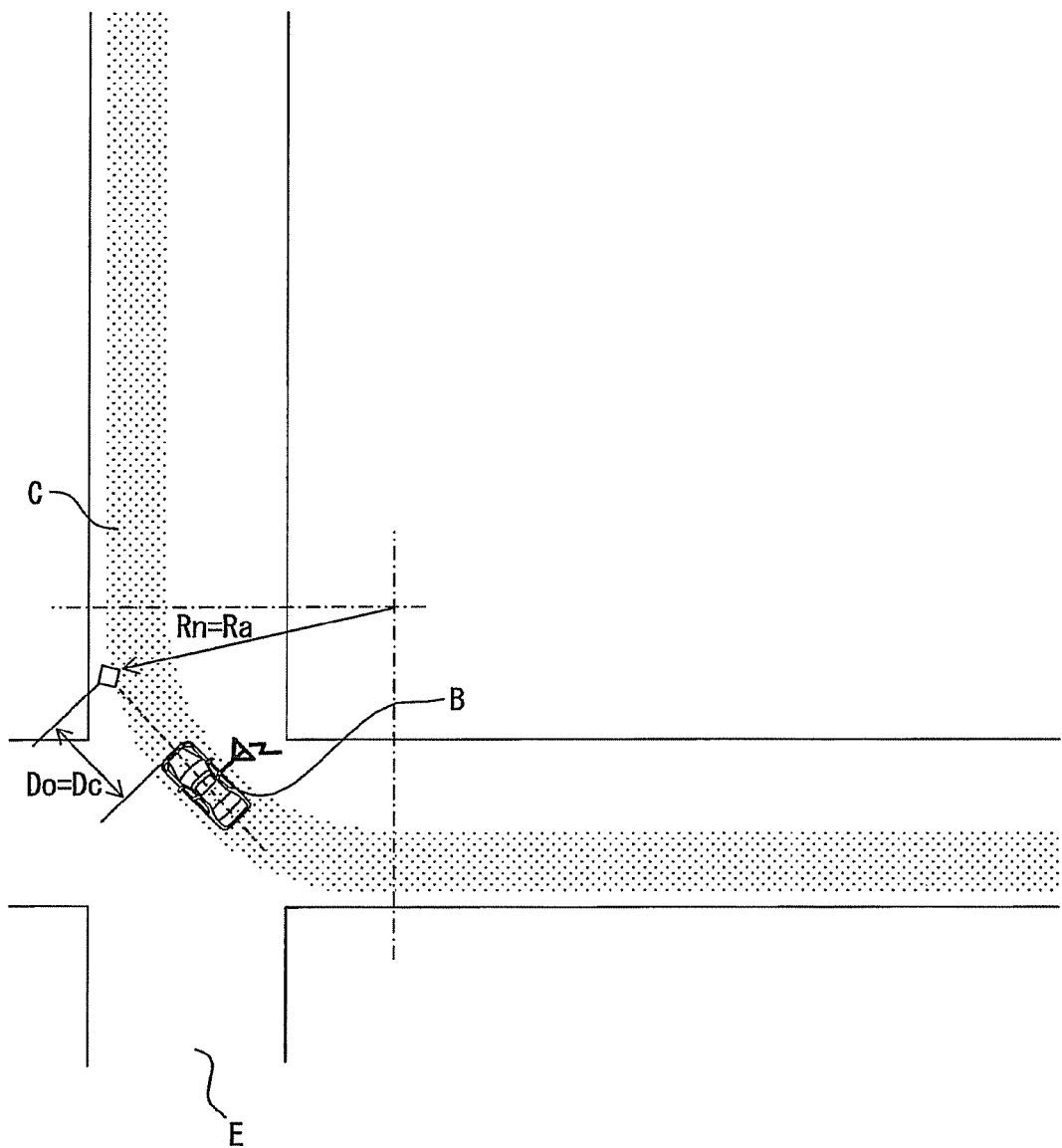
FIG. 11 is an illustration continuing from FIG. 10 of the travel locus of the subject vehicle having an appropriate turn radius in the virtual curve road.

When the virtual road border distance Do is equal to the appropriate border distance Dc (Do=Dc), the estimated outside curvature radius Ra matches the outside curvature radius Rn (i.e., Rn=Ra), thereby making the travel path of the vehicle to have an appropriate turn radius of the virtual curve road. FIGS. 10 and 11 respectively illustrate a situation where the vehicle path has an appropriate turn radius of the virtual curve road. In FIGS. 10 and 11, B is the subject vehicle, C is the determined virtual road shape, E is the actual road shape, and the broken line is the center line of the subject vehicle in the vehicle width direction.

Figure 12:
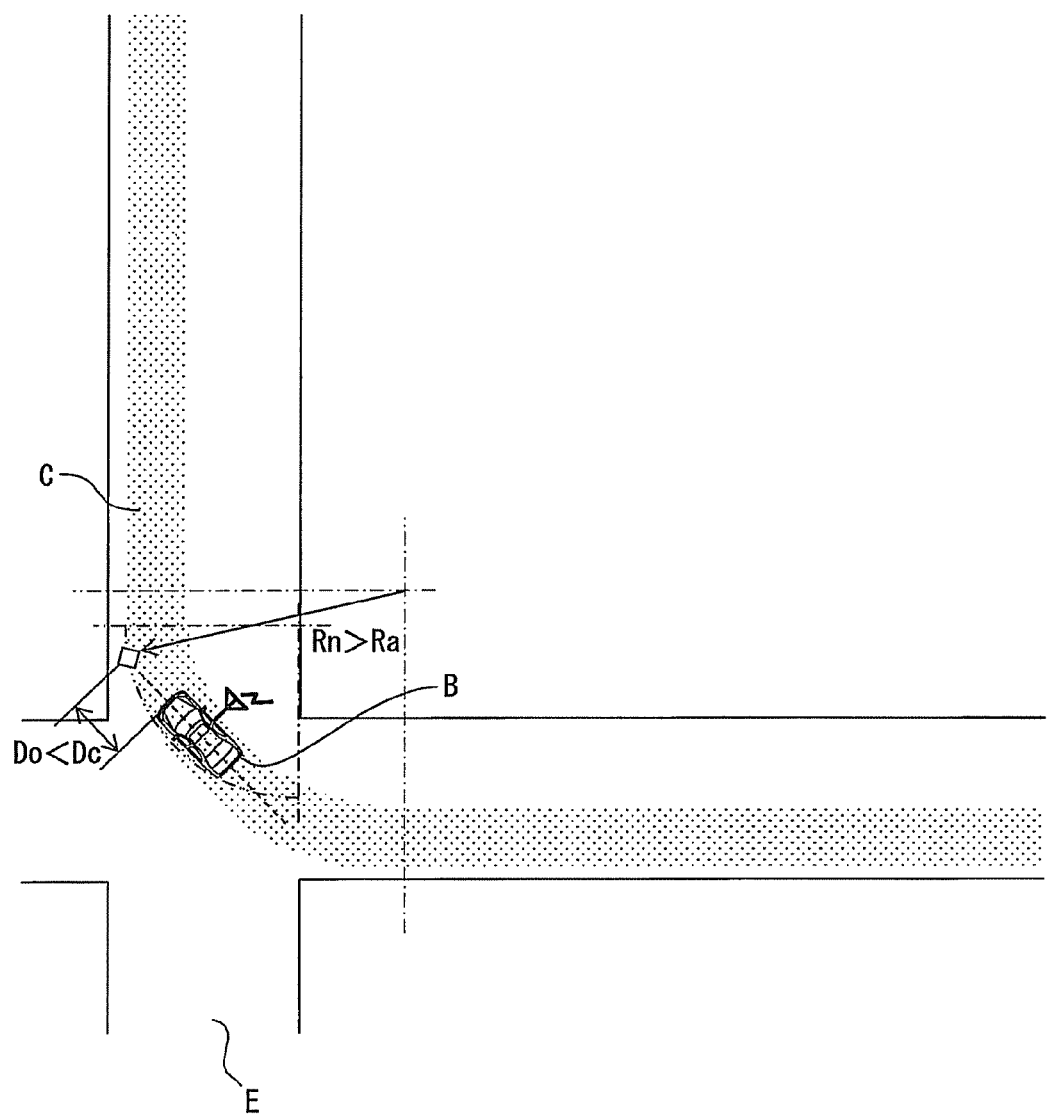
FIG. 12 is an illustration of a travel locus of the subject vehicle not having an appropriate turn radius in the virtual curve road.

On the other hand, when the virtual road border distance Do is smaller than the appropriate border distance Dc (i.e., Do<Dc) due to the delay of turning the steering wheel, the estimated outside curvature radius Ra becomes smaller than the outside curvature radius Rn (i.e., Rn>Ra), and the travel path of the vehicle deviates from the appropriate turn radius of the virtual curve road. FIG. 12 is an illustration of a vehicle deviating from the appropriate turn radius of the virtual curve road. In FIG. 12, B is the subject vehicle, C is the determined virtual road shape, E is the actual road shape, and the broken line is a centerline of the subject vehicle in the vehicle width direction.

In FIG. 12 where the virtual road border distance Do becomes smaller than the appropriate border distance Dc, the virtual road border distance Do is adjusted to the appropriate border distance Dc by performing an automatic control of the steering angle for controlling the steering angle to match the target steering angle Θ. As a result, the travel path of the vehicle is automatically controlled to have the appropriate turn radius of the virtual curve road, and the vehicle traveling in the virtual curve road is enabled to keep a travel path having the appropriate turn radius.

In S8 of FIG. 6, the vehicle control ECU 10 determines whether the subject vehicle has exited from the virtual curve road based on the exit position of the virtual curve road determined by the exit determination process. The current position of the subject vehicle is acquired by the current position acquisition process, as previously described. The determination in S8 may be referred to as a curve road exit determination process.

When the subject vehicle's position is beyond the exit position of the virtual curve road, it is determined that the subject vehicle has exited from the virtual curve road, and, when the subject vehicle's position is not beyond the exit position of the virtual curve road, it is determined that the subject vehicle has not exited from the virtual curve road. If the subject vehicle has exited from the virtual curve road (S8, YES), the process of FIG. 6 is concluded. If the subject vehicle has not exited from the virtual curve road (S8, NO), the vehicle control ECU 10 returns to S3.

In the above-described configuration, the vehicle control ECU 10 of the subject vehicle determines the travel locus of the lead vehicle based on a speed and a steering angle of the lead vehicle received by the wireless communication unit 7. Based on the travel locus, a virtual road shape right in front of the subject vehicle is determined.

When a vehicle has a wireless communication unit 7, vehicle-to-vehicle communication is enabled, thereby allowing the vehicle to receive the speed and the steering angle of other vehicles to which the vehicle is in v-to-v communication. Therefore, by using a CPU, the vehicle is able to determine the road shape right in front of the vehicle based on the speed and the steering angle received. Therefore, according to the above-described configuration, a system configuration for determining a road shape in front of the subject vehicle is simplified.

Since the steering angle control is performed based on the outside curvature radius Rn of the virtual curve road, which is calculated according to the virtual road shape based on the travel locus of the lead vehicle, the outside curvature radius Rn is accurately calculated based on an actual travel of the lead vehicle. Or a travel locus of the actual travel of the lead vehicle, traveling a curve line of the curve road. Therefore, the control of the steering angle for the travel of the curve road is highly accurately performed based on the outside curvature radius Rn of the curve road.

In addition, since the steering angle control is performed based on the outside curvature radius Rn of the virtual curve road, which is calculated according to the virtual road shape based on the travel locus of the followee lead vehicle, the control of the steering angle for the travel of the curve road is highly accurately performed even when there is no outer border line of the curve road or even when there is no road facility around the outer road border of the curve road. For example, when the lead vehicle turns at an intersection to the right/left, there is no road border defining a turn of the lead vehicle or no built-in road facility along an intersection-turning curve of the lead vehicle. Even in such case, the steering angle control of the subject vehicle for the travel of the curve road is highly accurately performed.

In the above-described embodiment, the steering angle is automatically controlled when the distance Do is smaller than the distance Dc. However, such configuration may be changed. For example, when the distance Do is smaller than the distance Dc, a steering angle warning may be provided for warning the driver that the steering angle is inappropriate, from a display unit and/or a speaker. Further, based on a value of the target steering angle Θ, a steering direction to match the steering angle to an appropriate steering angle may be calculated by the vehicle control ECU 10 and may be presented to the driver from a display unit and/or a speaker.

Instead of controlling the traveling path of the subject vehicle to have the appropriate turn radius, the automatic control of the steering angle may be as a steering assist For instance, by outputting a steering assist torque in a steering direction to match the steering angle with the appropriate angle, or by generating a steering assist yaw rate that steers the steering wheel in the steering direction based on a brake control, such automatic control of the steering angle may be enabled to provide the steering assist. Further, by outputting a steering torque that makes it difficult to steer the steering wheel in an opposite direction of the expected steering direction, the similar effects may be achieved.

When it is determined that a curve road exists in front of the subject vehicle in the curve road determination process, the vehicle control ECU 10 performs an acceleration control or a deceleration control depending on the position of the subject vehicle relative to the detected curve road. Specifically, whether the subject vehicle is in the curve road or is outside of the curve road.

vehicle relative to the entrance position of the virtual curve road (i.e., a curve entrance relative speed Vr2).

The curve entrance relative speed Vr2 is calculated by the following equation 11, since it is a difference between the target curving speed Vt1 and the subject vehicle speed Vo. The vehicle control ECU 10 may correspond to a curve entrance relative speed calculation unit in claims.

$$Vr2 = Vt1 - Vo \quad \text{(Equation 11)}$$

Further, the first curve time KdB_c is calculated from the evaluation index calculation equation of equation 12.

$$\begin{cases} KdB\_c(a) = 10 \times \log_{10}\left(\left|4 \times 10^7 \times \frac{Vr2 - aVt1}{Ds^3}\right|\right) \text{sgn}(-Vr2) & \left(\left|\frac{4 \times 10^7 \times}{\frac{Vr2 - aVt1}{Ds^3}}\right|\right) > 1 \\ 0 & \left(\left|\frac{4 \times 10^7 \times}{\frac{Vr2 - aVt1}{Ds^3}}\right|\right) \le 1 \end{cases} \quad \text{(Equation 12)}$$

Figure 13:
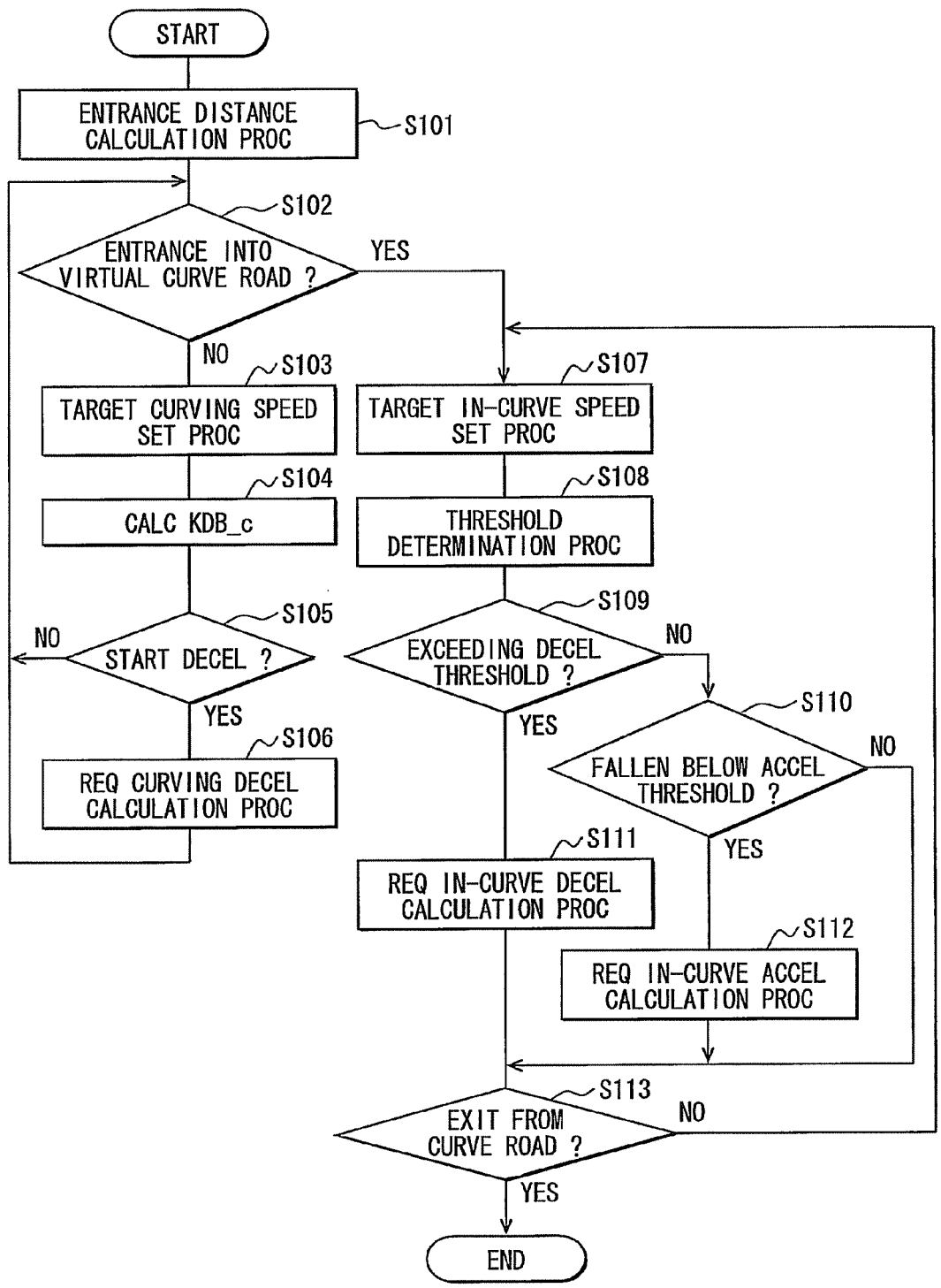
FIG. 13 is a flowchart of a curve time control process performed by the vehicle control ECU.

With reference to FIG. 13, a curve time control is described. The vehicle control ECU 10 performs the process of FIG. 13 to provide the curve time control.

The process of FIG. 13 is started when the entrance position of the curve road is determined in front of the subject vehicle by the entrance determination process. Further, the process of the curve time control may be performed in parallel with the steering angle control process described above.

Similar to the steering angle control process of FIG. 6, the vehicle control ECU 10 performs the entrance distance calculation process in S101, and in S102 determines whether the vehicle has entered the virtual curve road. Therefore, S101 and S102 of the curving determination process is the same as S1 and S2, respectively, of the steering angle control process of FIG. 6.

Subsequently, when the subject vehicle has entered the virtual curve road (S102, YES), the vehicle control ECU 10, in S107, performs a target in-curve speed set process. On the other hand, when the subject vehicle has not entered the virtual curve road, the vehicle control ECU 10, in S103, performs a target curving speed set process.

In S103, from among travel speeds for traveling the virtual curve road, the vehicle control ECU 10 performs the target curving speed set process to set a target curving speed Vt1 (i.e., a target speed) for passing the entrance position of the virtual curve road. Such target curving speed Vt1 is set based on (i) the curvature radius R0 at the entrance position of the virtual curve road and (ii) a target side acceleration Gyt, a preset value that is targeted when the subject vehicle travels the virtual curve road. The target curving speed Vt1 is calculated by the following equation 10.

$$Vt1 = \sqrt{R0 \times Gyt} \quad \text{(Equation 10)}$$

In a sense, the vehicle control ECU 10 sets the calculated speed as the target curving speed Vt1, which is used as a curve approach speed. The vehicle control ECU 10 may correspond to a target curving speed set unit in claims.

Though the target side acceleration Gyt may have a preset value, in this case, the value of Gyt in the present embodiment is input by the driver from the operation switch SW 9 in advance.

In S104, the vehicle control ECU 10 calculates a current value of the corrected evaluation index KdB_c (i.e., a first curve time KdB_c) in consideration of the curve road entrance distance Ds and the relative speed of the subject The above-described equation 2 is already proven to represent a deceleration start timing for the driver of the subject vehicle when there exists a lead vehicle. Further, equation 12 uses the curve road entrance distance Ds in place of the distance D, and uses the target curving speed Vt1 in place of the speed Vp, and uses the curve entrance relative speed Vr2, which is a difference between the speed Vt1 and the subject vehicle speed Vo in place of the speed Vr1, thereby respectively replacing the variables in equation 2. Therefore, equation 12 is considered as representing a condition for starting the deceleration operation by the driver, so as to decelerate the subject vehicle speed Vo at the entrance position of the virtual curve road to the target curving speed Vt1.

Further, equation 12 represents an index of a state of changing distance relative to the entrance position of the virtual curve road of the target curving speed Vt1. Therefore, such index increases when the curve entrance relative speed Vr2 increases, and the increase curve of such index becomes steeper when the distance Ds to the entrance position of the virtual curve road decreases. Therefore, the first curve time KdB_c corresponds to a second corrected evaluation index in claims, and the vehicle control ECU 10 corresponds to a second evaluation index calculation unit in claims.

The vehicle control ECU 10, in S105, determines whether to start the deceleration of the subject vehicle or, in other words whether the subject vehicle has reached a deceleration start point. Specifically, the vehicle control ECU 10 determines whether the first curve time KdB_c calculated, in S104, has exceeded a deceleration threshold that is calculated by the brake determination equation of equation 4, where the distance Ds replaces the distance D.

The deceleration threshold is a value to be provided by substituting the current curve road entrance distance Ds for the brake determination equation concerned. Therefore, the deceleration threshold corresponds to a second deceleration threshold in claims, and the vehicle control ECU 10 corresponds to a deceleration start determination unit in claims.

When the first curve time KdB_c exceeds the deceleration threshold (S105, YES), the vehicle control ECU 10 proceeds to S106 such threshold. On the other hand, when the first curve time KdB_c does not exceed the deceleration threshold (S105. NO), the vehicle control ECU 10 returns to S102.

In S106, the vehicle control ECU 10 performs a required curving deceleration calculation process. The required curving deceleration calculation process calculates a required curving deceleration $G_{Dp}2$ by using equation for the deceleration of the subject vehicle at a time of entering the curve road. The vehicle control ECU 10 may correspond to a curve road deceleration calculation unit in claims.

$$G_{Dp}2 = (Vr2 - Vr\_t2)/T \quad \text{(Equation 13)}$$

In equation 13, Vr2 represents the curve entrance relative speed described above, and Vr_t2 is a target relative speed that is calculated by substituting a value of the first curve time KdB_c at the distance Ds to the entrance position of the virtual curve road in equation 14. In other words, it is the targeted value of the curve entrance relative speed Vr2, which is calculated by substituting a value of the first curve time KdB_c for equation 14. Further, T is a divisor for converting a difference between the curve entrance relative speed Vr2 and the target relative speed Vr_t2 into the required curving deceleration $G_{Dp}2$, and may be arbitrarily set.

$$KdB\_c(a) = 10 \times \log_{10}\left(\left|4 \times 10^7 \times \frac{Vr2 - aVt1}{Ds^3}\right|\right) \quad \text{(Equation 14)}$$

The required curving deceleration $G_{Dp}2$ is regularly calculated and output after passing the deceleration start point, for the deceleration control to decelerate the subject vehicle speed Vo to the target curving speed Vt1 when the subject vehicle reaches the entrance position of the virtual curve road. In such manner, when the subject vehicle has reached the entrance position of the virtual curve road, the subject vehicle speed Vo is reduced to the target curving speed Vt1.

In S107, the vehicle control ECU 10 performs a target in-curve speed set process to set a target in-curve speed Vt2. Specifically, from among travel speeds for traveling the virtual curve road, a target speed for traveling the virtual curve road is selected and set. Such target in-curve speed is set based on (i) the outside curvature radius Rn at the travel position of the subject vehicle in the virtual curve road and (ii) the target side acceleration Gyt described above. The target in-curve speed Vt2 is calculated by the following equation 15.

$$Vt2 = \sqrt{Rn \times Gyt} \quad \text{(Equation 15)}$$

The outside curvature radius Rn is regularly calculated from the virtual road shape as described above. Specifically, the outside curvature radius Rn for each point in the virtual curve road may be calculated based on the road shape of the virtual curve road determined by the vehicle information acquired from the lead vehicle traveling the virtual curve road.

In S108, the vehicle control ECU 10 performs a threshold determination process. In the threshold determination process, the vehicle control ECU 10 calculates a current value of the corrected evaluation index KdB_c (i.e., a second curve time KdB_c) in consideration of (i) a difference between the virtual road border distance Do and the appropriate border distance Dc and (ii) the relative speed of the subject vehicle relative to the virtual road border (i.e., a curve border relative speed Vr3). The virtual road border distance Do may be calculated just like S3 of FIG. 6, and the appropriate border distance Dc may be calculated just like S5 of FIG. 6.

The curve border target relative speed Vr3 is a difference of two speeds, that is, the target in-curve speed Vt2 and the subject vehicle speed Vo, and is calculated by an equation of Vr3=Vt2−Vo. Therefore, the vehicle control ECU 10 may correspond to a curve border relative speed calculation unit in claims.

Further, the second curve time KdB_c is calculated from the evaluation index calculation equation shown in equation 16 in the following.

$$KdB\_c(a) = 10 \times \log_{10}\left(\left|4 \times 10^7 \times \frac{Vr3 - aVt2}{(Do - Dc)^3}\right|\right) \quad \text{(Equation 16)}$$

The above-described equation 2 is proven to represent a deceleration start timing for the driver of the subject vehicle when there exists a lead vehicle.

Further, equation 16 replaces the variables in the equation 2, by using: a difference Do−Dc in place of the distance D; the target in-curve speed Vt2 in place of the speed Vp; and the curve border relative speed Vr3, which is a difference between the speed Vt2 and the subject vehicle speed Vo, in place of the speed Vr1. The equation 16 may be considered as representing a condition for starting the deceleration operation by the driver, so as to decelerate the subject vehicle speed Vo at the appropriate border distance Dc to the target in-curve speed Vt2.

Equation 16 represents an index of a state of changing distance relative to the virtual road border, or more specifically to a position having the appropriate border distance Dc to the virtual road border, in consideration of the target in-curve speed Vt2. Therefore, such index increases when the curve border relative speed Vr3 increases, and the increase curve (i.e., a slope) of such index becomes steeper when the difference Do−Dc decreases. Therefore, the second curve time KdB_c corresponds to a third corrected closeness evaluation index in claims, and the vehicle control ECU 10 corresponds to a third evaluation index calculation unit in claims.

For the determination of whether to start the deceleration of the subject vehicle, the vehicle control ECU 10, in S109, determines whether the calculated second curve time evaluation KdB_c has exceeded the deceleration threshold or has fallen below the acceleration threshold. The deceleration or acceleration threshold may be calculated by the brake determination equation (i.e., equation 4 having the offset value) with the replacement of D with the difference (Do−Dc). Therefore, such deceleration threshold corresponds to a third deceleration threshold in claims, and the acceleration threshold corresponds to a second acceleration threshold in claims, and the vehicle control ECU 10 corresponds to a second deceleration target determination unit and a second acceleration target determination unit in claims.

Though the deceleration threshold may be a threshold for starting the friction brake or a threshold for starting the engine braking, the deceleration threshold in the present embodiment may be the engine braking threshold. Further, the deceleration threshold and the acceleration threshold may be the same value.

Accordingly, when the second curve time KdB_c has exceeded the deceleration threshold (S109. YES), the vehicle control ECU 10 proceeds to S111. Whereas, when the second curve time KdB_c has not exceeded the deceleration threshold (S109, NO), the vehicle control ECU 10 proceeds to S110.

In step S110, the vehicle control ECU 10 determines whether the second curve time KdB_c has fallen below the acceleration threshold. If the second curve time KdB_c has fallen below the acceleration threshold (S110, YES), the vehicle control ECU 10 proceeds S112. Otherwise (S110, NO), the vehicle control ECU 10 determines the required acceleration/deceleration as 0 (e.g., a required in-curve acceleration=0), and proceeds to S113.

In S111, the vehicle control ECU 10 performs a required in-curve deceleration calculation process. The required in-curve deceleration calculation process calculates a required deceleration $G_{Dp}3$ (i.e., a required in-curve deceleration having a minus value (−)) for the deceleration of the subject vehicle by using equation 17.

$$G_{Dp}3 = (Vr3 - Vr\_t3)/T \qquad \text{(Equation 17)}$$

In equation 17 Vr3 represents the curve border relative speed described above, and Vr_t3 is a target relative speed to be calculated by substituting the second curve time KdB_c in equation 2, where the second curve time KdB_c is derived from the brake determination equation 4 with its D being replaced with the difference (Do−Dc). In other words, Vr_t3 is a target value of the curve border relative speed Vr3, which is calculated by substituting a value of the second curve time KdB_c for equation 17.

Further, T is a divisor for converting a difference between the curve border relative speed Vr3 and the target relative speed Vr_t3 into the required in-curve deceleration $G_{Dp}3$, and such T may be arbitrarily set.

In S112, the vehicle control ECU 10 performs a required in-curve acceleration calculation process. The required in-curve acceleration calculation process calculates a required acceleration $G_{Dp}3$ (i.e., a required in-curve acceleration having a plus value (+)) for the acceleration of the subject vehicle by using equation 17. The vehicle control ECU 10 may correspond to an in-curve acceleration calculation unit in claims.

In S113, the vehicle control ECU 10 determines whether the subject vehicle has exited from the curve road (i.e., the curve road exit determination process, just like S8 of FIG. 6). If the subject vehicle has exited the curved road, (S113, YES), the process is completed. If the subject vehicle has not exited from the curve road (S113, NO), the vehicle control ECU 10 returns to S107.

When the subject vehicle has exited the curve road, the vehicle control ECU 10 interrupts the calculation of the required deceleration in the required in-curve deceleration calculation process and the required acceleration in the required in-curve acceleration calculation process, and allows the output of the required acceleration/deceleration that has a greater value than these acceleration/deceleration.

In such manner, after exiting the curve road, the subject vehicle can be accelerated to a speed that exceeds the target in-curve speed Vt2. The vehicle speed exceeding the target in-curve speed Vt2 may be, for example, a set vehicle speed of the subject vehicle, or a vehicle speed according to the follow time required acceleration described above.

Figure 14:
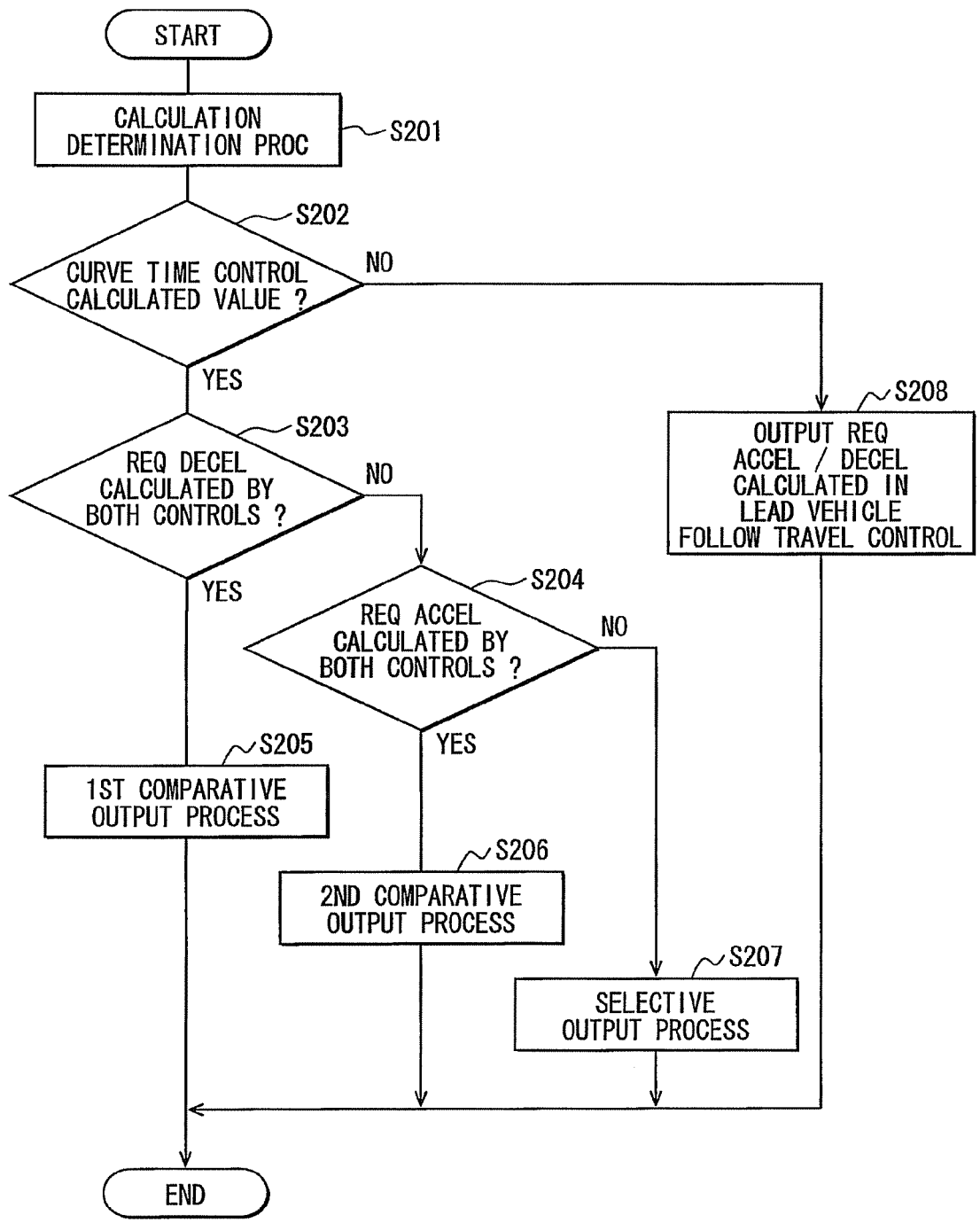
FIG. 14 is a flowchart of a required acceleration/deceleration output determination process performed by the vehicle control ECU.

Further, the vehicle control ECU 10 performs a required output determination process for determining which of the two types of acceleration/deceleration should be output. In other words, which of the required acceleration/deceleration calculated in the lead vehicle follow travel control or the required acceleration/deceleration calculated in the curve time control should be output. With reference to FIG. 14, the required speed output determination process is performed by the vehicle control ECU 10, and begins when the required acceleration/deceleration is calculated by the lead vehicle follow travel control.

In S201, the vehicle control ECU 10, performs a calculation determination process to determine whether both the lead vehicle follow travel control and the curve time control have calculated the required acceleration/deceleration. For example, the required acceleration/deceleration is regularly calculated in the lead vehicle follow travel control, but the curve time control does not calculate the required acceleration/deceleration until it is determined that the curve road exists in front of the subject vehicle by the curve road determination process.

If the vehicle control ECU 10 determines both of the lead vehicle follow travel control and the curve time control have calculated the required acceleration/deceleration (S202, YES), the vehicle control ECU 10 proceeds to S203. If it is determined that the curve time control has not calculated the required acceleration/deceleration (S202. NO), the vehicle control ECU 10 proceeds to S208.

In S203, the vehicle control ECU 10 determines whether both of the lead vehicle follow travel control and the curve time control have calculated the required deceleration. Specifically, whether (i) the follow time required deceleration is calculated in the lead vehicle follow travel control and (ii) the required curving deceleration or the required in-curve deceleration is calculated in the curve time control is determined.

If it is determined that both of the two controls have calculated the required deceleration (S203, YES), the vehicle control ECU 10 proceeds to S205. If it is determined that at least one of the two controls has not calculated the required deceleration (S203. NO), the vehicle control ECU 10 proceeds to S204.

In S204, the vehicle control ECU 10 determines whether both of the lead vehicle follow travel control and the curve time control have calculated the required acceleration. More specifically, whether (i) the follow time required acceleration is calculated in the lead vehicle follow travel control and (ii) the required in-curve acceleration is calculated in the curve time control is determined.

If it is determined that both of the two controls have calculated the required acceleration (S204, YES), the vehicle control ECU 10 proceeds to S206. If it is determined that one of the two controls has not calculated the required acceleration (S204, NO), the vehicle control ECU 10 proceeds to S207.

In S205, a first comparative output process is performed. In the first comparison output process, by comparing (i) the follow time required deceleration calculated in the lead vehicle follow travel control with (ii) the required curving deceleration or the required in-curve deceleration in the curve time control, the deceleration having a smaller value is output to VSC_ECU 1 and to ENG_ECU 5. Since the deceleration has a minus (−) value, the deceleration outputted to such ECU has a larger absolute value. The vehicle control ECU 10 may correspond to a comparison unit in claims.

Further, if the two deceleration values are same, one of the two required deceleration values is output to VSC_ECU 1 and ENG_ECU 5. For example, the follow time required deceleration may be output when two values are same. VSC_ECU 1 performs a deceleration control by using a brake actuator so that the required deceleration is generated in the subject vehicle. ENG_ECU 5 performs a deceleration control by using a throttle actuator.

In S206, a second comparative output process is performed. In the second comparison output process, by comparing (i) the follow time required acceleration calculated in the lead vehicle follow travel control with (ii) the required curving acceleration calculated in the curve time control, the acceleration having a smaller value is output to ENG_ECU 5. Since the acceleration has a plus (+) value, the acceleration outputted to ENG_ECU 5 has a smaller absolute value among two values.

Further, if the two acceleration values are same, one of the two required acceleration values is outputted to ENG_ECU 5. For example, the follow time required acceleration may be output when two values are same. ENG_ECU 5 performs an acceleration control by using the throttle actuator.

In S207, a selective output process is performed. In the selective output process, if (i) the required deceleration (i.e., the follow time required deceleration) has already been calculated in the lead vehicle follow travel control and (ii) the required acceleration (i.e., the required in-curve acceleration) has already been calculated in the curve time control, the vehicle control ECU 10 outputs only the required deceleration from among the two calculated values to VSC_ECU 1 and/or to ENG_ECU 5.

In such manner, even when the subject vehicle speed has fallen below the target curving speed of the curve road, the subject vehicle is controlled to decelerate and is not controlled to accelerate in case that the inter-vehicle distance to the lead vehicle has fallen below the target inter-vehicle distance thereby requiring the deceleration. Therefore, at a time of traveling a curve road, while securely performing the deceleration control fittingly performed according to the driver's unsafe feeling, the follow travel for following the lead vehicle is performed without causing uncomfortableness for the driver.

Also, in the selective output process, if (i) the required acceleration (i.e., the follow time required acceleration) has already been calculated in the lead vehicle follow travel control and (ii) the required deceleration (i.e., the required curving deceleration or the required in-curve deceleration) has already been calculated in the curve time control, it outputs only the required deceleration from among the calculated values to VSC_ECU 1 and/or to ENG_ECU 5.

In such manner, even when the lead vehicle has accelerated in a curve road to have a greater inter-vehicle distance greater than the target inter-vehicle distance, the subject vehicle is controlled to decelerate and is not controlled to accelerate in case that the subject vehicle speed is exceeding the target curving speed thereby requiring the deceleration. Therefore, the deceleration control according to the driver's unsafe feeling is more securely performed at a time of traveling a curve road.

In S208, the required acceleration/deceleration (i.e., the follow time required acceleration or the follow time required deceleration) calculated in the lead vehicle follow travel control is output. Specifically, the required follow time acceleration is outputs to ENG_ECU 5, and the required follow time deceleration is output to VSC_ECU 1 and/or ENG_ECU 5.

According to the above-described configuration, the required deceleration is controlled in a manner that makes the relative speed to have a greater degree of deceleration as the subject vehicle gets closer to the lead vehicle. Therefore, according to the deceleration of the subject vehicle controlled in such manner, the driver has a preferable deceleration feel, without having uncomfortableness, in the follow travel for following the lead vehicle. Further, since the driver of the subject vehicle is enabled to perform a preferable acceleration in various travel situations by using the corrected evaluation index KdB_c for representing a state of changing distance to the lead vehicle, it allows the driver to perform the follow travel control in a more preferable manner.

Further, according to the above-described configuration, the system starts to perform the deceleration control, on behalf of the driver, for traveling the virtual curve road at the target curving speed Vt1. Therefore, the driver is enabled to enter the virtual curve road having the subject vehicle speed adjusted to the target curving speed Vt1.

In addition, since the target in-curve speed Vt2 is set based on (i) the outside curvature radius Rn of the virtual curve road and (ii) the target side acceleration Gyt, the outside curvature radius Rn for a to-be-traveled portion of the curve is calculated regularly/successively based on the lead vehicle information that is regularly acquired from the lead vehicle. Therefore, even when the curvature radius of the curve road changes in the middle of the virtual curve road, the target in-curve speed Vt2 is determined according to the ever-changing curvature radius in the virtual curve road. Thus, according to the above configuration, the subject vehicle is enabled to travel such a virtual curve road by controlling the acceleration/deceleration based on the above-described target in-curve speed Vt2, thereby enabling the acceleration/deceleration control of the subject vehicle fittingly performed according to the driver's unsafe feeling.

Further, according to the above configuration, in case that the output of the follow time required deceleration possibly leads (i) to the entrance of the subject vehicle with the subject vehicle speed of exceeding the target curving speed Vt1 or (ii) to the travel of the subject vehicle in the curve with the subject vehicle speed exceeding the target in-curve speed Vt2, the follow time required deceleration will not be output, and the curve time required deceleration is output instead. Therefore, the above-described problematic situation will not be caused.

On the other hand, in case that the output of the curve time required deceleration possibly leads to the decrease of the inter-vehicle distance to the lead vehicle falling below the target inter-vehicle distance Dt, the curve time required deceleration will not be output, and the follow time required deceleration is output instead. Therefore, while enabling the driver to have less uncomfortable follow travel for following the lead vehicle, the deceleration control of the subject vehicle is made more securely fitted to the driver's unsafe feeling before/when entering the curve road.

Further, according to the above configuration, the smaller one of the follow time required acceleration and the curve time required acceleration is output in the curve road, thereby enabling the subject vehicle to have a not-too-small inter-vehicle distance to the lead vehicle based on such acceleration control while controlling the subject vehicle speed not to exceed the target in-curve speed Vt2. Therefore, while enabling the driver to have less uncomfortable follow travel for following the lead vehicle, the deceleration control of the subject vehicle is made more securely fitted to the driver's unsafe feeling when traveling the curve road.

Further, according to the above configuration, by setting the target side acceleration Gyt to a greater value for a good/veteran driver (e.g., Gyt=6 m/s$^2$), the follow control for following the lead vehicle is enabled to fittingly follow the lead vehicle, thereby allowing the driver to be more focused on the steering control. Furthermore, if the driver is a novice, the subject vehicle is enabled to follow a lead vehicle traveling at low speed by the setting of the target side acceleration Gyt to a smaller value (e.g., Gyt=6 m/s$^2$). If, on the other hand, the lead vehicle is traveling at high speed, the system controls the subject vehicle speed to be decreased to a level that limits the side acceleration of the subject vehicle within a self-set value range. In other words, the vehicle speed is controlled/reduced by the system so that the driver is allowed to perform the steering operation within his/her own driving skill level.

According to the configuration of the first embodiment of the present disclosure, the vehicle behavior control apparatus may be equipped with a followee object determination unit (10) for determining a followee object. The followee object is a vehicle capable of performing vehicle-to-vehicle communication with the subject vehicle and is to be followed by the subject vehicle. The followee object may be considered as the lead vehicle from which the lead vehicle information is acquired by a lead vehicle information acquisition unit. In such manner, the steering angle control is performed based on an outside curvature radius of the virtual curve road calculated from the virtual road shape according to the travel locus of the lead vehicle, thereby enabling an accurate control of the steering angle for the travel of the virtual curve road while following the lead vehicle.

Further, per the present disclosure, when a first corrected evaluation index calculated by a first corrected evaluation index calculation unit exceeds a first deceleration threshold, an adaptive deceleration calculation unit (10) calculates a required deceleration. The required deceleration maintains an actual relative speed relative to the lead vehicle with a target relative speed that is determined based on the first corrected evaluation index and the inter-vehicle distance to the lead vehicle.

In this case, the first corrected evaluation index is an index that represents a state of changing distance from the subject vehicle to the lead vehicle in consideration of the lead vehicle speed. Accordingly, the first corrected evaluation index increases as the relative speed for approaching the lead vehicle increases and as the inter-vehicle distance to the lead vehicle decreases, and an increase curve (i.e., a slope) of the first corrected evaluation index becomes steeper per unit change of decrease of the inter-vehicle distance as the inter-vehicle distance decreases.

Therefore, by setting the target relative speed according to the above configuration, the required deceleration is calculated such that the degree of decrease of the relative speed relative to the lead vehicle increases as the subject vehicle approaches the lead vehicle. Thus, by decelerating the subject vehicle according to such required deceleration, the driver should have a preferable deceleration feel in a following travel for following the lead vehicle, preventing an uncomfortable feel in such following travel.

Per the configuration of the present disclosure, a deceleration start determination unit (10, S105) may be provided for determining whether a second corrected evaluation index calculated by a second corrected evaluation index calculation unit exceeds a second deceleration threshold (10, S104) having a preset value. Also, a curve road deceleration calculation unit (10, S106) calculates a required deceleration that maintains an actual curve entrance relative speed with a target relative speed when the deceleration start determination unit determines that the second corrected evaluation index exceeds the second deceleration threshold. The required deceleration may be based on the second corrected evaluation index and the distance to the entrance position of the curve road.

In this case, the second corrected evaluation index is an index that represents a state of changing distance from the subject vehicle to the entrance position of the curve road in consideration of the target curving speed for passing the entrance of the curve road. Accordingly, the second corrected evaluation index increases as the curve entrance relative speed increases, and an increase curve (i.e., a slope) of the second corrected evaluation index becomes steeper as the distance to the entrance position of the curve road decreases.

Therefore, by starting the deceleration control with the calculation of the required deceleration when the second corrected evaluation index exceeds the second deceleration threshold, the deceleration control is started at a right timing for the driver in terms of preventing the unsafe feeling when the driver attempts to pass the curve road at the above target curving speed, enabling the driver to enter the curve road (i.e., to pass the entrance of the curve road) with the subject vehicle speed adjusted to the target curving speed.

Further, the configuration of the present disclosure includes a comparison unit (10, S203) to compare the required deceleration calculated by the adaptive deceleration calculation unit with the required deceleration calculated by the curve road deceleration calculation unit when the adaptive deceleration calculation unit and the curve road deceleration calculation unit have respectively calculated the required deceleration. A required deceleration having a greater absolute value is output from among two required decelerations from respective calculation units.

Therefore, the required deceleration leading to an excessive curving speed that exceeds the target curving speed will not be output when the required deceleration from the adaptive deceleration calculation unit allows the subject vehicle to enter the curve road at such excessive curving speed, thereby preventing the subject vehicle to enter the curve road at such excessive curving speed. Further, the required deceleration leading to a smaller inter-vehicle distance to the lead vehicle, which is smaller than the target inter-vehicle distance, will not be output and the required deceleration calculated by the adaptive deceleration calculation unit will be output instead when the calculated required deceleration from the curve road deceleration calculation unit allows the subject vehicle to have a smaller-than-threshold inter-vehicle distance, thereby preventing the subject vehicle from nearing too close to the lead vehicle. Therefore, while preventing an uncomfortable feel of the driver, the deceleration control is more securely performed at a right timing according to a driver's feel of un-safeness when entering the curve road.

According to the configuration of the present disclosure, the acceleration control in the following travel for following the lead vehicle is enabled to be more securely performed at the right timing while preventing an uncomfortable feel of the driver, because of the use of the first corrected evaluation index.

Further, according to the configuration of the present disclosure, an in-curve acceleration calculation unit (10, S112) calculates the required acceleration to maintain an actual curve border relative speed with a target relative speed. The target relative speed is determined based on a third corrected evaluation index and a distance that is calculated by subtracting the appropriate border distance from the virtual road border distance.

The in-curve acceleration calculation unit may calculate the required acceleration when (i) a curving determination unit (10, S2) determines that the subject vehicle has entered the virtual curve road and (ii) the second acceleration target determination unit (10, S108) determines that the third corrected evaluation index has a value that is smaller than a second acceleration threshold. Further, when (i) the curving determination unit determines that the subject vehicle has not entered the virtual curve and (ii) the deceleration start determination unit determines that the second corrected evaluation index exceeds the second deceleration threshold, the curve road deceleration calculation unit calculates the required deceleration that maintains the curve entrance relative speed with the target value that is determined based on the second corrected evaluation index and the distance to the entrance position.

In this case, the third corrected evaluation index is an index that represents a state of changing distance to the road border of the virtual curve road in consideration of the target curving speed for traveling the curve road. Such index increases when the curve border relative speed increases, and the increase curve (i.e., a slope) of such index becomes steeper as the distance calculated as a result of subtraction of the appropriate distance from the virtual road border distance decreases.

Therefore, the above setting of the target relative speed enables a calculation of the required acceleration-deceleration that increases the degree of decrease of the curve road border relative speed as the subject vehicle comes closer to the road border of the virtual curve road (i.e., more practically, as the subject vehicle approaches a point that is apart from the road border of the virtual curve road by the appropriate distance).

Since the target curving speed is set based on the curvature radius of the virtual curve road and the target side acceleration, the curvature radius of the road ahead can be regularly/continuously determined based on the regularly acquired lead vehicle information from the lead vehicle. That is, even when the curvature radius changes in the curve road, the target curving speed can be determined according to such changing curvature radius. Therefore, according to the configuration of the present disclosure, the required acceleration-deceleration can be calculated according to the target curving speed determined for the travel of the curve road. Therefore, by accelerating/decelerating the subject vehicle according to such target curving speed, the acceleration/deceleration control of the subject vehicle is performed according to a driver's feel of unsafeness when traveling the curve road without causing uncomfortableness of the driver.

Further, the comparison unit compares the required deceleration calculated by the adaptive deceleration calculation unit with the required deceleration calculated by the curve road deceleration calculation unit when both are calculated by both units, and also compares the required acceleration calculated by the adaptive deceleration calculation unit with the required acceleration calculated by the curve road deceleration calculation unit when both are calculated by both units. A required acceleration having a smaller absolute value is output from among two required accelerations from respective calculation units, and a required deceleration having the greater absolute value is output from among two required decelerations from respective calculation units.

In such manner, since, for a travel of the curve road, a required deceleration having the greater absolute value is output from among two required decelerations calculated by the adaptive deceleration calculation unit and calculated by the curve road deceleration calculation unit, the deceleration control of the subject vehicle is performed not to have a too-small inter-vehicle distance to the lead vehicle, while preventing the subject vehicle speed from exceeding the target curving speed. Further, since a required acceleration having a smaller absolute value is output from among two required accelerations from respective calculation units according to the above setting, the acceleration control of the subject vehicle is performed not to have a too-small inter-vehicle distance to the lead vehicle, while preventing the subject vehicle speed from exceeding the target curving speed. Therefore, while preventing the uncomfortable feel of the driver in the following travel for following the lead vehicle, the acceleration/deceleration control of the subject vehicle is performed according to the driver's feel of unsafeness in a more secured manner.

According to a configuration the virtual road shape may be determined based on a determination of the travel locus of the lead vehicle, which is determined by the information regarding the speed and the steering angle of the lead vehicle.

Second Embodiment

The present disclosure includes not only the above-described embodiment but also a following embodiment in a scope of the technical coverage. Therefore, in the following description, like parts have like numbers in those embodiments, and the description of the like parts is omitted.

The driving support system 100 in the second embodiment is similar to the driving support system 100 in the first embodiment except that the steering angle control performed by the vehicle control ECU 10 is different.

In the present embodiment, a road traveled by the subject vehicle is divided into five parts. The virtual curve road and a straight road before and after the virtual curve road are designated as a first area, a second area, a third area, a fourth area, and a fifth area. These five areas are described with reference to FIG. 15.

Figure 15:
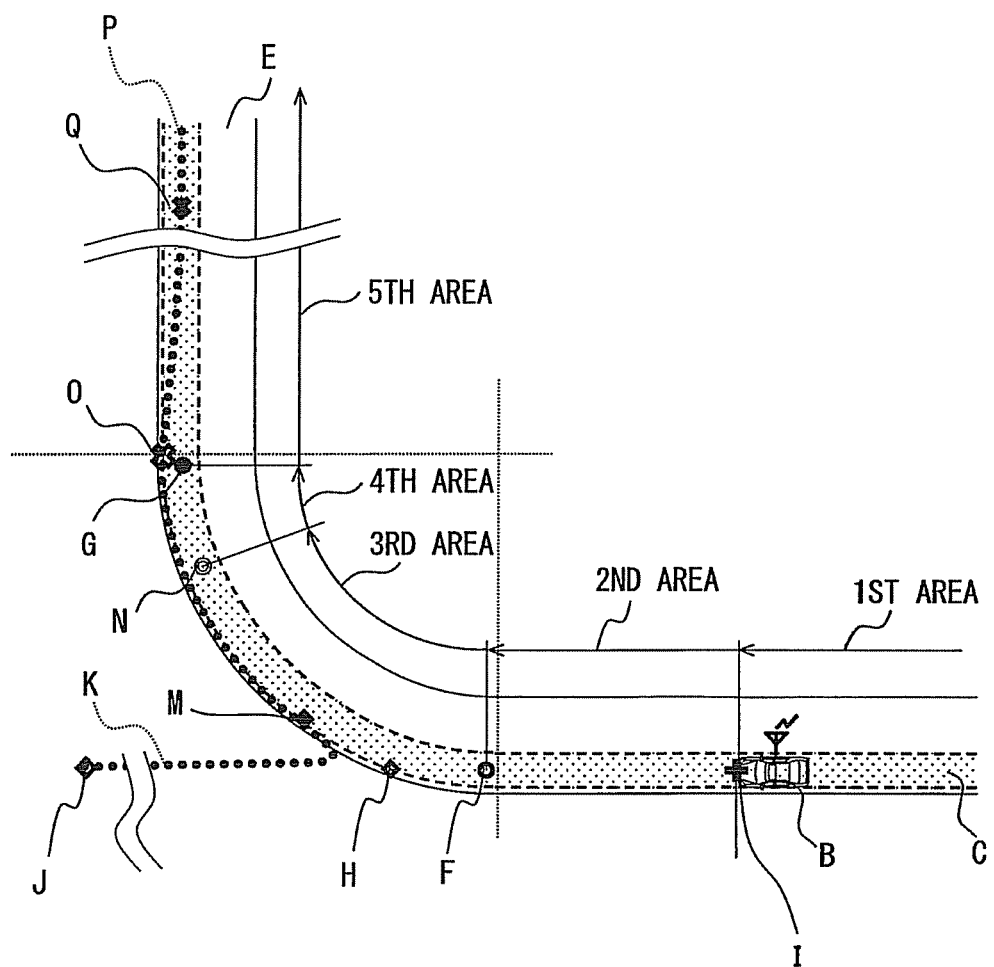
FIG. 15 is an illustration of five control areas in a second embodiment.

In FIG. 15, "I" is a steering start point, "J" is an entrance area start point, "K" is an entrance area virtual curve, and "M" is an entrance area end point. Also, "N" is a steering return operation start point, "O" is an exit area start point, "P" is an exit area virtual curve, and "Q" is an exit area end point.

In addition, the virtual road border determined by the road shape determination process is provided by a broken line. Though, in the first embodiment, the dashed line is used to represent the virtual road border, the virtual road border is represented by a broke line in the second embodiment, for the sake of convenience.

The steering start point (I in FIG. 15) is set as a start point of the second area, and a straight road up to the steering start point is set as the first area. In the first area, no operation of the steering wheel is performed.

The entrance position of the virtual curve road (F in FIG. 15) is set as a start point of the third area, and an area from the steering start point (I) to the entrance position of the virtual curve road (F) is set as the second area. The steering operation for steering a steering wheel to a steering angle that is required for turning the curve road in front is performed in the second area.

The steering return operation start point (N in FIG. 15) is set as a start point of the fourth area, and an area from the entrance position of the virtual curve (F) to the steering return operation start point (N) is set as the third area. In the third area, the steering operation of the subject vehicle for turning the curve road is performed.

The exit position of the virtual curve road (G in FIG. 15) is set as a start point of the fifth area, and an area from the steering return operation start point (N) to the exit position of the virtual curve road (G) is set as the fourth area. In the fourth area, the steering operation for returning the steering wheel from the required angle for turning the curve road to an angle for finishing the turn of the subject vehicle is performed.

An area after the exit position of the virtual curve road (G) is set as the fifth area. In the fifth area, no operation of the steering wheel is performed in the subject vehicle.

Figure 16:
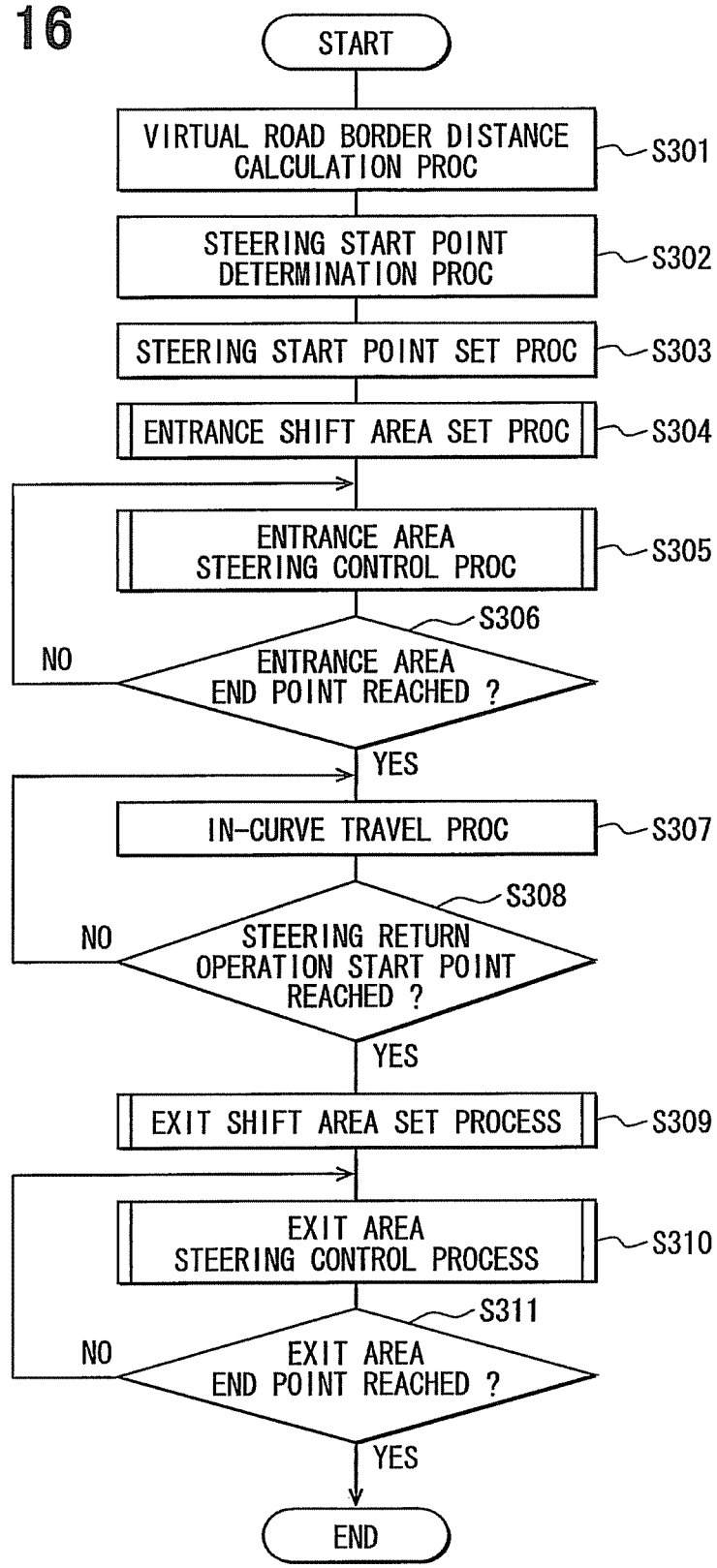
FIG. 16 is a flowchart of a steering angle control process of the second embodiment.

With reference to FIG. 16, a steering angle control process performed by the vehicle control ECU 10 of the driving support system 100 in the present embodiment is described. The process of FIG. 16 is started when it is determined that there is a curve road in front of the subject vehicle by the curve road determination process, that is, before entering the virtual curve road.

In S301, the vehicle control ECU 10 performs a virtual road border distance calculation process to calculate a virtual road border distance D_boun in the straight road part (i.e., the first area), which is a part leading to the entrance position of the virtual curve road (F). The virtual road border distance calculation process is similar to the calculation of the virtual road border distance Do in S3 of FIG. 6.

Figure 17:
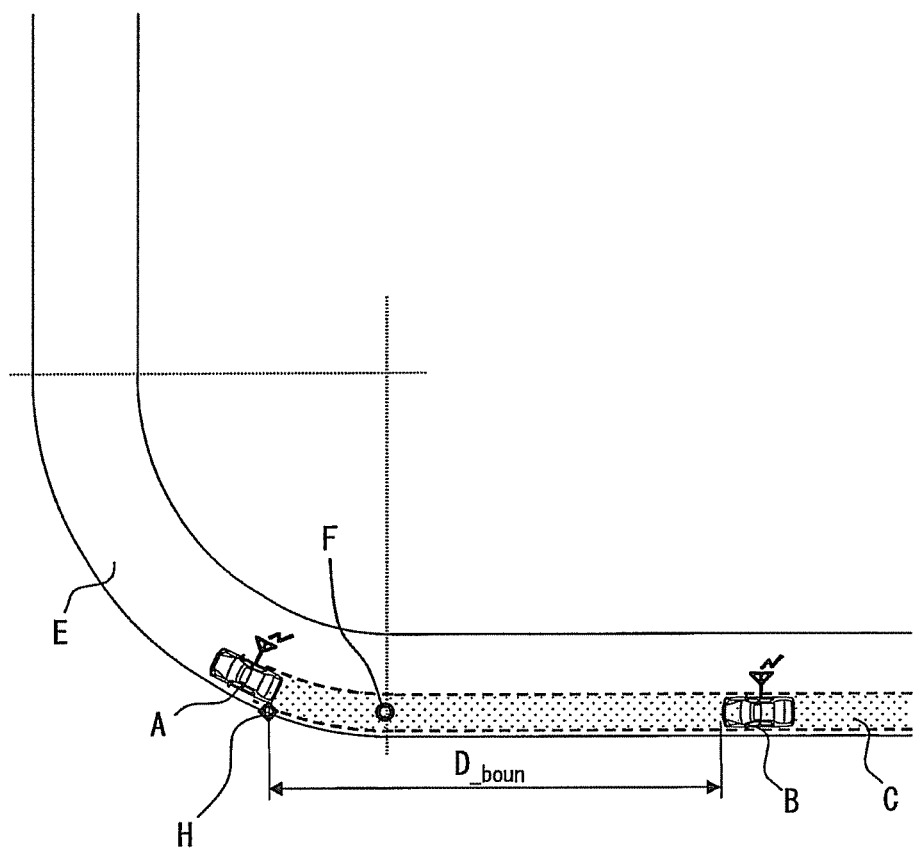
FIG. 17 is illustration of a virtual road border distance.

The virtual road border distance D_boun is described with reference to the illustration in FIG. 17. The virtual road border distance D_boun, shown in FIG. 17, is a distance from the subject vehicle to the road border of the virtual curve road in front of the subject vehicle. In FIG. 16, the broken line represents the road border of the virtual curve road (i.e., a virtual road border).

In S302, the vehicle control ECU 10 performs a steering start point determination process. In the steering start point determination process a current value (i.e., KdB_e_p) of a steering start evaluation index (i.e., KdB_e) is calculated. In addition it is determined whether the current value KdB_e_p of the steering start evaluation index exceeds a threshold (i.e., a threshold KdB_e_str) of the steering start evaluation index, which is determined according to the virtual road border distance D_boun. The performance of S302 may correspond to a steering start evaluation index calculation unit and a steering start determination unit in the claims.

The steering start evaluation index KdB_e is an index of an object captured by the driver's eye that is a curve boundary object, such as a curb stone, a white line on the road border of the vehicle curve road right in front of the subject vehicle. The index indicates a change of an area size of such object at a unit time.

Further, the steering start evaluation index represents the change of distance of the subject vehicle to the virtual road border in consideration of the speed of the subject vehicle approaching the virtual road border in front of the subject vehicle. Therefore, the steering start evaluation index increases as the approaching speed of the subject vehicle toward the virtual road border increases, and the increase curve (i.e., a slope) of the index becomes steeper per unit change of decrease of D_boun as the virtual road border distance D_boun decreases. The steering start evaluation index KdB_e is represented, for example, in equation 18. In equation 18, Vo is the speed of the subject vehicle.

$$\text{KdB\_e} = 10 \times \log_{10}\left(\left|4 \times 10^7 \times \frac{Vo}{(D\_boun)^3}\right|\right) \quad \text{(Equation 18)}$$

As shown in equation 18, the steering start evaluation index KdB_e increases as the subject vehicle's speed Vo increases. Further, it increases as the virtual road border distance D_boun decreases. Since the virtual road border distance D_boun is a cube factor in the equation, the increase curve (i.e., a slope) of the steering start evaluation index KdB_e becomes steeper per unit change of decrease of D_boun as the virtual road border distance D_boun decreases.

Generally speaking, before actually entering the curve, the driver of the subject vehicle determines the entrance speed and the distance for entering a curve based on the visual change of the area size of the curve boundary objects, and determines the steering operation start timing for turning the curve. Therefore, by using the index KdB_e, the steering operation for turning a curve is started at the right timing when the driver of the subject vehicle actually starts the steering operation for turning the curve before entering such curve.

Figure 18:
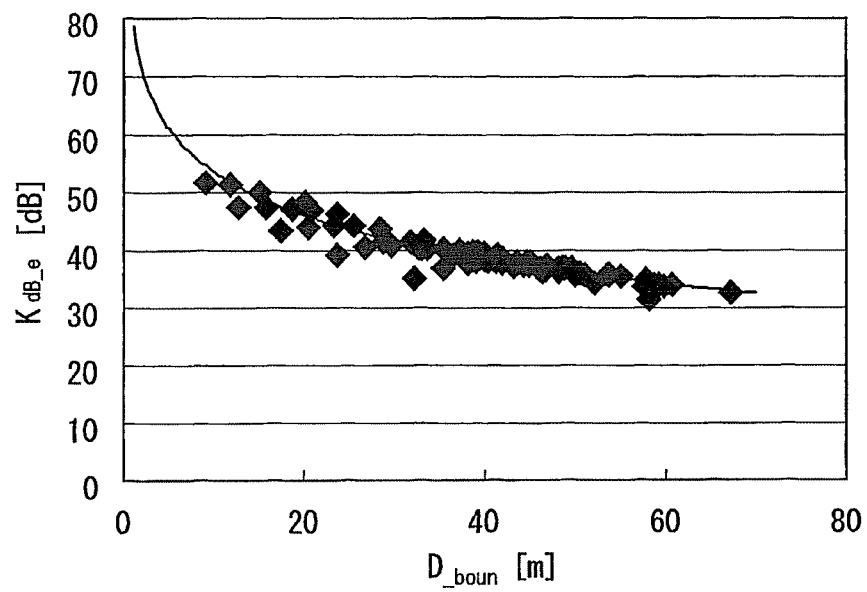
FIG. 18 is an illustration of a winding road travel evaluation result by a professional driver.

The inventor of the present disclosure conducted an experiment for examining a steering wheel operation timing, by using a professional driver. The professional driver is instructed to steer the steering wheel at a timing that enables a turn of the subject vehicle for a curve in front of the subject vehicle, on condition that the subject vehicle travels at a constant speed of Vo. The result of the experiment was analyzed by using the steering start evaluation index KdB_e that is calculated from equation 18. With reference to FIG. 18, the operation start points of the driver is plotted as a line in the graph.

Figure 19:
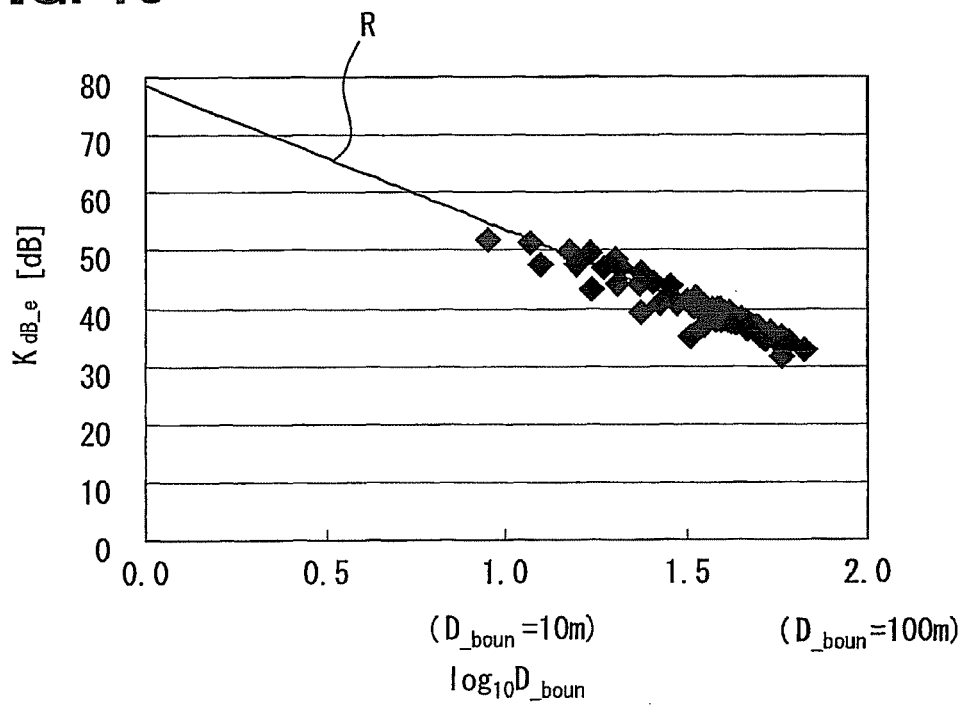
FIG. 19 is an illustration of a threshold of a steering start evaluation index.

Further, FIG. 19 shows a re-plot of the curve of FIG. 18, converting the horizontal axis of FIG. 18 to a scale of $\log_{10}$ D_boun. A straight line R in FIG. 19 is an approximation of such plot. A steering start determination equation is formulated as equation 19 in the following, and a threshold KdB_e_str (i.e., the steering start determination equation) is represented by equation 19.

$$Kdb\_e\_str = b \log_{10}(D\_boun) + c + \Delta c \quad \text{(Equation 19)}$$

The terms b, c in equation 19 are constant numbers. For example, b=−25.00 and c=78.58. The term $\Delta c$ is a correction factor. Such correction factor is used for avoiding a too-rigid value of the threshold KdB_e_str. That is, if equation 19 does not have the correction factor, the threshold KdB_e_str is determined as the steering start evaluation index KdB_e itself, causing too-much interference from the system, and, as a result, the driver may feel uncomfortableness.

Figure 20:
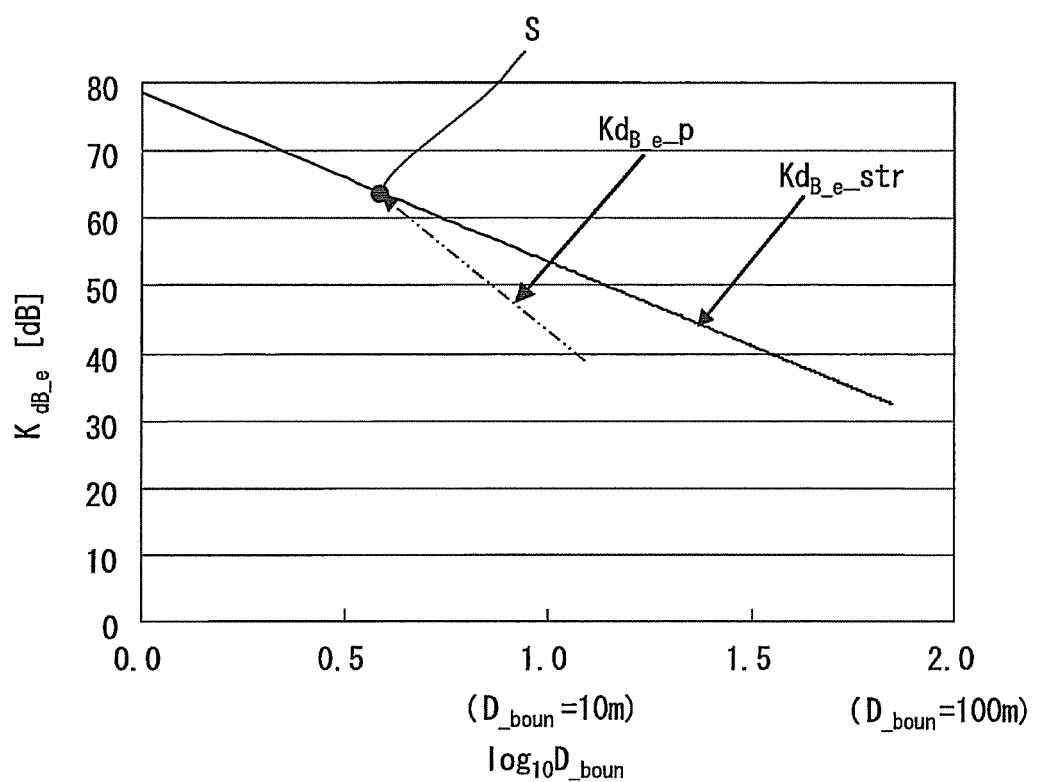
FIG. 20 is an illustration of a relationship between a current value and the threshold of the steering start evaluation index.
Figure 21:
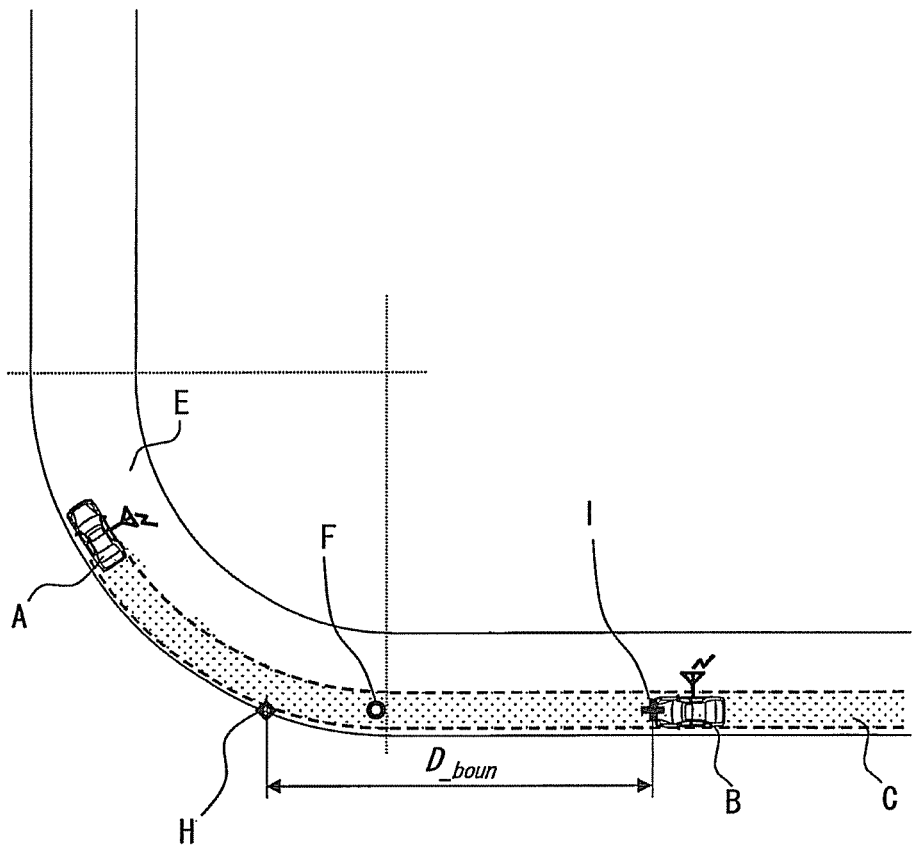
FIG. 21 is an illustration of the steering start point set process.

With continuing reference to FIG. 16, in S303, the vehicle control ECU 10 performs a steering start point set process to determine a steering start point. In particular, when the current value KdB_e_p of the steering start evaluation index exceeds the threshold KdB_e_str (i.e., S in FIG. 20), the current position of the subject vehicle is determined as the steering start point (i.e., a start point of the second area). Further, at the start point of the second area (i.e., point I in FIG. 21), the steering operation of the subject vehicle is started. Therefore, S303 may correspond to a steering start point determination unit and/or a steering start unit in claims.

In S304, the vehicle control ECU 10 performs an entrance shift area set process to determine a curve entrance shift area. The entrance shift area set process may be understood as a "preparation" or a "shift" for entering the curve. The entrance shift area set process is described with reference to FIG. 22.

Figure 22:
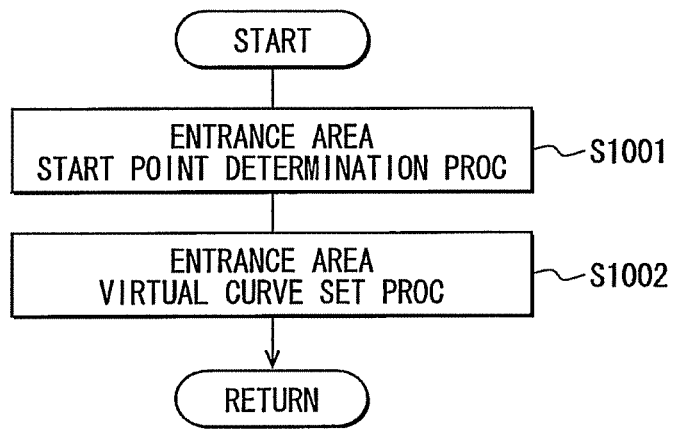
FIG. 22 is a flowchart of an entrance shift area set process.

In S1001 of FIG. 22, the vehicle control ECU 10 performs an entrance area start point determination process to determine the entrance area start point (e.g., J of FIG. 15), which is a start point of the curve entrance shift area in the virtual curve in. For instance, a position that is apart from the start point of the second area by a predetermined distance is set as the entrance area start point. The performance of S1001 may correspond to an entrance area start point determination unit in claims.

The curve entrance shift area is an area from the steering start point of the virtual curve road (i.e., a start point of the second area) to a certain preset position. The certain preset position may be, for example, a position at which the subject vehicle can locate the entrance area end point in front of the subject vehicle. Further, a position farther apart by a predetermined distance indicates a distance of hundred meters or the like, which may include an infinite distance.

In S1002 of FIG. 22, the vehicle control ECU 10 performs an entrance area virtual curve set process, which may correspond to an entrance area virtual curve set unit in claims.

In the entrance area virtual curve set process, the process sets, as the entrance area virtual curve (e.g., K in FIG. 15), a curve represented as a collection of points from equations 20 and 21, which are $X_{in's}$ and $Y_{in's}$ relative to an origin that is set as a start point of the second area (i.e., the steering start point).

$$X\_in = A \times \sqrt{2 \times \tau} \times \underbrace{(1 - \frac{1}{2! \times 5} \times \tau^2 + \frac{1}{4! \times 9} \times \tau^4 - \frac{1}{6! \times 13} \times \tau^6 + \ldots)}_{First\_term} + \quad \text{(Equation 20)}$$

-continued $$\underbrace{\sqrt{\frac{D^2+L^2}{2\times L}\times 2\times L-L^2}\times \cos\tau}_{Second\_term}-\underbrace{D\_in}_{Third\_term}$$

Based on equation 20, the first term is an X direction component of a clothoid curve definition, the second term is a correction factor of the X direction distance calculated from a tire steer angle when the vehicle travels on the clothoid curve, and the third term is a correction factor that is used to correct the start point of the second area to be located at the origin.

$$Y\_in = \underbrace{A\times\tau\times\sqrt{2\times\tau}\times\left(\frac{1}{3}-\frac{1}{3!\times 7}\times\tau^2+\frac{1}{5!\times 15}\times\tau^4-\frac{1}{7!\times 15}\times\tau^6+\ldots\right)}_{First\_term}+ \quad \text{(Equation 21)}$$

$$\underbrace{\sqrt{\frac{D^2+L^2}{2\times L}\times 2\times L-L^2}\times \sin\tau}_{Second\_term}$$

Per equation 21, the first term is a Y direction component of a clothoid curve definition, and the second term is a correction factor of the Y direction distance calculated from a tire steer angle when the vehicle travels on the clothoid curve.

Further, in equations 20 and 21, A is a constant number that is calculated from equation 22 shown below. In equation 22, R may be the outside curvature radius Rn, described above, or, by assuming that the outside curvature radius has a constant value R0, such value R0 may be used. Further, 1 in equation 22 represents a length of the curve.

$$A=\sqrt{R\times l} \quad \text{(Equation 22)}$$

In equations 20 and 21, $\tau$ is a spiral angle, and is calculated from equation 23. In equation 23. R may be the same R as in equation 22. Further, D in equations 20 and 21 is a distance from the subject vehicle to the entrance shift area side virtual curve, which is virtually positioned in front of the subject vehicle and is designated as an entrance area virtual curve distance $D\_trans\_in$. In other words, D is equal to $D\_trans\_in$. Further, $D\_in$ is a distance from the start point of the second area to the entrance position of the virtual curve road.

$$\tau=\frac{l}{2\times R} \quad \text{(Equation 23)}$$

An intersection point between (i) the entrance area virtual curve, which is set by the entrance area virtual curve set process, and (ii) the outside border of the virtual curve road, which is estimated by the road shape determination process, is set as an end point of the virtual road border in the curve entrance shift area (i.e., an entrance area end point) by the vehicle control ECU 10.

Figure 23:
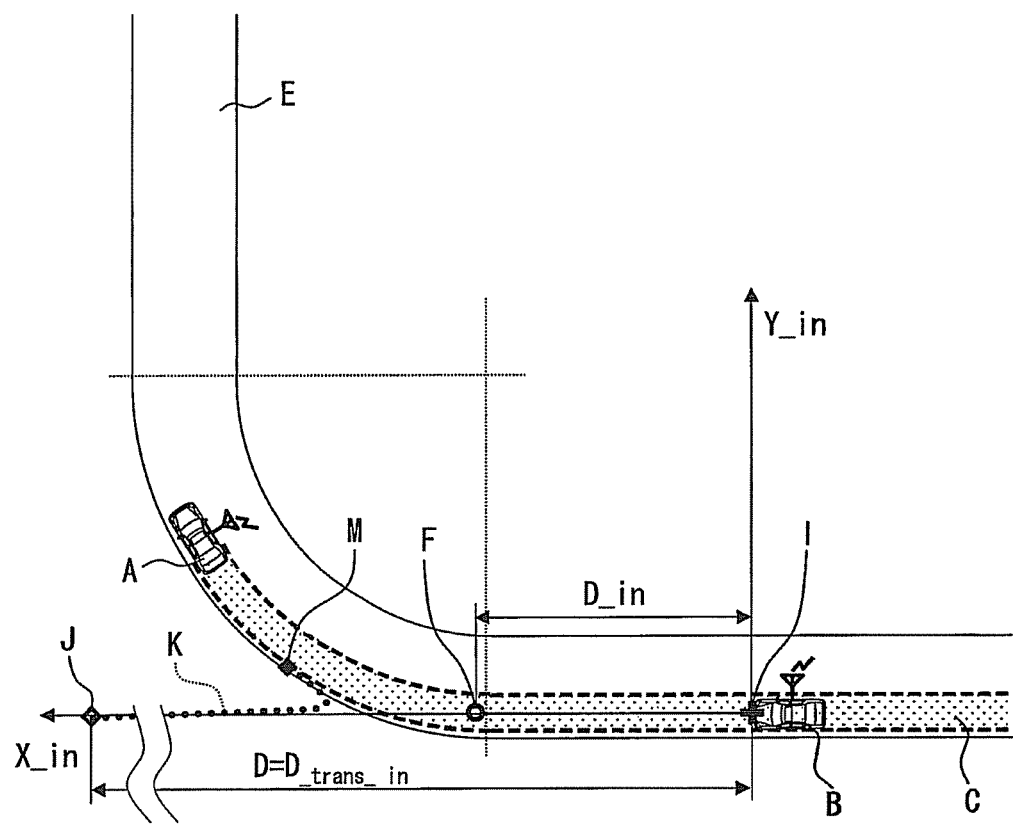
FIG. 23 is an illustration of an entrance area start point, an entrance area end point, and an entrance area side virtual curve.

In FIG. 23, the entrance area start point (J), the entrance area end point (M), and the entrance area virtual curve (dotted line K).

With continuing reference to FIG. 16, after S1002 of FIG. 22, the vehicle control ECU 10 performs, in S305, an entrance area steering control process. The details of the entrance shift area steering control process are described with reference to FIG. 24.

Figure 24:
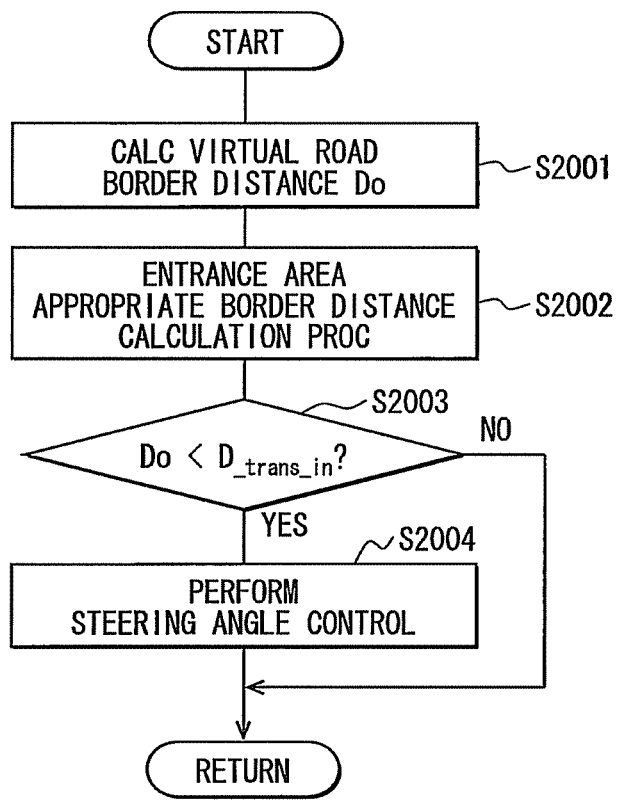
FIG. 24 is a flowchart of an entrance area steering control process.

In S2001 of FIG. 24, the vehicle control ECU 10 calculates, the virtual road border distance Do (i.e., D_boun). The virtual road border distance Do is a distance between the virtual road border in front of the subject vehicle, which is determined by the road shape determination process, and the subject vehicle (e.g., a front end of the subject vehicle).

In S2002, the vehicle control ECU 10 performs an entrance area appropriate border distance calculation process to calculate the entrance area virtual curve distance $D\_trans\_in$, and set the entrance area virtual curve distance $D\_trans\_in$ as the appropriate border distance Dc. The entrance area virtual curve distance $D\_trans\_in$ is a distance between the entrance area virtual curve and the front end of the subject vehicle (see FIG. 23). The entrance area virtual curve is virtually positioned on a line of a travel direction of the subject vehicle (i.e., a point on the curve in front of the subject vehicle).

The entrance area virtual curve distance $D\_trans\_in$ may be calculated, for example, by replacing the coordinates of points (X_in, Y_in) on the entrance shift area virtual curve with the start position/initial position in the two-dimensional coordinates described above. Alternatively, the current position of the subject vehicle in the two-dimensional coordinates may be converted to a point in the (X_in, Y_in) coordinate system, for the calculation of the entrance area virtual road border distance $D\_trans\_in$.

In S2003, the vehicle control ECU 10 compares the virtual road border distance Do calculated in S2001 and the entrance virtual curve distance $D\_trans\_in$ that is set as the appropriate border distance Dc in S2002. Such comparison may be provided as a steering angle propriety determination process.

If the distance Do is smaller than the distance $D\_trans\_in$ (i.e., Do<$D\_trans\_in$), the vehicle control ECU 10 determines that the steering angle is inappropriate, and proceeds to S2004. If the distance Do is equal to the distance $D\_trans\_in$, the vehicle control ECU 10 determines that the steering angle is appropriate, and proceeds to S306.

In S2004, the vehicle control ECU 10 performs a steering angle control. The steering angle control is similar to S7 of FIG. 6 except that in S2004 the entrance area virtual curve distance $D\_trans\_in$ is used as the appropriate border distance Dc.

After performing the steering angle control in S2004, the vehicle control ECU 10, in S306, determines whether the subject vehicle has reached the entrance area end point. Such determination may be performed, for example, based on a distance between the current position of the subject vehicle and the entrance area end point. If such distance is greater than zero, it is determined that the subject vehicle has not reached the entrance area end point, and if such distance is equal to or smaller than zero, it is determined that the subject vehicle has reached the entrance area end point.

When it is determined that that the subject vehicle has reached the entrance area end point (S306, YES), the vehicle control ECU 10 proceeds to S307. On the other hand, when it is determined that the subject vehicle has not reached entrance area end point (S306, NO), the vehicle control ECU 10 returns to S305.

Figure 25:
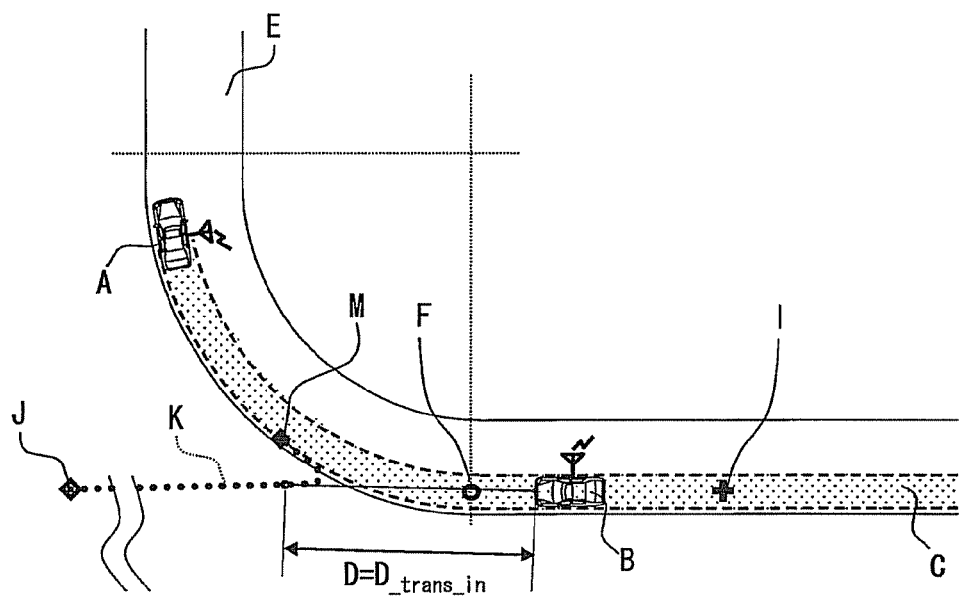
FIGS. 25, 26, 27 area illustrations of a steering control according to an entrance area virtual curve distance.
Figure 26:
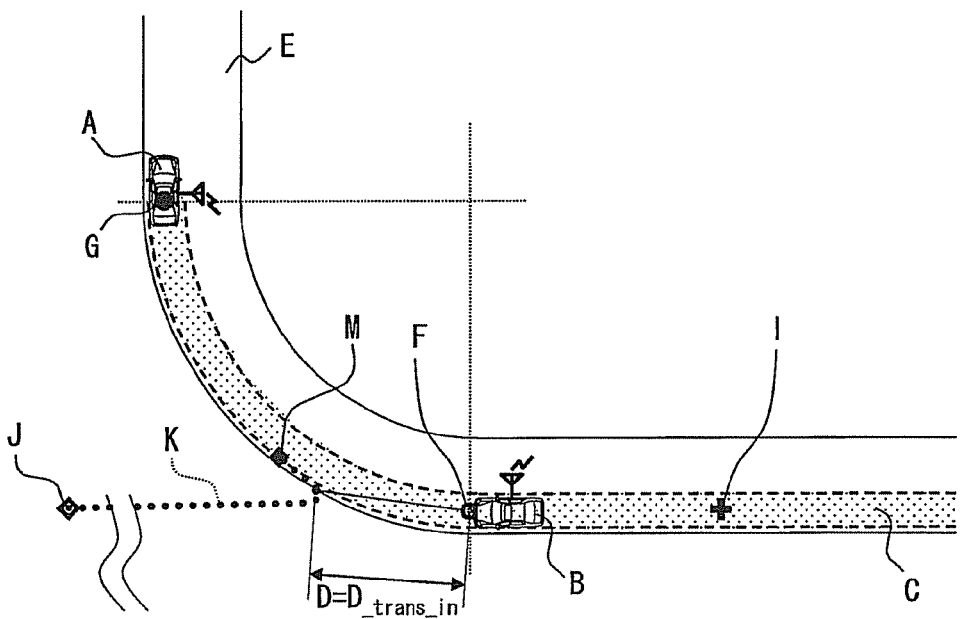
Figure 27:
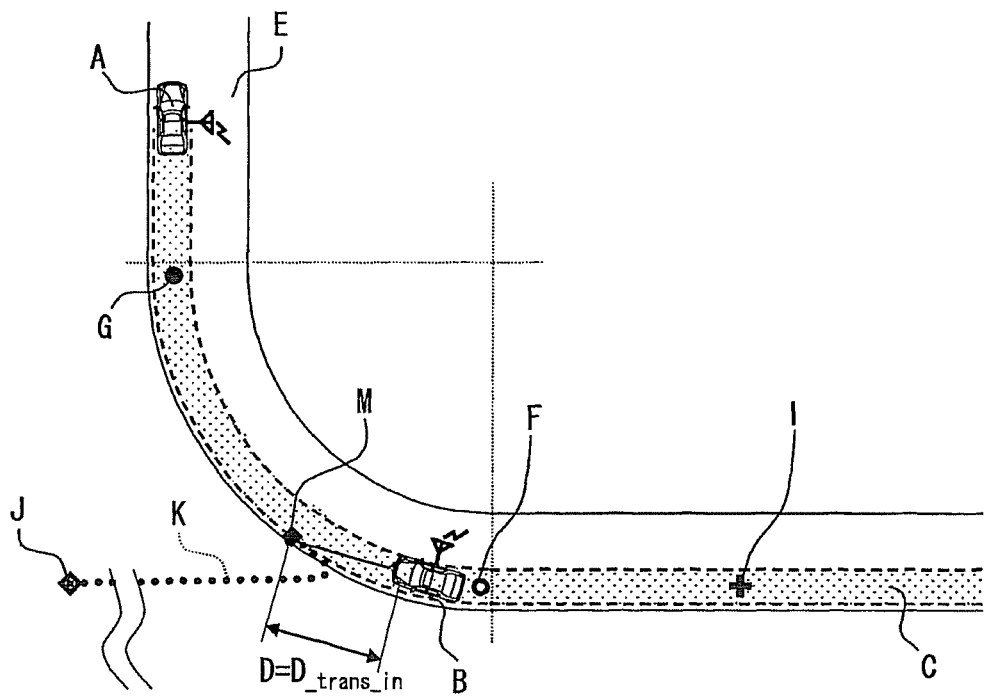

With reference to FIGS. 25, 26, 27, the steering angle is automatically controlled, so that the virtual road border distance Do is equal to or maintained at the entrance area virtual curve distance $D\_trans\_in$ (i.e., Do=$D\_trans\_in$). Therefore, at the time of travel in the curve entrance shift area, the steering angle is smoothly controlled in an automated manner.

In S307, the vehicle control ECU 10 performs an in-curve travel process, which is similar to the in-curve travel process described in S3 to S7 of FIG. 6 of the first embodiment.

In S308, the vehicle control ECU 10 determines whether the subject vehicle has reached the steering return operation start point (e.g., N of FIG. 15). Such determination may be referred to as a steering return operation start point determination process.

Per the steering return operation start point determination process, an intersection point between two border lines, that is, (i) the virtual road border of the virtual curve road and (ii) the virtual road border of a straight road part which is determined to extend from the exit position of the virtual curve road based on the determination of such exit position by the exit determination process described above, is calculated. Such intersection point may be designated as an exit area intersection. A position of the subject vehicle viewing such exit side intersection as a right (i.e., straight) in-front of the subject vehicle is determined as the steering return operation start point determination process. The exit position of the virtual curve road is determined as a steering end point.

The vehicle control ECU 10 may correspond to an exit determination unit in claims, a steering return operation start point determination unit and a steering end point determination unit.

In this case, both of (i) the virtual road border of the virtual curve road and (ii) the virtual road border of a straight road part, which is determined to extend from the exit position of the virtual curve road, may be determined by the road shape determination process.

When the distance between the current position of the subject vehicle and the steering return operation start point is greater than zero, it is determined that the steering return operation start point has not been reached (S308: NO). On the other hand, when the distance between the current position of the subject vehicle and the steering return operation start point is equal to or smaller than zero, it is determined that the steering return operation start point has been reached (S308: Yes).

The vehicle control ECU 10 proceeds to S309 when it is determined that that the steering return operation start point has been reached (S308, YES). On the other hand, when it is determined that the steering return start point has not been reached (S308, NO), the vehicle control ECU 10 returns to S307.

Figure 28:
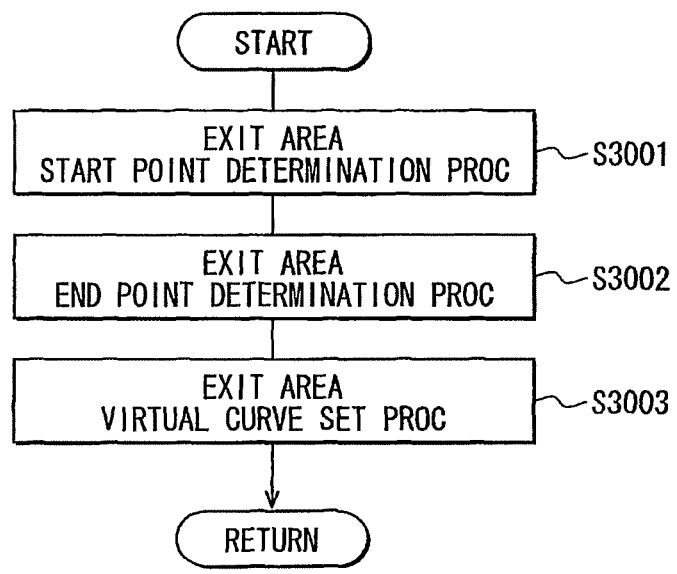
FIG. 28 is a flowchart of an exit shift area set process.

In S309, the vehicle control ECU 10 performs an exit shift area set process. Details of the exit shift area side process is described with reference to FIG. 28.

In S3001, the vehicle control ECU 10 performs the exit area start point determination process to determine the exit area intersection as a start point of the virtual curve of a curve exit shift area (i.e., the exit area start point (e.g., point O FIG. 15)). Accordingly, S3001 may correspond to an exit area start point determination unit in claims. The curve exit shift area is an area from the steering return operation start point to the steering end point.

In S3002, the vehicle control ECU 10 performs an exit area end point determination process to calculate the exit area end point (e.g., Q of FIG. 15). Based on the road borders on both side of the straight road part after the exit position of the virtual curve road, which is determined by the exit determination process, a centerline between the two borders on both sides is calculated, and a point on such centerline apart from the exit position of the virtual curve road by a distance in proportion to the subject vehicle speed Vo is determined as the exit area end point of the curve exit shift area. The performance of S3002 may correspond to an exit area end point determination unit in claims.

The curve exit shift area is an area from the steering return operation start point to the steering end point. The virtual road border on both sides of the straight road part after the exit position may be determined by the road shape determination process.

Further, the point apart from the exit position by a distance in proportion to the subject vehicle speed Vo may be determined as a position that is apart from the exit position by a distance of the subject vehicle speed Vo multiplied by a certain time T. The value of T may be arbitrarily set.

In S3003, the vehicle control ECU 10 performs an exit area virtual curve set process. The process in S3003 may correspond to an exit area virtual curve set unit in claims.

The exit area virtual curve set process sets a curve according to equations 24 and 25 (i.e., the exit area virtual curve). The curve is represented as a collection of points from following equations 24 and 25, which are X_out's and Y_out's relative to an origin that is set as a start point of the fifth area.

(Equation 24)
$$X\_out = \underbrace{A \times \sqrt{2 \times \tau} \times \left(1 - \frac{1}{2! \times 5} \times \tau^2 + \frac{1}{4! \times 9} \times \tau^4 - \frac{1}{6! \times 13} \times \tau^6 + \ldots\right)}_{First\_term} + \underbrace{\sqrt{\frac{D^2 + L^2}{2 \times L} \times 2 \times L - L^2} \times \cos\tau}_{Second\_term} - \underbrace{D\_out}_{Third\_term}$$

Per equation 24, the first term is an X direction component of a clothoid curve definition, the second term is a correction factor of the X direction distance calculated from a tire steer angle when the vehicle travels on the clothoid curve, and the third term is a correction factor that is used to correct the start point of the fifth area to be located at the origin.

(Equation 25)
$$Y\_out = \underbrace{A \times \tau \times \sqrt{2 \times \tau} \times \left(\frac{1}{3} - \frac{1}{3! \times 7} \times \tau^2 + \frac{1}{5! \times 11} \times \tau^4 - \frac{1}{7! \times 15} \times \tau^6 + \ldots\right)}_{First\_term} + \underbrace{\sqrt{\frac{D^2 + L^2}{2 \times L} \times 2 \times L - L^2} \times \sin\tau}_{Second\_term}$$

Per equation 25, the first term is a Y direction component of a clothoid curve definition, and the second term 29 is a correction factor of the Y direction distance calculated from a tire steer angle when the vehicle travels on the clothoid curve.

The constant A is calculated from equation 22, and the constant is calculated from the equation 23.

Further, D in equations 24 and 25 is a distance between the subject vehicle and the exit area virtual curve in front of the subject vehicle (i.e., an exit area virtual curve distance $D\_{trans\_out}$). In other words, D is equal to $D\_{trans\_out}$.

Figure 29:
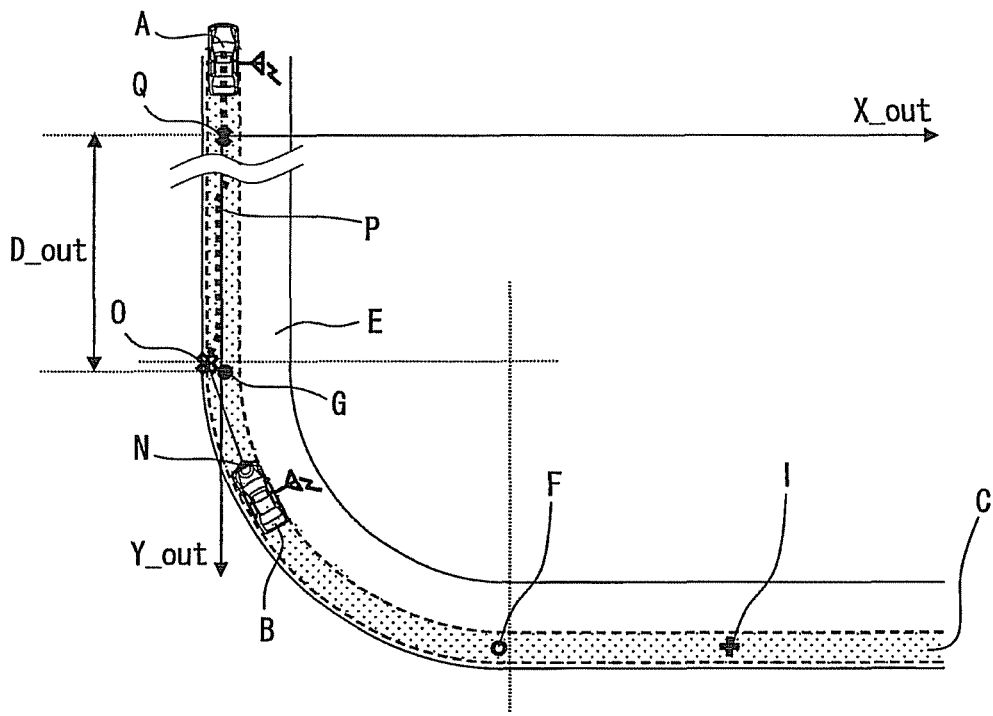
FIG. 29 is an exit area start point, an exit area end point, and an exit area virtual curve.

In FIG. 29, the exit area start point (i.e., point O), the exit area end point (i.e., point Q), and the exit area virtual curve (i.e., dotted line P) are illustrated.

Figure 30:
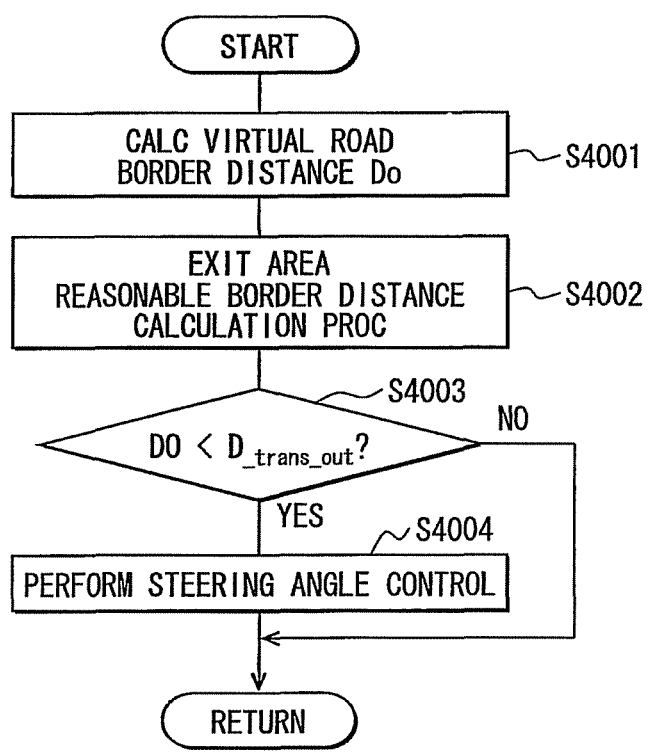
FIG. 30 is a flowchart of an exit area steering control process.

Returning to FIG. 16, in S310, the vehicle control ECU 10 performs an exit area steering control process. The exit area steering control process is described with reference to FIG. 30.

In S4001, the vehicle control ECU 10 calculates, just like the S3 of FIG. 6, the virtual road border distance Do.

In S4002, the vehicle control ECU 10 performs an exit area appropriate border distance calculation process to calculate an exit side virtual curve distance $D\_{trans\_out}$, and sets the exit side virtual road border distance $D\_{trans\_out}$ as the appropriate border distance Dc.

Figure 31:
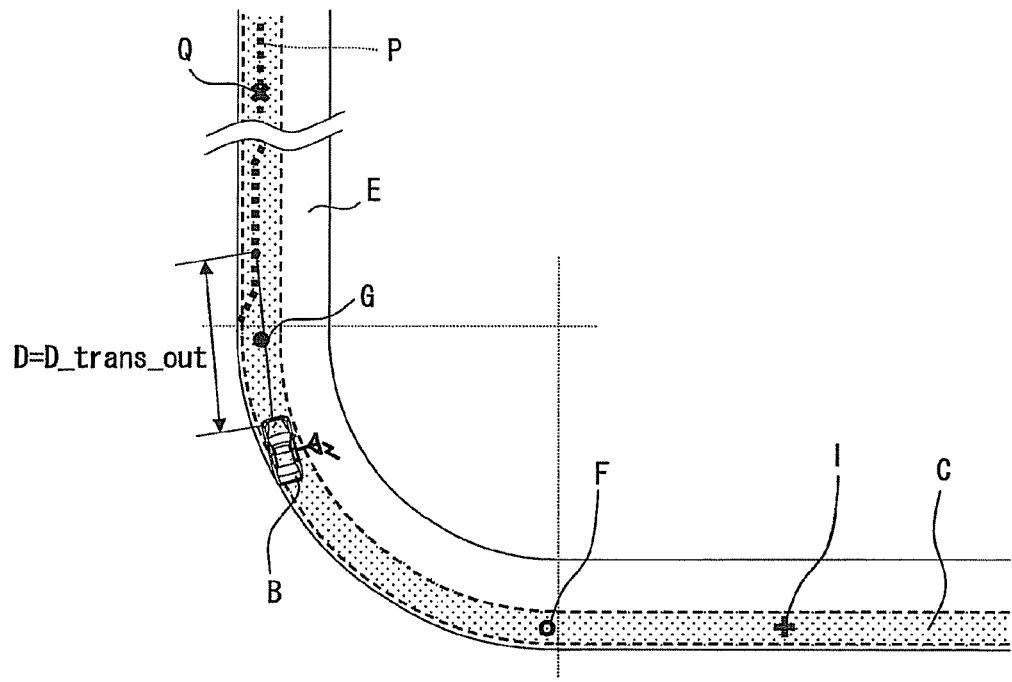
FIGS. 31, 32, 33 area illustrations of a steering control according to an exit area virtual road border distance.

The exit area virtual road border distance $D\_{trans\_out}$ is a distance between the exit area virtual curve that is virtually positioned on a line of a travel direction of the subject vehicle (i.e., a point on the curve in front of the subject vehicle) and the subject vehicle (e.g., a front end of the subject vehicle) (see FIG. 31).

The exit virtual curve distance $D\_{trans\_out}$ may be calculated, for example, by replacing the coordinates of points (X_out, Y_out) on the exit area virtual curve with the two-dimensional coordinates described above. Alternatively, the current position of the subject vehicle in the two-dimensional coordinates may be converted to a point in the (X_out, Y_out) coordinate system, for the calculation of the virtual road border distance $D\_{trans\_out}$.

In S4003, the vehicle control ECU 10 compares the virtual road border distance Do, calculated in S4001, with the entrance area virtual curve distance $D\_{trans\_out}$, which is set as the appropriate border distance Dc in S4002. Such comparison may be referred to as a steering angle propriety determination process.

If the distance Do is smaller than the distance $D\_{trans\_out}$ (i.e., Do<$D\_{trans\_out}$), the vehicle control ECU 10 determines that the steering angle is inappropriate, and proceeds to S4004. If the distance Do is equal to or greater than the distance $D\_{trans\_out}$ (i.e., Do≥$D\_{trans\_out}$), the vehicle control ECU 10 determines that the steering angle is appropriate, and proceeds to S311.

In S4004, the vehicle control ECU 10 performs the steering angle control, just like the S7 of FIG. 6 except for using the entrance area virtual curve distance $D\_{trans\_out}$ as the appropriate border distance Dc, and proceeds to S311.

In S311, the vehicle control ECU 10 determines whether the exit area end point has been reached. Such determination may be performed, for example, based on a distance between the current position of the subject vehicle and the exit area end point. If such distance is greater than zero, it is determined that the subject vehicle has not reached the exit area end point, and if such distance is equal to or smaller than zero, it is determined that the subject vehicle has reached the exit area end point.

The vehicle control ECU 10 finishes the process of FIG. 16 when it is determined that the exit area end point has been reached (S311, YES). On the other hand, when it is determined that that the exit area end point has not been reached (S311, NO), the vehicle control ECU 10 returns to S310.

Figure 32:
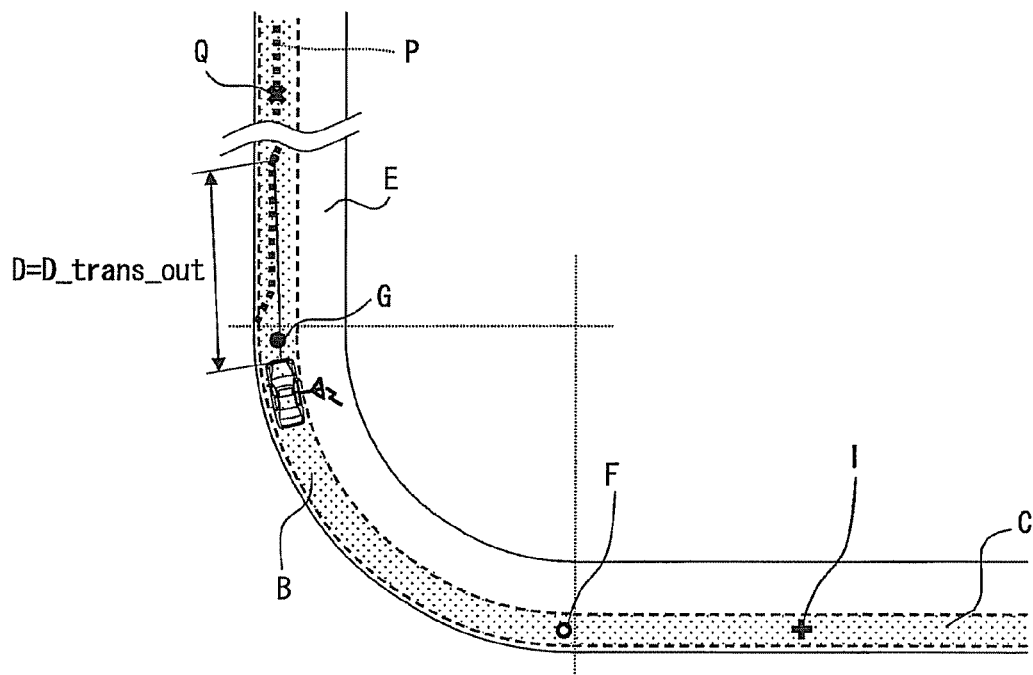
Figure 33:
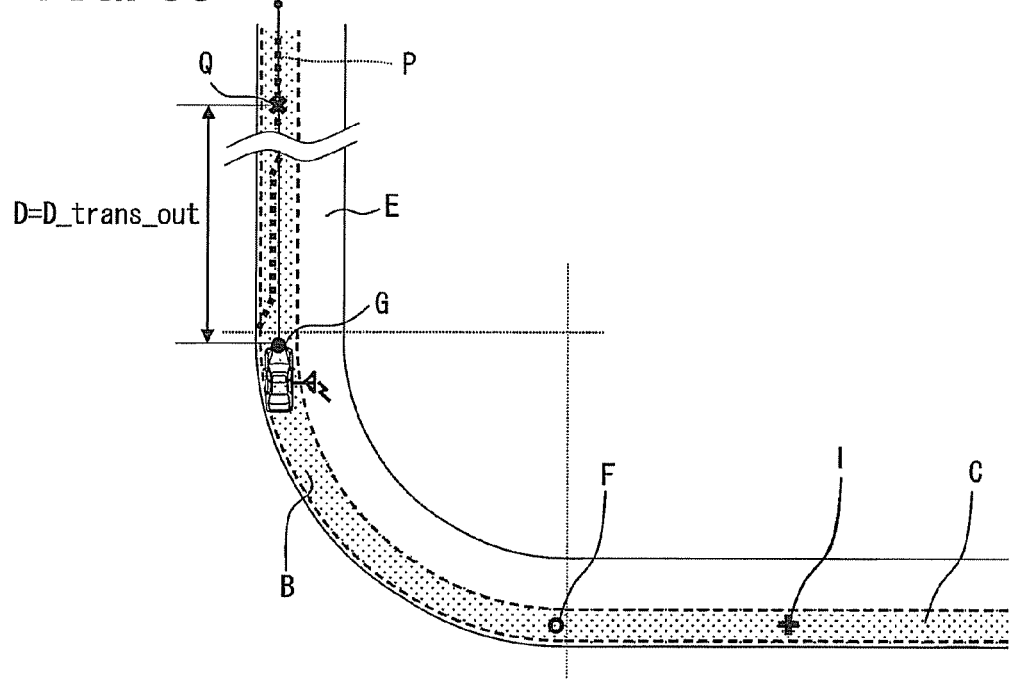

As illustrated in FIGS. 31, 32 33, the steering angle is automatically controlled, so that the virtual road border distance Do is equal to the exit side virtual curve distance $D\_{trans\_out}$ (i.e., Do=$D\_{trans\_out}$). Therefore, at the time of travel in the curve exit shift area, the steering angle is smoothly controlled/changed in an automated manner.

After reaching the exit area end point, the subject vehicle travels without the steering operation, and, when it is determined again that there is a curve road in front of the subject vehicle by the curve road determination process, the process of FIG. 16 is performed.

Figure 34:
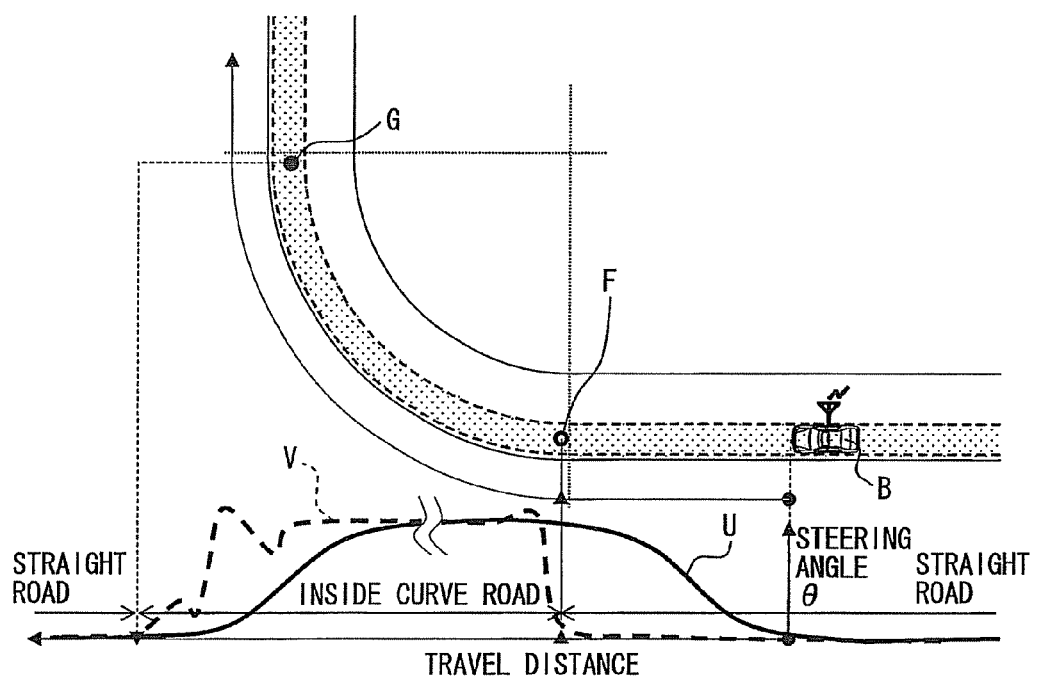
FIG. 34 is an illustration of a steering control per the second embodiment.

The advantages of the second embodiment are explained with reference to FIG. 34. In FIG. 34, a solid line U represents a change of the steering angle Θ of the subject vehicle controlled by the ECU 10 in the second embodiment for the travel of the virtual curve road, and a broken line V represents a change of the steering angle Θ of the subject vehicle controlled by the ECU 10 in the first embodiment for the travel of the virtual curve road.

As shown in FIG. 34, when the steering angle control is performed by the vehicle control ECU 10 of the first embodiment, the steering angle Θ is changed steeply in some case when the subject vehicle travels from the straight road part leading to the entrance position of the curve to the inside of the curve (i.e., at a time of traveling the curve entrance shift area).

Further, when the subject vehicle travels from the inside of the curve to the straight road part after the exit position of the curve (i.e., at a time of traveling the curve exit shift area), the steering angle Θ is also steeply changed in some case.

In contrast, when the steering angle control is performed by the vehicle control ECU 10 of the second embodiment, the steering angle Θ is changed smoothly because the steering angle control is performed in both of the travels of the curve entrance shift area and the curve exit shift area so that the travel locus of the subject vehicle forms a relaxation curve (i.e. a clothoid curve in the second embodiment).

In the present embodiment, the steering start point is determined based on the distance from the subject vehicle to a road border of the virtual curve right in front of the subject vehicle (i.e., the virtual road border distance $D\_{boun}$). However, such configuration may be changed. For example, the steering start point may be determined based on a distance $D\_{apr}$ between the subject vehicle and the entrance position of the curve. When the steering start point is determined based on $D\_{apr}$, $D\_{apr}$ is used in place of $D\_{boun}$ in equations 1 and 2.

According to a configuration of the present disclosure, a steering unit (10) controls the steering angle for a travel of the subject vehicle in a curve entrance shift area, which is defined as an area between the steering start point of the virtual curve road and a certain preset position, assuming that a "front" distance from the subject vehicle to an entrance area virtual curve is kept as an appropriate distance. In this case, the entrance area virtual curve is set such that the travel locus of the subject vehicle draws a relaxation curve when the steering unit controls the steering angle to maintain the "front" distance to the entrance area virtual curve with the appropriate distance. Therefore, according to such control of the steering angle for matching the "front" distance with the appropriate distance, the steering angle is smoothly changed at a time of traveling the curve entrance shift area.

In this case, a steering start evaluation index (KdB_e) is an index representing a state of changing distance from the subject vehicle to the virtual road border in consideration of an approach speed of the subject vehicle toward the virtual road border. The steering start evaluation index KdB_e increases as the approaching speed of the subject vehicle toward the virtual road border increases, and an increase curve (i.e., a slope) of the index KdB_e becomes steeper per unit change of decrease of the virtual road border distance as the virtual road border distance decreases. Such setting is effective and advantageous, because the vehicle driver typically starts the steering operation at an earlier timing based on an unsafe feeling when the subject vehicle speed for approaching the virtual road border is greater or when the virtual road border distance is shorter. Therefore, such setting enables a determination of a uniquely/definitively determined steering start point according to the unsafe feeling of the driver at a time of entering the curve road.

According to the configuration of the present disclosure, the steering unit controls the steering angle for a travel of the subject vehicle in a curve exit shift area, which is defined as an area between the steering return operation start point of the virtual curve road and the exit position of the virtual curve road, assuming that a "front" distance from the subject vehicle to an exit shift area side virtual curve is kept as an appropriate distance. In this case, the exit shift area side virtual curve is set such that the travel locus of the subject vehicle draws a relaxation curve when the steering unit controls the steering angle to maintain the "front" distance to the exit shift area side virtual curve with the appropriate distance. Therefore, according to such control of the steering angle for matching the "front" distance with the appropriate distance, the steering angle is smoothly changed at a time of traveling the curve exit shift area.

Third Embodiment

The present disclosure includes not only the above-described embodiments but also a following embodiment in a scope of the technical coverage. Therefore, in the following description, like parts have like numbers in those embodiments, and the description of the like parts is omitted.

The following is in regards to the third embodiment of the present disclosure.

The driving support system 100 in the third embodiment is similar to the driving support system 100 in the first and second embodiments, except that the vehicle control ECU 10 performs, in addition to the process for controlling the steering angle, a steering angle correction process for correcting the steering angle of the subject vehicle.

When the subject vehicle is located on a straight road part that is outside of the virtual curve road, the vehicle control ECU 10 of the third embodiment calculates a steering angle Θ that steers the subject vehicle toward a center of the two virtual road borders of the straight road part, based on equations 26, 27, 28, and 29. The vehicle control ECU 10 may correspond to a steering angle correction unit in claims.

$$\Theta = N \times \theta\_c \quad \text{(Equation 26)}$$

In equation 26, N is a ratio of the steering angle Θ against the tire steer angle (N: a constant number); $\theta\_c$ is a tire steer angle for centering the subject vehicle between the virtual road borders on both sides of the straight road part, which is derived from equation 27.

$$\theta\_c = \theta\_1 + \theta\_2 \quad \text{(Equation 27)}$$

Figure 35:
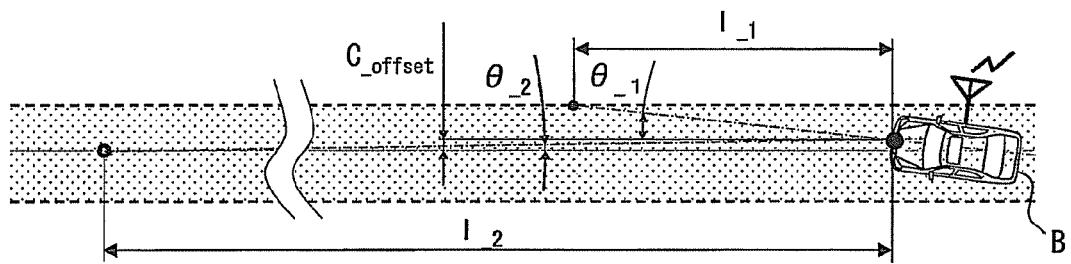
FIGS. 35, 36 are illustrations of a correction of the steering angle of the steering wheel in the subject vehicle according to a third embodiment.

In equation 27 $\theta\_1$ is a tire steer angle for reducing, to zero degree, a subject vehicle angle between the subject vehicle and the centerline of the virtual road borders on both sides of the straight road part (see FIG. 35). Also, in equation 27, $\theta\_2$ is a tire steer angle for reducing, to a value of zero, an offset between the subject vehicle and the centerline of the virtual road borders on both sides of the straight road part (see FIG. 35). The offset in this context indicates a distance of the subject vehicle from a center of the road width measured in the width direction between two virtual road borders on both sides of the straight road part.

The tire steer angle $\theta\_1$ is calculated using equation 28, and the tire steer angle $\theta\_2$ is calculated using equation 29.

$$\theta\_1 = \sin^{-1}\left(\frac{L - C\_{\text{offset}}}{L\_1}\right) \quad \text{(Equation 28)}$$

$$\theta\_2 = \sin^{-1}\left(\frac{C\_{\text{offset}}}{L\_2}\right) \quad \text{(Equation 29)}$$

In equation 28, L is a distance from the centerline of the virtual road borders in a road width direction and L_1 is a distance of the subject vehicle from the virtual road border in front of the subject vehicle in the straight road part (see FIG. 35). In both equations 28 and 29, C_offset is an offset distance of the subject vehicle from the centerline of the virtual road borders in the road width direction of the straight road part. In equation 29, L_2 is a distance that is calculated by multiplying the subject vehicle speed by a constant value (i.e., time T) (see FIG. 35).

The illustration in FIG. 35 is a situation where the subject vehicle is traveling a straight road part just outside of the virtual curve when, for example, the subject vehicle is determined as not having entered the virtual curve road by the curving determination process, or when, for example, the subject vehicle is determined as having exited from the virtual curve road by the curve road exit determination process. Alternatively, the subject vehicle may be determined as traveling the straight road part just outside of the virtual curve road when the entrance position determined by the entrance determination process exists in front of the subject vehicle or when the subject vehicle has passed the exit position determined by the exit determination process.

The virtual road border on both sides of the straight road part outside of the virtual curve road may be determined by the road shape determination process described above.

According to the above-described configuration, when the subject vehicle is located at a straight road part outside of the virtual curve road, the subject vehicle is returned to the center of the virtual road borders on both sides of the straight road part, based on the calculation of equations 26, 27, 28, and 29.

In addition, when the subject vehicle is located inside of the virtual curve road, the vehicle control ECU 10 of the third embodiment calculates, by using equations 26, 27, 28, and 29, a steering angle Θ for returning the subject vehicle to the center of the virtual road borders on both sides of the straight road part, based on an assumption that such virtual road borders of the straight road part is virtually positioned in a tangent direction of the virtual curve road.

Figure 36:
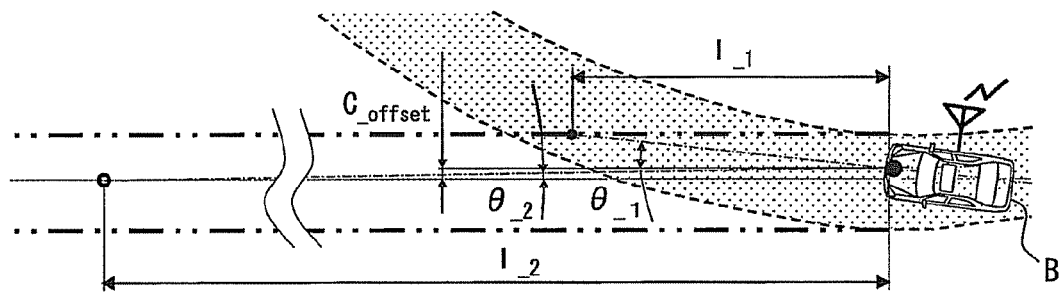

The virtual positioning of the straight road part in the tangent direction of the curve road may be performed in the following manner. A straight line may be extended from the front end of the subject vehicle toward the road width direction. Next, the intersection points between the straight line and the virtual road borders on both sides of the virtual curve road may be calculated. Two tangent lines may be drawn respectively from such intersection points on the virtual road borders on both sides of the virtual curve road (see a two-dotted dash line in FIG. 36). An area between the two tangent lines on both sides of the curve road may be defined as the virtually positioned straight road part in the tangent direction of the curve road.

Further, the tangent lines drawn from the virtual road borders on both sides of the curve road may be defined as the virtual road borders of the straight road part that is virtually positioned in the tangent direction of the curve road.

After the subject vehicle enters the virtual curve road, which may be determined by the curving determination process, the subject vehicle may be determined as traveling on the virtual curve road until the subject vehicle exits the virtual curve road, which may be determined by the curve road exit determination process. Alternatively, the subject vehicle may be determined as traveling the straight road part outside of the virtual curve road when the subject vehicle has passed the entrance position or when the exit position exists in front of the subject vehicle.

According to the above-described configuration, when the subject vehicle is located in the virtual curve road, the subject vehicle is returned to a center of the virtual road borders on both sides of the straight road part, which is virtually positioned in the tangent direction of the virtual curve road. By returning to the center of the virtually-positioned straight road part of the virtual curve road, the subject vehicle ultimately returns to the center of the virtual road borders of the curve road.

The correction of the steering angle may be configured to be performed whenever the steering angle control is performed as a result of the steering angle propriety determination process, or may be performed at a constant time/distance interval.

The above-described embodiments is in regards to the determination of the virtual road shape and the virtual road borders of the virtual curve road in front of the subject vehicle based on the speed and the steering angle Θ of the lead vehicle. However, such configuration may be changed and/or modified. For example, the virtual road shape and the virtual road borders may be determined based on the distance of the object (e.g., a curb stone, a white line or the like) on the road border which is detected by the distance sensor (e.g., the radar 8 or a camera).

Figure 37:
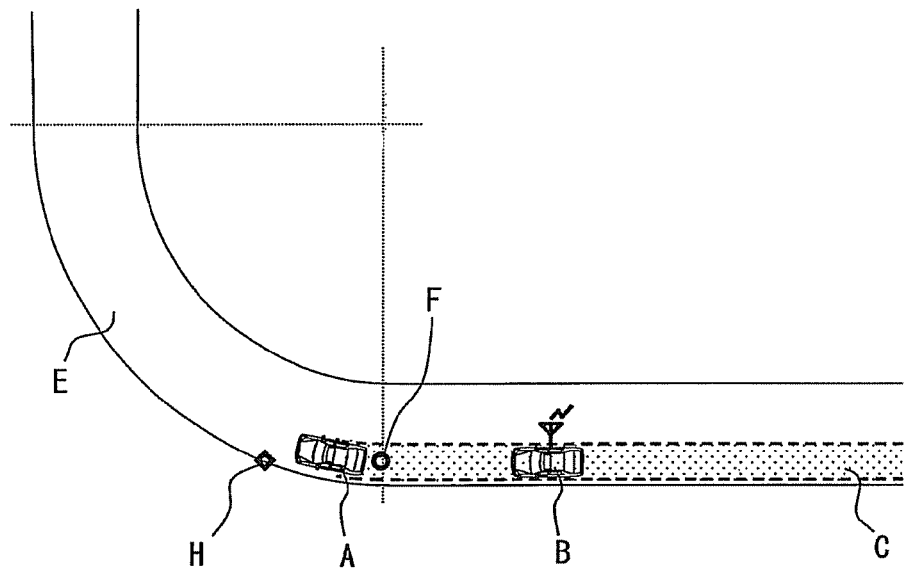
FIGS. 37, 38 are illustrations of the virtual road border, which is not determined from vehicle information of the lead vehicle, in front of the subject vehicle.

For instance, when the subject vehicle and the lead vehicle are positioned closely within a certain distance from each other, with the lead vehicle having already entered the virtual curve road, the virtual road shape and the virtual road borders may be determined based on the detection results of the distance sensor, in case that the virtual road border in front of the subject vehicle cannot be determined based on the vehicle information acquired from the lead vehicle (see FIG. 37, 38). More practically, the virtual road shape and the virtual road borders not determined based on the vehicle information of the lead vehicle may be supplemented by the detection results of the distance sensor.

Figure 38:
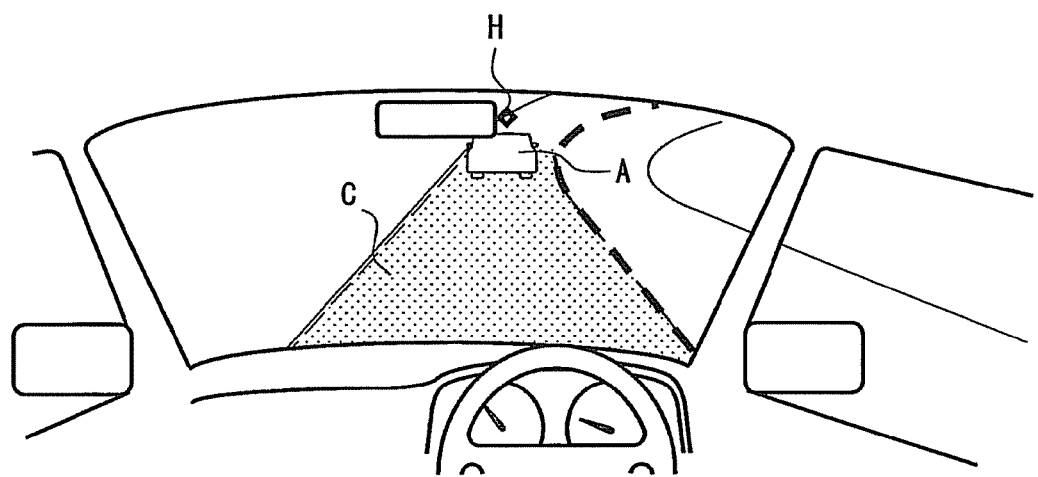

The certain distance between the subject vehicle and the lead vehicle may be defined as an arbitrary distance. Further, H in FIGS. 37 and 38 is the virtual road border in front of the subject vehicle, and C is the virtual road shape determined based on the vehicle information of the lead vehicle. The broken line in FIGS. 37 and 38 is the virtual road border determined by the vehicle information of the lead vehicle.

When the virtual road shape and the virtual road border are determined based on the detection results of the distance sensor, the virtual road shape and the virtual road border may be determined by connecting a series of points derived from the distance data to the boundary objects of the curve road. Further, when the distance data is available only for the boundary objects on the outside border object of the virtual curve road, the outside virtual road border on the outside of the virtual curve road may be determined based on the detected distance data. The inside virtual road border of the virtual curve road may be determined by shifting the outside virtual road border by a predetermined road width distance of 3.5 meters, for example, toward the inside of the virtual curve road.

After the determination of the virtual road border based on the detection results of the distance sensor, the vehicle control ECU 10 may perform the steering angle control based on the virtual road border determined.

Figure 39:
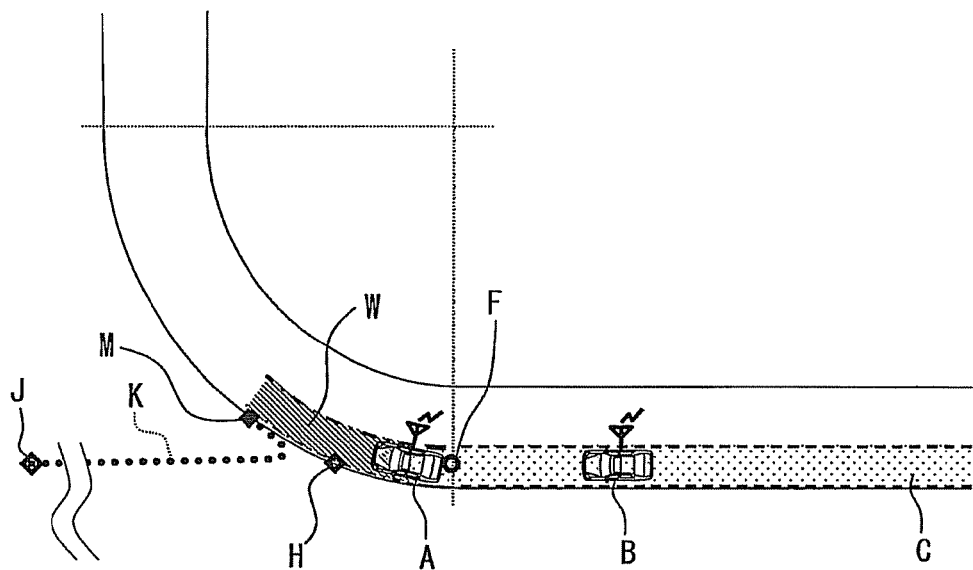
FIG. 39 is an illustration of the virtual road border in front of the subject vehicle determined by a detection result of a distance sensor.
Figure 40:
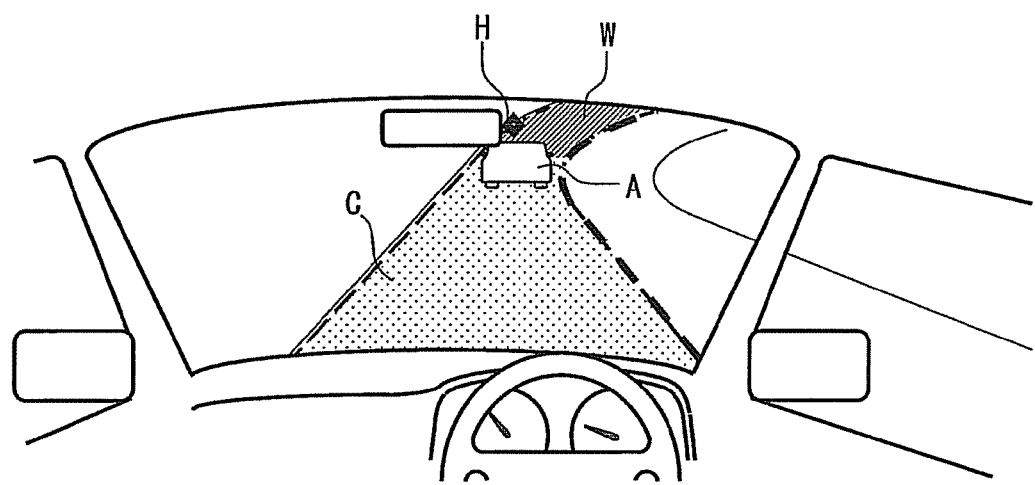
FIG. 40 is illustration of the virtual road border in front of the subject vehicle determined from a detection result of a distance sensor.

For instance, when the virtual road border in front of the subject vehicle is determined based on the detection results of the distance sensor, the steering start point described in the second embodiment may be determined according to the distance from the subject vehicle to the virtual road border in front of the subject vehicle (i.e., D_boun), and the steering angle control described in the second embodiment may be performed (see FIGS. 39 and 40).

In FIGS. 39 and 40, H is the virtual road border in front of the subject vehicle, C is the virtual road shape determined based on the vehicle information of the lead vehicle, and W is the virtual road shape determined based on the detection results of the distance sensor. Further, the broken line is the virtual road border determined by the vehicle information of the lead vehicle, and the dashed line is the virtual road border determined from the detection results of the distance sensor.

According to the above-described configuration, when the lead vehicle and the subject vehicle approach the curve road closely traveling with each other, the virtual road border in front of the subject vehicle can be determined based on the detection results of the distance sensor, even in case that the virtual road border in front of the subject vehicle could not be determined based on the vehicle information from the lead vehicle. Therefore, even in case that the virtual road border in front of the subject vehicle could not be determined based on the vehicle information from the lead vehicle, the steering angle control is smoothly performed in an automated manner at a time of traveling the curve entrance shift area.

Although the present disclosure has been fully described in connection with the preferred embodiment thereof with reference to the accompanying drawings, it is to be noted that various changes and modifications will become apparent to those skilled in the art.

In the above-described embodiments, the travel locus of the lead vehicle and the virtual road shape are determined based on the vehicle information (i.e., the speed and the steering angle of the lead vehicle) received from the lead vehicle via the wireless communication unit 7. However, such configuration may be changed.

For Instance, the vehicle control ECU 10 of the driving support system 100 disposed in the lead vehicle may perform, based on the speed and the steering angle of the lead vehicle, the determination of the travel locus of the lead vehicle and the determination of the virtual road shape. Information regarding such determinations, along with the travel locus and the virtual road shape, may be transmitted as the vehicle information of the lead vehicle. Then, all or a part of the determination of the travel locus of the lead vehicle and the virtual road shape performed by the subject vehicle may be omitted.

Further, in the above-described embodiment, the determination of the travel locus of the lead vehicle and the virtual road shape are performed based on the speed and the steering angle of the lead vehicle. However, such configuration may be changed. For instance, based on a ratio between the inside tire speed and the outside tire speed of the lead vehicle, the travel locus of the lead vehicle and the virtual road shape may be determined.

Specifically, since the curve road curvature radius can be calculated from the inside/outside tire speed ratio based on the fact that the angular velocity is same for both of the inside tire and the outside tire, the travel locus and the virtual road shape can be determined based on such curve road curvature radius.

Further, based on such curve road curvature radius, the entrance position and the exit position of the curve road may be determined. In such determination, the curve road curvature radius can be more accurately calculated since the inside/outside tire speed ratio is closer to the road surface than the steering angle.

Furthermore, the travel locus of the lead vehicle and the virtual road shape may be determined based on the yaw rate of the lead vehicle.

Further, the travel locus and the virtual road shape may be determined based on the combination of the speed, the steering angle, the inside/outside tire speed ratio and the yaw rate of the lead vehicle. In such case, values from different methods may be averaged.

Further, when the vehicle control ECU 10 of the subject vehicle has acquired information regarding the travel locus, the virtual road shape from the lead vehicle, such information may be converted to the travel locus and to the outer road shape relative to the position of the subject vehicle based on the inter-vehicle distance to the lead vehicle which is derived from the signal of the radar 8.

In the above-described embodiment, the subject vehicle speed Vo is adjusted to the target curving speed Vt2 at the time of traveling the virtual curve road with the virtual road border distance Do kept equal to or above the appropriate border distance Dc. However, such configuration may be changed.

For instance, after decreasing the subject vehicle speed Vo to the target curving speed Vt1 before the entrance position of the curve road, the target curving speed Vt1 may be kept unchanged until the subject vehicle reaches the exit position of the curve road, based on an assumption that the outside curvature radius Rn of the virtual curve road is constant.

In the above-described embodiment, the follow travel control is performed by using the evaluation index for evaluating the changing distance between the subject vehicle and the lead vehicle. However, the present disclosure may be applicable to the follow travel control that does not use such evaluation index.

Further, the present disclosure may incorporate various changes and modifications, and such changes and modifications are to be understood as being within the scope of the present disclosure as defined by the appended claims.

What is claimed is:

1. A vehicle behavior control apparatus disposed in a subject vehicle and including a wireless communication apparatus for exchanging information through vehicle to vehicle communication, the vehicle behavior control apparatus comprising:
   a current position acquisition unit regularly acquiring a current position of the subject vehicle;
   a lead vehicle information acquisition unit acquiring lead vehicle information via the wireless communication apparatus, the lead vehicle information being regularly transmitted from a lead vehicle;
   a virtual road shape determination unit determining a virtual shape of a road as a virtual road shape based on the lead vehicle information;
   a virtual road border distance calculation unit calculating a virtual road border distance as a distance from the subject vehicle to a road border of a virtual curve road straight in front of the subject vehicle based on the current position of the subject vehicle and the virtual road shape;
   a curvature radius calculation unit calculating a curvature radius of the virtual curve road in front of the subject vehicle based on the virtual road shape;
   a turn radius calculation unit calculating an appropriate turn radius of the subject vehicle for a travel of the virtual curve road based on the curvature radius calculated by the curvature radius calculation unit;
   an appropriate distance calculation unit calculating an appropriate distance within the virtual curve road from the subject vehicle to the road border straight in front of the subject vehicle based on the appropriate turn radius;
   a steering unit performing a steering angle control of the subject vehicle by controlling a steering angle of the subject vehicle traveling along the virtual curve road such that the virtual road border distance equals the appropriate distance;
   an entrance determination unit determining an entrance position of the virtual curve road based on the lead vehicle information acquired by the lead vehicle information acquisition unit, the lead vehicle information including at least one of a steering angle and an inside-outside tire speed ratio of the lead vehicle;
   a steering start point determination unit determining a steering start point according to the virtual road border distance in a straight road part leading to the entrance position;
   an entrance area start point determination unit determining a position being apart from the steering start point by a predetermined distance in a front direction of the subject vehicle, as an entrance area start point of a curve entrance shift area between the steering start point and a preset point; and
   an entrance area virtual curve set unit setting an entrance area virtual curve in order for a travel locus of the subject vehicle to draw a relaxation curve according to the steering angle control by the steering unit, wherein,
   when the steering angle control by the steering unit is performed based on the appropriate distance from the subject vehicle to the entrance area virtual curve straight in front of the subject vehicle, the entrance area virtual curve is determined as a curve between (i) the entrance area start point determined by the entrance area start point determination unit and (ii) a preset end point on the virtual road border in the curve entrance shift area, and
   the appropriate distance calculation unit calculates, as the appropriate distance, a distance from the subject vehicle to the entrance area start point virtual curve straight in front of the subject vehicle while the subject vehicle is traveling along the curve entrance shift area.

2. The vehicle behavior control apparatus of claim 1 further comprising:
   a steering start evaluation index calculation unit calculating a steering start evaluation index KdB_e, the steering start evaluation index KdB_e representing a state of changing distance from the subject vehicle to the virtual road border in consideration of an approach speed of the subject vehicle toward the virtual road border, the index KdB_e increasing as the approaching speed of the subject vehicle toward the virtual road border increases, and an increase curve of the index KdB_e becoming steeper per unit change of decrease of the virtual road border distance as the virtual road border distance decreases;
   a steering start determination unit determining whether a current value KdB_e_p of the steering start evaluation index KdB_e exceeds a threshold KdB_e_str of the steering start evaluation index KdB_e being determined based on the distance of the virtual road border straight in front of the subject vehicle; and a steering start unit starting the steering of the subject vehicle when the current value KdB_e_p of the steering start evaluation index KdB_e exceeds the threshold KdB_e_str, wherein the steering start point determination unit determines, as the steering start point, the current position of the subject vehicle when the current value KdB_e_p of the steering start evaluation index KdB_e exceeds the threshold KdB_e_str.

3. The vehicle behavior control apparatus of claim 2, wherein the steering start evaluation index KdB_e and the threshold KdB_e_str of the steering start evaluation index KdB_e are respectively calculated by:

$$KdB\_e = 10 \times \log_{10}\left(\left|4 \times 10^7 \times \frac{Vo}{(D\_boun)^3}\right|\right)$$

$$Kdb\_e\_str = b\log_{10}(D\_boun) + c + \Delta c, \text{ and}$$

D_boun is the virtual road border distance and b, c are constants.

4. A vehicle behavior control apparatus disposed in a subject vehicle and including a wireless communication apparatus for exchanging information through vehicle to vehicle communication, the vehicle behavior control apparatus comprising:

a current position acquisition unit regularly acquiring a current position of the subject vehicle;

a lead vehicle information acquisition unit acquiring lead vehicle information via the wireless communication apparatus, the lead vehicle information being regularly transmitted from a lead vehicle;

a virtual road shape determination unit determining a virtual shape of a road as a virtual road shape based on the lead vehicle information;

a virtual road border distance calculation unit calculating a virtual road border distance as a distance from the subject vehicle to a road border of a virtual curve road straight in front of the subject vehicle based on the current position of the subject vehicle and the virtual road shape;

a curvature radius calculation unit calculating a curvature radius of the virtual curve road in front of the subject vehicle based on the virtual road shape;

a turn radius calculation unit calculating an appropriate turn radius of the subject vehicle for a travel of the virtual curve road based on the curvature radius calculated by the curvature radius calculation unit;

an appropriate distance calculation unit calculating an appropriate distance within the virtual curve road from the subject vehicle to the road border straight in front of the subject vehicle based on the appropriate turn radius;

a steering unit performing a steering angle control of the subject vehicle by controlling a steering angle of the subject vehicle traveling along the virtual curve road such that the virtual road border distance equals the appropriate distance;

an exit determination unit determining an exit position of the virtual curve road based on at least one of a steering angle and a inside-outside tire speed ratio of the lead vehicle acquired by the lead vehicle information acquisition unit;

a steering return operation start point determination unit determining, as a steering return operation start point, a position of the subject vehicle viewing an intersection between (i) the virtual road border of the virtual curve road and (ii) the virtual road border of the straight road part after the exit position of the virtual curve road;

a steering end point determination unit determining, as a steering end point, the exit position determined by the exit determination unit;

an exit area start point determination unit determining the intersection determined by the steering return operation start point determination unit as an exit area start point;

an exit area end point determination unit determining, as an exit area end point in a curve exit shift area between the steering return operation start point and the exit position, a point apart from the exit position on a centerline between the virtual road border on both sides of the straight road part after the exit position of the curve, the point on the centerline defined according to the speed of the subject vehicle;

an exit area virtual curve set unit setting an exit area virtual curve in order for a travel locus of the subject vehicle to draw a relaxation curve according to the steering angle control by the steering unit, when the steering angle control by the steering unit is performed based on the appropriate distance from the subject vehicle to the exit area virtual curve straight in front of the subject vehicle, the exit area virtual curve being determined as a curve between (i) the exit area start point determined by the exit area start point determination unit and (ii) the exit area end point determined by the exit area end point determination unit, wherein the appropriate distance calculation unit calculates, as the appropriate distance, a distance from the subject vehicle to the exit area virtual curve straight in front of the subject vehicle while the subject vehicle is traveling along the curve exit shift area.

5. The vehicle behavior control apparatus of claim 4 further comprising:

a tire steer angle calculation unit calculating a tire steer angle θ for maintaining the virtual road border distance with the appropriate distance; and a steering angle calculation unit calculating a steering angle Θ according to the tire steer angle θ, wherein the steering unit uses the steering angle Θ as a target of the steering angle control.

6. The vehicle behavior control apparatus of claim 5, wherein the tire steer angle calculation unit calculates the tire steer angle θ and an estimated outside curvature radius Ra that is calculated from the appropriate distance from the appropriate distance calculation unit, the steering angle calculation unit calculates a target steering angle Θ based on the tire steer angle θ, and the tire steer angle θ, the estimated outside curvature radius Ra, and the target steering angle Θ are calculated according to equations:

$$Ra = \frac{Dc^2 + L^2}{2 \times L},$$

$$\theta = \frac{180 \times WB}{\pi \times (Ra - L)}[\text{deg}], \Theta = N \times \theta, \text{ and}$$

Dc is the appropriate distance, L is a distance from the centerline of the virtual curve road to the virtual road border along a road width, WB is a wheelbase of the subject vehicle, and N is a ratio of the target steering angle Θ against the tire steer angle θ.

7. A vehicle behavior control apparatus disposed in a subject vehicle and including a wireless communication apparatus for exchanging information through vehicle to vehicle communication, the vehicle behavior control apparatus comprising:
- a current position acquisition unit regularly acquiring a current position of the subject vehicle;
- a lead vehicle information acquisition unit acquiring lead vehicle information via the wireless communication apparatus, the lead vehicle information being regularly transmitted from a lead vehicle;
- a virtual road shape determination unit determining a virtual shape of a road as a virtual road shape based on the lead vehicle information;
- a virtual road border distance calculation unit calculating a virtual road border distance as a distance from the subject vehicle to a road border of a virtual curve road straight in front of the subject vehicle based on the current position of the subject vehicle and the virtual road shape;
- a curvature radius calculation unit calculating a curvature radius of the virtual curve road in front of the subject vehicle based on the virtual road shape;
- a turn radius calculation unit calculating an appropriate turn radius of the subject vehicle for a travel of the virtual curve road based on the curvature radius calculated by the curvature radius calculation unit;
- an appropriate distance calculation unit calculating an appropriate distance within the virtual curve road from the subject vehicle to the road border straight in front of the subject vehicle based on the appropriate turn radius;
- a steering unit performing a steering angle control of the subject vehicle by controlling a steering angle of the subject vehicle traveling along the virtual curve road such that the virtual road border distance equals the appropriate distance;
- a steering angle correction unit correcting the steering angle $\Theta$ to steer the subject vehicle toward a center of the virtual road borders of the straight road part, the straight road part being defined as (i) the straight road part outside of the virtual curve road when the subject vehicle is located on a straight road part that is outside of the virtual curve road or as (ii) the straight road part that is virtually set as a tangent line of the virtual curve road when the subject vehicle is located in the virtual curve road, wherein the steering unit performs the steering angle control, using the steering angle $\Theta$ calculated by the steering angle correction unit as the target steering angle, and the steering angle correction unit corrects the steering angle $\Theta$ by using equations:

$$\Theta = N \times \theta\_c,$$

$$\theta\_c = \theta\_1 + \theta\_2,$$

$$\theta\_1 = \sin^{-1}\left(\frac{L - C\_\text{offset}}{l\_1}\right),$$

$$\theta\_2 = \sin^{-1}\left(\frac{C\_\text{offset}}{l\_2}\right), \text{ and}$$

per the equations:
N is a ratio of the target steering angle $\Theta$ against the tire steer angle $\theta$, $\theta\_c$ is a tire steer angle for returning the subject vehicle to the center between the virtual road borders on both sides of the straight road part, $\theta\_1$ is a tire steer angle for reducing, to zero degree, a subject vehicle angle between the subject vehicle and the center of the virtual road borders on both sides of the straight road part, $\theta\_2$ is a tire steer angle for reducing, to a value of zero, an offset between the subject vehicle and the center of the virtual road borders on both sides of the straight road part, L is a distance from the center between the virtual road borders to the virtual road border along the road width, C_offset is an offset distance of the subject vehicle from a center of the two virtual road borders in the width direction of the straight road part, l_1 is a distance of the subject vehicle from the virtual road border straight in front of the subject vehicle in the straight road part, and l_2 is a distance calculated by multiplying the subject vehicle speed by a constant value.

8. A vehicle behavior control apparatus disposed in a subject vehicle and including a wireless communication apparatus for exchanging information through vehicle to vehicle communication, the vehicle behavior control apparatus comprising:
- a current position acquisition unit regularly acquiring a current position of the subject vehicle;
- a lead vehicle information acquisition unit acquiring lead vehicle information via the wireless communication apparatus, the lead vehicle information being regularly transmitted from a lead vehicle;
- a virtual road shape determination unit determining a virtual shape of a road as a virtual road shape based on the lead vehicle information;
- a virtual road border distance calculation unit calculating a virtual road border distance as a distance from the subject vehicle to a road border of a virtual curve road straight in front of the subject vehicle based on the current position of the subject vehicle and the virtual road shape;
- a curvature radius calculation unit calculating a curvature radius of the virtual curve road in front of the subject vehicle based on the virtual road shape;
- a turn radius calculation unit calculating an appropriate turn radius of the subject vehicle for a travel of the virtual curve road based on the curvature radius calculated by the curvature radius calculation unit;
- an appropriate distance calculation unit calculating an appropriate distance within the virtual curve road from the subject vehicle to the road border straight in front of the subject vehicle based on the appropriate turn radius;
- a steering unit performing a steering angle control of the subject vehicle by controlling a steering angle of the subject vehicle traveling along the virtual curve road such that the virtual road border distance equals the appropriate distance;
- a followee object determination unit determining a vehicle capable of performing vehicle-to-vehicle communication as a followee object to be followed by the subject vehicle, wherein the followee object is the lead vehicle from which the lead vehicle information is acquired by the lead vehicle information acquisition unit, the steering unit performs a follow travel control for following the followee object that is determined by the followee object determination unit;

an entrance determination unit determining an entrance position of the virtual curve road based on at least one of a steering angle of the lead vehicle and an inside-outside tire speed ratio of the lead vehicle acquired as the lead vehicle information by the lead vehicle information acquisition unit;

a speed acquisition unit regularly acquiring a speed of the subject vehicle;

an inter-vehicle distance detection unit detecting an inter-vehicle distance between the lead vehicle and the subject vehicle;

a lead vehicle relative speed calculation unit regularly calculating a relative speed of the lead vehicle relative to the subject vehicle, based on the speed of the subject vehicle and the speed of the lead vehicle;

a first evaluation index calculation unit calculating a first corrected evaluation index representing a state of changing distance between the subject vehicle and the lead vehicle in consideration of the speed of the lead vehicle, the first corrected evaluation index increasing as the relative speed for approaching the lead vehicle increases and as the inter-vehicle distance to the lead vehicle decreases, wherein an increase curve of the first corrected evaluation index becomes steeper per unit change of decrease of the inter-vehicle distance as the inter-vehicle distance decreases;

a first deceleration target determination unit determining whether the first corrected evaluation index exceeds a first deceleration threshold having a preset value;

an adaptive deceleration calculation unit calculating a required deceleration for maintaining an actual relative speed relative to the lead vehicle with a first target relative speed being determined based on the first corrected evaluation index and the inter-vehicle distance to the lead vehicle when the first deceleration target determination unit determines that the first corrected evaluation index exceeds the first deceleration threshold;

an entrance distance calculation unit calculating a distance from the current position of the subject vehicle acquired by the current position acquisition unit to the entrance position determined by the entrance determination unit;

a target curving speed set unit setting a target curving speed of the subject vehicle for a travel of the virtual curve road based on the outside curvature radius calculated by the curvature radius calculation unit and a target side acceleration of the subject vehicle having a preset value;

a curve entrance relative speed calculation unit calculating a curve entrance relative speed as a difference between the target curving speed and the speed of the subject vehicle;

a second evaluation index calculation unit calculating a second corrected evaluation index representing a state of changing distance from the subject vehicle to the entrance position of the curve road in consideration of the target curving speed for passing the entrance of the curve road, the second corrected evaluation index increasing as the curve entrance relative speed increases, wherein an increase curve of the second corrected evaluation index becomes steeper as the distance to the entrance position of the curve road decreases;

a deceleration start determination unit determining whether the second corrected evaluation index exceeds a second deceleration threshold having a preset value;

a curve road deceleration calculation unit calculating a required deceleration for maintaining an actual curve entrance relative speed with a second target relative speed when the deceleration start determination unit determines that the second corrected evaluation index exceeds the second deceleration threshold, wherein the second target relative speed is determined based on the second corrected evaluation index and the distance to the entrance position of the curve road; and a comparison unit comparing the required deceleration calculated by the adaptive deceleration calculation unit with the required deceleration calculated by the curve road deceleration calculation unit when the adaptive deceleration calculation unit and the curve road deceleration calculation unit have respectively calculated the required deceleration, wherein a required deceleration having a greater absolute value is output from among two required decelerations from respective calculation units.

9. The vehicle behavior control apparatus of claim 8 further comprising:

a first acceleration target determination unit determining whether the first corrected evaluation index calculated by the first corrected evaluation index calculation unit is smaller than a first acceleration threshold having a preset value;

an adaptive acceleration calculation unit calculating a required acceleration for maintaining an actual relative speed relative to the lead vehicle with the first target relative speed when the first acceleration target determination unit determines that the first corrected evaluation index is smaller than the first deceleration threshold;

a curving determination unit determining whether the subject vehicle has entered the virtual curve road based on the entrance position determined by the entrance determination unit and the current position of the subject vehicle acquired by the current position acquisition unit;

a curve border relative speed calculation unit calculating a curve border relative speed as a difference between the subject vehicle speed and the target curving speed based on the subject vehicle speed acquired by the speed acquisition unit, the target curving speed set by the target curving speed set unit for a travel of the curve road;

a third evaluation index calculation unit calculating a third corrected evaluation index as an index that represents a state of changing distance from the subject vehicle to the road border of the virtual curve road in consideration of the target curving speed for traveling the curve road, the third corrected evaluation index increasing as the road border relative speed increases, and an increase curve (i.e., a slope) of the third corrected evaluation index becoming steeper as a distance calculated as a result of subtraction of the appropriate distance from the virtual road border distance decreases;

a second deceleration target determination unit determining whether the third corrected evaluation index calculated exceeds a third deceleration threshold having a preset value;

a second acceleration target determination unit for determining whether the third corrected evaluation index exceeds a second acceleration threshold having a preset value;

an in-curve acceleration calculation unit calculating a required acceleration for maintaining an actual curve border relative speed with a third target relative speed being determined based on the third corrected evaluation index and the distance calculated by subtracting the appropriate distance from virtual road border distance when (i) the curving determination unit determines that the subject vehicle has entered the virtual curve road and (ii) the second acceleration target determination unit determines that the third corrected evaluation index has a value that is smaller than the second acceleration threshold, wherein the curve road deceleration calculation unit calculates a required deceleration that maintains the curve entrance relative speed with a target value that is determined based on the second corrected evaluation index and the distance to the entrance position when (i) the curving determination unit has determined that the subject vehicle has not entered the virtual curve road and (ii) the deceleration start determination unit has determined that the second corrected evaluation index exceeds the second deceleration threshold, the curve road deceleration calculation unit calculates a required deceleration that maintains the actual curve border relative speed with a target value that is determined based on the third corrected evaluation index and a distance calculated by subtracting the appropriate border distance from the virtual road border distance when (i) the curving determination unit has determined that the subject vehicle has entered the virtual curve road and (ii) the second deceleration target determination unit has determined that the third corrected evaluation index exceeds the third deceleration threshold, the comparison unit compares the required deceleration calculated by the adaptive deceleration calculation unit with the required deceleration calculated by the curve road deceleration calculation unit when the adaptive deceleration calculation unit and the curve road deceleration calculation unit have respectively calculated the required deceleration, the comparison unit compares the required acceleration calculated by the adaptive acceleration calculation unit with the required acceleration calculated by the in-curve acceleration calculation unit when the adaptive acceleration calculation unit and the in-curve acceleration calculation unit have respectively calculated the required acceleration, a required acceleration having a smaller absolute value is output from among two required accelerations from respective calculation units, and a required deceleration having the greater absolute value is output from among two required decelerations from respective calculation units.

10. The vehicle behavior control apparatus of claim 1 further comprising:

a travel locus determination unit determining a travel locus of the lead vehicle based on at least one of a vehicle speed, a steering angle, and a inside-outside tire speed ratio of the lead vehicle, acquired by the lead vehicle information acquisition unit as the lead vehicle information, wherein the virtual road shape determination unit determines the virtual road shape based on the travel locus of the lead vehicle determined by the travel locus determination unit.

* * * * *